(12) United States Patent
Battlogg

(10) Patent No.: US 10,429,959 B2
(45) Date of Patent: Oct. 1, 2019

(54) MINICOMPUTER WITH A ROTATING UNIT AND METHOD OF OPERATING THE MINICOMPUTER

(71) Applicant: INVENTUS ENGINEERING GMBH, St. Anton I.M. (AT)

(72) Inventor: Stefan Battlogg, St. Anton I.M. (AT)

(73) Assignee: Inventus Engineering GmbH, St. Anton i.M. Montafon (AT)

( * ) Notice: Subject to any disclaimer, the term of this patent is extended or adjusted under 35 U.S.C. 154(b) by 402 days.

(21) Appl. No.: 15/200,945

(22) Filed: Jul. 1, 2016

(65) Prior Publication Data

US 2017/0045958 A1 Feb. 16, 2017

Related U.S. Application Data

(63) Continuation-in-part of application No. 14/747,025, filed on Jun. 23, 2015, which is a continuation-in-part
(Continued)

(30) Foreign Application Priority Data

Sep. 15, 2010 (DE) .................. 10 2010 045 436
Dec. 23, 2010 (DE) .................. 10 2010 055 833
Jul. 1, 2015 (DE) .................. 10 2015 110 634

(51) Int. Cl.
*H05K 5/00* (2006.01)
*G06F 3/0362* (2013.01)
(Continued)

(52) U.S. Cl.
CPC .......... *G06F 3/0362* (2013.01); *F16D 37/02* (2013.01); *F16D 57/002* (2013.01); *G04G 21/08* (2013.01); *G05G 1/08* (2013.01); *G05G 5/03* (2013.01); *G06F 1/163* (2013.01); *G06F 1/169* (2013.01); *G06F 3/038* (2013.01); *G06F 3/0482* (2013.01); *G06F 3/0487* (2013.01);
(Continued)

(58) Field of Classification Search
CPC ....................................................... H05K 5/00
See application file for complete search history.

(56) References Cited

U.S. PATENT DOCUMENTS 9,091,309 B2   7/2015  Battlogg
2002/0057152 A1  5/2002  Elferich et al.
(Continued)

FOREIGN PATENT DOCUMENTS

DE     10245354 A1    4/2004
DE   102010055833 A1  3/2012
EP      1168622 A2    1/2002

*Primary Examiner* — Jerry Wu
(74) *Attorney, Agent, or Firm* — Laurence A. Greenberg; Werner H. Stemer; Ralph E. Locher

(57) ABSTRACT

A minicomputer has a processor and a display unit and a communication unit and a haptic operating device. The haptic operating device has a rotatable rotating unit with a rotational resistance which can be changed by way of a control device. Selectable menu items are displayed on a display unit and a menu item is selected by rotating the rotating unit. A rotational resistance of the rotating unit is dynamically changed during a rotation of the rotating unit and the rotating unit is latched at a plurality of haptically perceptible latching points during the rotation of the rotating unit.

20 Claims, 4 Drawing Sheets

Related U.S. Application Data of application No. 13/823,781, filed as application No. PCT/EP2011/004623 on Sep. 15, 2011, now Pat. No. 9,091,309.

(51) Int. Cl.

| | | |
|---|---|---|
| *G05G 5/03* | (2008.04) | |
| *G05G 1/08* | (2006.01) | |
| *F16D 57/00* | (2006.01) | |
| *G06F 3/038* | (2013.01) | |
| *G06F 1/16* | (2006.01) | |
| *G06F 3/0482* | (2013.01) | |
| *G06F 3/0487* | (2013.01) | |
| *G04G 21/08* | (2010.01) | |
| *F16D 37/02* | (2006.01) | |
| *F16D 37/00* | (2006.01) | |

(52) U.S. Cl.
CPC ............... *F16D 2037/002* (2013.01); *F16D 2300/0214* (2013.01); *F16D 2300/18* (2013.01)

(56) References Cited

U.S. PATENT DOCUMENTS

2006/0055582 A1  3/2006  Wendt
2010/0283588 A1* 11/2010  Gomez ............... G06F 3/016
                                                340/407.2

\* cited by examiner

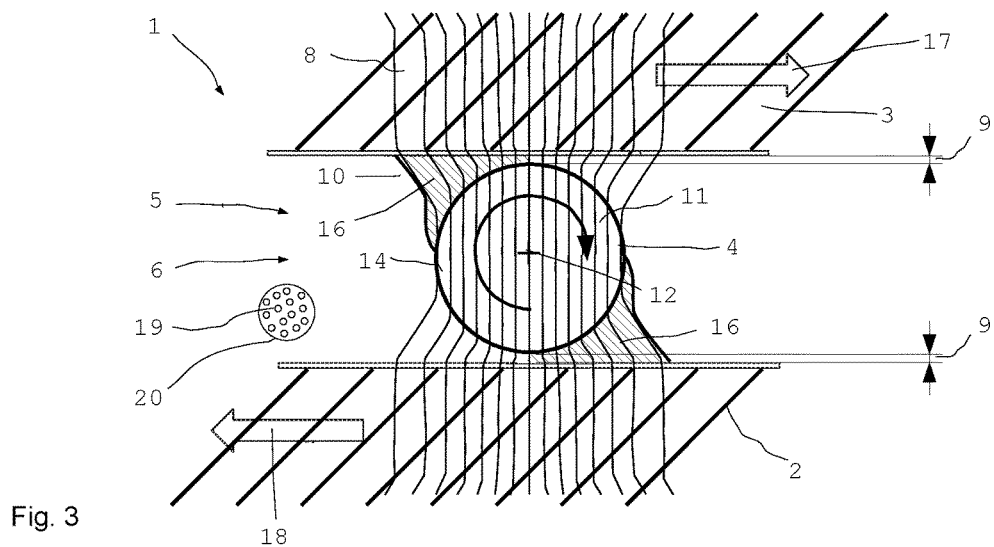
Fig. 3
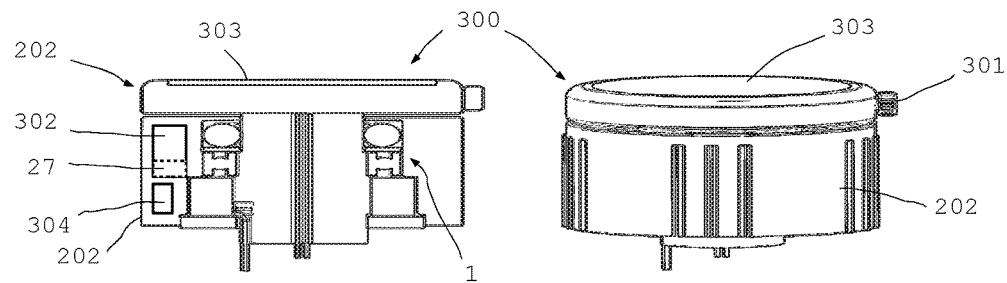
Fig. 4
Fig. 5
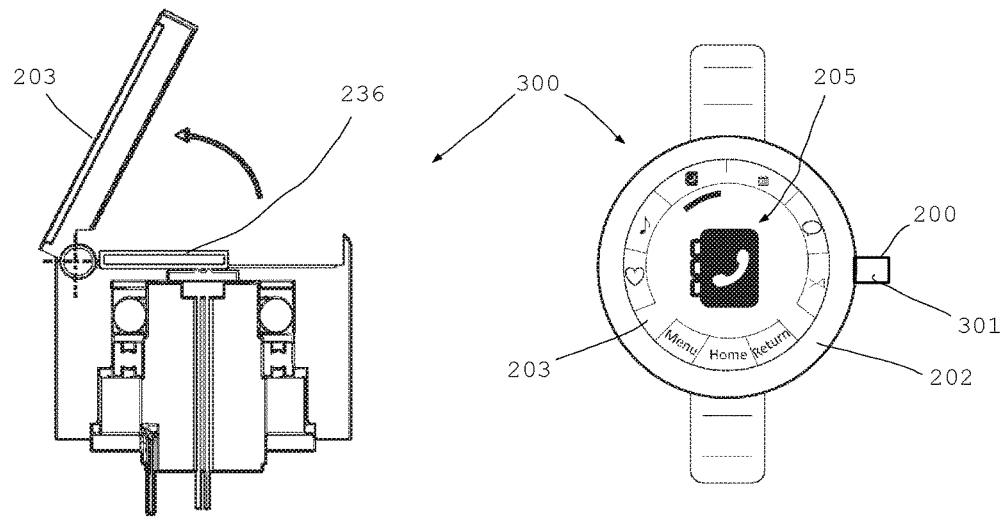
Fig. 6
Fig. 7

MINICOMPUTER WITH A ROTATING UNIT AND METHOD OF OPERATING THE MINICOMPUTER

CROSS-REFERENCE TO RELATED APPLICATION

This application is a continuation-in-part of copending patent application Ser. No. 14/747,025, filed Jun. 23, 2015; which was a continuation-in-part of patent application Ser. No. 13/823,781, filed Mar. 15, 2013, now Patent No. U.S. Pat. No. 9,091,309 B2, issued Jun. 28, 2015; which was a § 371 national stage of international patent application PCT/EP2011/004623, filed Sep. 15, 2011; this application further claims the priority of German patent applications DE 10 2010 045 436, filed Sep. 15, 2010, DE 10 2010 055 833, filed Dec. 23, 2010, and DE 10 2015 110 634.5, filed Jul. 1, 2015; the prior applications are herewith incorporated herein in their entirety.

BACKGROUND OF THE INVENTION

Field of the Invention

The present invention relates to a minicomputer and a method. In particular, the invention relates to a smartwatch or a smart device having a processor and a display unit and a communication unit and an operating device, the operating device comprising a rotatable rotating unit.

The prior art has disclosed minicomputers and, in particular, handheld computers or smartwatches each having a processor and a display unit. In the case of minicomputers having a small display size in particular, as is the case with smartwatches, operation using the finger may be difficult since the fingertip on the display covers a large part of the display.

Minicomputers in which, similar to conventional watches, a rotating crown is used to control various menu items or regions on the display by rotating the crown have therefore been disclosed. A smartwatch equipped with said rotating crown is considerably easier to operate than if the smartwatch can be operated only by gesture control.

In der EP 1 168 622 A2 ist in Figur 1 ein elektronisch gesteuerter Flussigkeitsdrehknopf als haptisches Bedienelement bekannt geworden, wobei ein dünner und mit magnetorheologischem Fluid gefüllter Scherspalt zwischen einem drehfesten weichmagnetischen Jochring und einem ebenfalls drehfesten weichmagnetischen Ring vorgesehen ist. In dem Scherspalt ist ein dünnwandiges und drehbares Stellrad angeordnet. In Abhängigkeit von einem auf den Scherspalt einwirkenden Magnetfeld wirkt ein entsprechendes Bremsmoment ein. Nachteilig daran ist der extrem großflächige dünne Scherspalt, der den feststehenden äußeren weichmagnetischen Ring außen und innen umgibt, sodass die Grundreibung aufgrund des enthaltenen Fluids (magnetohorheologische Flüssigkeit=Viskosität ähnlich Honig) sehr hoch ist. Außerdem wird das Stellrad durch die Form des drehfesten weichmagnetischen Rings vorgegeben, der Teil des Magnetkreises ist. Dadurch kann das Stellrad nicht aus beliebigen Materialien gefertigt werden. In Figur 2 der EP 1 168 622 A2 ist ein anderes Ausführungsbeispiel offenbart, bei dem das Stellrad als Rückschlusseisen dient und ein drehbarer Bestandteil des Magnetkreises ist. Das Stellrad umgibt vollständig eine feststehende Anordnung aus einem Jocheisen, Spulen und mehreren Jochringen. Das Magnetfeld verläuft radial durch den Scherspalt. Nachteilig ist der ebenfalls sehr großflächige dünne Scherspalt, der praktisch so groß ist, wie die Innenoberfläche des Stellrades. Außerdem ist das Stellrad Teil des Magnetkreises und kann somit nur aus bestimmten Materialien mit geforderten magnetischen Eigenschaften gefertigt sein. Figur 3 der EP 1 168 622 A2 offenbart ein weiteres Ausführungsbeispiel mit einem Drehsteller und einem geblechten Statorteil, welches aus weichmagnetischem Material besteht, eine Ankerwicklung trägt und ein radial verlaufendes Magnetfeld in einem magnetisch wirksamen Spalt zwischen einem radial inneren und radial äußeren Statorteil erzeugt. Beide Statorteile sind miteinander verbunden und bestehen aus einem weichmagnetischen Material. Im Spaft befindet sich ein ringförmiger und nichtmagnetischer Rotor, der über eine Welle mit einem glockenförmigen Bedienkörper verbunden ist. Ferner befindet sich im Spaft eine magnetorheologische Flüssigkeit. Der Rotor weist um die Welle herum einen glockenförmigen Rotorkörper auf, dessen ringförmige Wandung in den Spalt zwischen dem radial inneren und dem radial äußeren Statorteil eingreift. Auch bei diesem Ausführungsbeispiel ist der Scherfläche zwischen dem Rotorkörper und den Statorteilen sehr groß, wodurch ein sehr hohes Grundmoment erzeugt wird. Eine Bedienung mit einem Finger ist im täglichen Betrieb nicht möglich. Deshalb eignet sich ein haptisches Bedienelement nach der EP 1 168 622 A2 nicht zum Einsatz als feinfühliges haptisches Bedienelement für einen Minicomputer oder eine Smartwatch. Die erforderlichen Bedienkräfte sind gerade für solche Anwendungsfälle viel zu groß.

Es hat sich bei Versuchen herausgestellt, dass ein haptisches Bedienelement für z. B. Infotainment in Automobilen, Drehsteller auf Smart Devicen oder als Stellglied auf Geräten (z.B.: Oszilloskop) praktisch nur Bann gewerblich als Serienprodukt einsetzbar ist, wenn das Grundmoment (Leerlaufmoment bei abgeschaltetem Magnetfeld; off-state Moment.) kleiner als 0.2 Newtonmeter (Nm) ist. Das gilt für typische Drehknopfdurchmesser von 30, 40 oder 50 mm. Wird ein besonders kleiner Drehknopfdurchmesser (z. B.<5 oder 10 mm) verwendet, ist ein merklich geringeres Grundmoment sehr vorteilhaft.

Ein Grundmoment von kleiner als 0.2 Nm ist bei einem Serienprodukt auf magnetorheologischer Basis nicht einfach realisierbar. Bremsen oder Kupplungen mit magnetorheologischem Fluid (MRF) lassen sich bei Steer by wire (großes Lenkrad bzw. großer Krafteinbring¬abstand) oder zum Bremsen von Vorgängen bei Maschinen einsetzen. Das Grundmoment liegt bei käuflich zu erwerbenden Produkten bei 0.4 bis 0.6 Nm, also um den Faktor 10 bis 40 über dem Stand der Technik von rein mechanischen Drehstellem. Das Maximalmoment dieser Einheiten liegt zwischen 5 und 12 Nm. Der wichtige Faktor zwischen Grundmoment und Maximalmoment (Arbeitsbereichsfaktor) liegt beim Stand der Technik somit im Bereich von 12 bis 20. Deshalb wurde bisher kein MRF Bedienknopf nach dem MRF Scherprinzip z.B. als Serienteil in Automobilen umgesetzt. Bei Smartwatches oder anderen Smartdevices ist die Sachlage ähnlich bzw. es wird wenn noch ein geringeres Grundmoment gefordert.

SUMMARY OF THE INVENTION

It is accordingly an object of the invention to provide a device and a method which overcome the above-mentioned and other disadvantages of the heretofore-known devices and methods of this general type and which provide for an improved operation option for minicomputers and, in particular, for smartwatches.

With the foregoing and other objects in view there is provided, in accordance with the invention, a minicomputer, comprising:

a processor, a display unit connected to said processor and a communication unit connected to said processor;

a haptic operating device including a rotatable rotating unit having a rotational resistance opposing a rotation thereof;

a controllable transmission apparatus operatively associated with said rotating unit and configured for dynamically changing a rotational resistance against a rotation of said rotating unit during the rotation thereof, said controllable transmission apparatus including a magnetic field generating unit and an amount of magnetorheological medium disposed to magnetically adhere to said rotating unit upon being subjected to a magnetic field generated by said magnetic field generating unit and to thereby vary the rotational resistance acting on said haptic operating device against a rotation thereof; and a control device configured for adjusting the rotational resistance of said haptic operating device A minicomputer according to the invention is in the form of a smartwatch or a smart device, in particular, and can be worn on a user's wrist, for example. The minicomputer has at least one processor and at least one display unit and at least one communication unit. A haptic operating device is also provided. The haptic operating device has, in particular, a basic body and a rotatable rotating unit. The haptic operating device has a rotational resistance which can be changed by means of a control device.

Die haptische Bedieneinrichtung weist weiterhin vorzugsweise eine steuerbare Übertragungsvorrichtung auf, sodass der Drehwiderstand beim Drehen der Dreheinheit dynamisch veränderbar ist. Insbesondere weist die Übertragungsvorrichtung wenigstens zwei koppelbare Komponenten auf, deren Kopplungsintensität beeinflussbar ist. Zur Beeinflussung der Kopplungsintensität zwischen den koppelbaren Komponenten ist in einem Kanal ein durch ein Magnetfeld beeinflussbares magnetorheologisches Medium mit magnetisch polarisierbaren Partikeln angeordnet. Es ist wenigstens eine Magnetfelderzeugungseinrichtung zur Erzeugung wenigstens eines Magnetfeldes vorgesehen, um mit dem Magnetfeld das magnetorheologische Medium zu beeinflussen. Der Grundkörper ist mit einer der beiden Komponenten und die Dreheinheit ist mit der anderen der beiden Komponenten gekoppelt. Beispielsweise ist es möglich, dass die Dreheinheit an einem Gehäuse des Minicomputers drehbar aufgenommen und/oder gelagert ist. Der Grundkörper kann mit einer der beiden Komponenten und die Dreheinheit mit der anderen der beiden Komponenten direkt oder indirekt gekoppelt sein. Möglich ist z. B. eine Kopplung über ein Getriebe, eine Verzahnung oder eine Kinematik. Insbesondere ist in dem Kanal wenigstens ein drehbares Übertragungselement als Magnetfeldkonzentrator angeordnet, wobei das drehbare Übertragungselement bei einer Drehbewegung wenigstens einer der koppelbaren Komponenten in Drehung versetzt wird.

The minicomputer according to the invention has many advantages. A considerable advantage is that the operating device can be changed during operation. As a result, an adapted rotational resistance can be adjusted to the user during rotation of the haptic operating device or during rotation of the rotating unit on the basis of the current state and the current conditions.

In preferred developments, the rotating unit is assigned a controllable transmission apparatus which can be used to dynamically change the rotational resistance during rotation of the rotating unit. The controllable transmission apparatus may be used as a braking unit and may suitably set the rotational resistance. In particular, the rotating unit is rotatable with respect to the basic body and/or a housing of the minicomputer.

Ein erheblicher Vorteil der Erfindung besteht darin, dass der Magnetfeldkonzentrator das Magnetfeld auf eine kleinere Fläche konzentriert. Das Übertragungselement kann z. B. als Kugel oder Walze ausgebildet sein, ohne auf diese Formen beschränkt zu sein und konzentriert das Magnetfeld, d.h. zwischen den zwei relativ zueinander bewegten Komponenten wird das Magnetfeld verändert und von einer großen Fläche auf eine kleine Fläche (eine Übergangsfläche) konzentriert. Das Verhältnis dieser Flächen ist deutlich größer als 1 und insbesondere größer als 2, größer als 5 oder insbesondere größer als 10 oder sogar 20 oder 50. Im Prinzip ist dies das Verhaltnis aus der Zylinderfläche von dem Innenring in Relation zu (dem Bereich) der Tangentenkante einer Walze oder zu einem Kugelpunkt multipliziert mit einer Anzahl der Übertragungselemente, insbesondere z. B. 15.

Das Übertragungselement konzentriert das Magnetfeld und bildet einen magnetischen Feld-oder Flussdichtenkonzentrator.

Das Übertragungselement ist weder mit der ersten Komponente noch mit der zweiten Komponente drehfest verbunden. Der Feldkonzentrator kann sich "willkürlich" zwischen den beiden Komponenten bewegen.

Eine solcher erfindungsgemäßer Minicomputer hat viele Vorteile. Der Minicomputer erlaubt ein sehr kleines Grundmoment, sodass eine einfache Drehung der Dreheinheit bzw. eines an der haptischen Bedieneinrichtung ausgebildeten Drehknopfes ermöglicht wird. Eine Bedienperson kann bequem mit dem kleinen Finger das Drehteil, z. B. eine Krone einer Smartwatch, drehen. Es wird ein Grundmoment ermöglicht, welches kleiner 0.2 Nm und insbesondere kleiner 0.10 Nm und gegebenenfalls kleiner 0.07 Nm und vorzugsweise kleiner 0.05 Nm liegt, sodass im täglichen Gebrauch auch bei vielfacher Benutzung eine bequeme Bedienung ermöglicht wird. Es ist nicht nötig, das Drehteil mit zwei Fingem zu ergreifen, um das Drehteil (auch mehrmals nacheinander) zu drehen. Ein einfaches Berühren und Drehen auch mit nur einem Finger reicht in der Regel aus.

Gleichzeitig wird ein einfacher Aufbau ermöglicht und es werden nur wenig Teile verwendet. Durch den einfachen Aufbau, bei dem eine Drehmomentübertragung durch das magnetorhelogische Medium oder magnetorhelogische Fluid (MRF) wenigstens zu dem allergrößten Teil nur innerhalb des Kanals erfolgt, kann ein besonders geringes Grundmoment (Grundmoment=zur Drehung nötiges Moment bei abgeschafteter elektrischer Spule) bei der Bedienung des Minicomputers erreicht werden.

Ein Minicomputer mit einem Bedienelement nach der EP 1 168 622 A2 ware nicht benutzbar, da das Grundmoment zu hoch wäre, weil sehr viel Scherfläche benutzt wird. Das Verhältnis von aktiver Fläche zu Nutzfläche (Scherfläche) ist dort sehr ungünstig. Der Scherspalt muss technologisch bedingt klein sein, was wiederum die Reibung stark erhöht (Flüssigkeitsreibung). Der mit MRF gefüllte wirksame Scherspalt ist sehr groß.

Bei der vorliegenden Erfindung weist der Kanal an dem Minicomputer eine große radiate Erstreckung (Kanalhöhe) auf, sodass die Grundreibung durch das MRF an sich bei abgeschaltetem oder geringem Magnetfeld aufgrund der großen radialen Erstreckung sehr gering ist. Die große radiate Erstreckung ergibt eine große Kanalfläche. Im Gegensatz dazu sind die Übertragungs-/Kontaktflächen aber sehr klein. Es tangieren nur Übertragungselemente (z. B. Rollen) an den bewegten und stehenden Teilen. Der Kanal ist sehr groß und hat eine niedrige Flüssigkeitsreibung.

Bei dem Aufbau nach der EP 1 168 622 A2 ist in dem sehr dünnen Spaft MRF enthalten, was aufgrund der Eisenpartikel und hohen Viskosität (ähnlich wie Schokoladensauce) wesentlich schlechtere Reibungswerte hat. Der Aufbau nach der EP 1 168 622 A2 ähnelt einem Gleitlager und der Aufbau hier einem Wälzlager. Ein Grundmoment von<0.1 Nm ist bei einem MRF-Aufbau nach dem Scherprinzip, das gewerblich als Serienprodukt einsetzbar sein soll, nicht möglich. Eine Smartwatch mit einem solchen Bedienelement ist nur schwer bedienbar.

Insbesondere umfasst der Grundkörper eine Grundplatte und ein ringförmiges Aufnahmegehäuse mit einem darin angeordneten Aufnahmeraum, wobei der Aufnahmeraum radial nach außen durch einen sich im Wesentlichen in axialer Richtung erstreckenden äußeren Schenkel des Aufnahmegehäuses begrenzt wird. Vorzugsweise ist zentral an dem Aufnahmegehäuse die Welle drehbar aufgenommen. Insbesondere ist in dem Aufnahmeraum die elektrische Spule aufgenommen. Insbesondere schließt sich in einem radial inneren Bereich an das Aufnahmegehäuse und durch einen dünnen axialen Spalt getrennt mit der Welle drehfest verbundener Umlaufring an. Vorzugsweise ist der Kanal in dem Aufnahmeraum angeordnet und wird radial nach außen wenigstens im Wesentlichen oder vollstandig durch den äußeren Schenkel und radial nach innen wenigstens im Wesentlichen oder vollständig durch den Umlaufring begrenzt, sodass ein wesentlicher Teil des Magnetfeldes der Magnetfelderzeugungs-einrichtung durch das Aufnahmegehäuse, den Kanal und den Umlaufring verläuft.

Besonders bevorzugt umfasst das Aufnahmegehäuse in dem radial inneren Bereich einen inneren Schenkel, an den sich durch den dünnen axialen Spalt getrennt der Umlaufring anschließt. Insbesondere ist ein radialer Querschnitt des Aufnahmegehäuses etwa U-förmig gestaltet. Dann ist zwischen dem inneren und dem äußeren Schenkel der Aufnahmeraum umfasst. Vorzugsweise ist der äußere Schenkel länger als der innere Schenkel ausgebildet.

Insbesondere ist in einem zentralen Durchgang an dem inneren Schenkel die Welle aufgenommen. Vorzugsweise ist in dem Aufnahmeraum zwischen dem inneren und äußeren Schenkel die elektrische Spule aufgenommen.

Der innere Schenkel ist vorzugsweise durch den dünnen axialen Spalt von dem mit der Welle verbundenen Umlaufring getrennt.

Vorzugsweise besteht der Umlaufring aus einem weichmagnetischen Material und die Welle weist eine gehärtete Oberfläche oder eine entsprechend harte Oberflächenbeschichtung auf. Dadurch können Laufspuren des Lagers zuverlässig verhindert werden und es werden geeignete und gute magnetische Eigenschaften zur Verfügung gestellt.

Eine Ausgestaltung, bei der ein radialer Querschnitt des Aufnahmegehäuses etwa U-förmig ausgebildet ist und ein umlaufender innerer Schenkel (in axialer Richtung verlaufend) und ein dazu etwa konzentrisch verlaufender umlaufender äußerer Schenkel umfasst sind und wobei sich axial an (nur durch einen dünnen Spalt getrennt) den inneren Schenkel der mit der welle drehfest verbundene Umlaufring anschließt bietet sehr viele Vorteile. Es wird ein kompakter und kostengünstiger Aufbau ermöglicht, bei dem nur eine sehr geringe Grundreibung auftritt. Es wird ein Grundmoment kleiner und sogar deutlich 0.1 Nm ermöglicht. Damit können auch oft zu bedienende Drehknöpfe ausgerüstet werden, die nicht mit der ganzen Hand oder zwei Fingern fest gegriffen werden müssen, sondern auch Drehknöpfe, die mit einem Finger und nur einem einem sanften Druck bewegt werden können. Der Aufbau ermöglicht einen optimalen Magnetkreislauf, in dem die magnetischen Widerstände gering sind.

Vorzugsweise ist wenigstens eine Anzeigeeinheit zugeordnet.

The control device is preferably suitable and designed to dynamically set the rotational resistance of the transmission apparatus in the rotating unit. This means that the rotational resistance of the transmission apparatus can be settable on the basis of the rotational angle. For example, a stop can be set in at least one direction of rotation, with the result that the user notices an appreciably larger rotational resistance during rotation of the rotating unit and upon reaching a certain rotational angle.

It is possible for the rotational resistance to be changed in particular stages or continuously. It is also possible to provide end stops in both directions of rotation.

In preferred developments, the control device is set up to dynamically generate a haptic latching pattern during rotation of the rotating unit. Such a haptic latching pattern has a changed rotational resistance at at least one angular location. For example, the rotational resistance can be reduced at one angular location in comparison with adjacent angular locations. It is also possible for the rotational resistance to be increased at a particular angle location, whereas it is lower, in relative terms, at adjacent angular locations.

It is also possible to generate relative maxima of the rotational resistance, between which a relative minimum of the rotational resistance is applied, at two relatively closely adjacent angular locations. This makes it possible to achieve perceptible latching.

In all configurations, the torque profile required for rotation is preferably dynamically changed during rotation of the rotating unit.

The rotating unit is preferably rotatable with respect to the display unit. The display unit is particularly preferably connected to the basic body in a rotationally fixed manner.

It is possible for a sensor to be provided, which sensor is used, in particular, as an angle sensor and can be used to sense an angle change and, in particular, an absolute angle position between the rotating unit and the basic body. As a result of such a sensor or angle sensor, it is possible to react to a rotational movement of the rotating unit at any time.

Vorzugsweise ist eine Drehrichtungserkennung möglich. Vorzugsweise ist eine hohe Winkelauflösung möglich. Je feiner die Winkelauflösung ist, desto früher kann erkannt (oder gemutmaßt) werden, was der Bediener will (Drehrichtungsumkehr, feiner justieren). Dementsprechend kann die Steuerungseinrichtung (Elektronik/Software) reagieren. Ein Hallgeber (EP 1 168 622 A2) ist dazu in der Regel viel zu ungenau, da nur ein paar hundert "counts/revolution" möglich sind. Der Sensor bzw. Winkelsensor ist vorzugsweise dazu ausgebildet eine Winkelauflösung von 0.2° und insbesondere wenigstens 0.1° oder 0.05° oder besser zu ermöglichen. Winkelauflösungen von über 100.000 "counts/revolution" (besser als etwa 1/300 Grad) sind erstrebenswert. Mit einer Winkelauflösung besser als 0.2° oder 0.1° kann aus kleinsten Bewegungen ein Bewegungsmuster abgeleitet werden.

Bei niedrigen Sensorauflösungen kann das "Bedienelement" bzw. die Dreheinheit bzw. der Drehknopf gefühlt "kleben" bleiben (ein hohes Moment wird zum Betätigen benötigt), was sich haptisch sehr unangenehm anfühlt und damit sehr nachteilig ist. Dann muss bei z.B. einer Drehrichtungsumkehr an einem Endanschlag zunächst eine hohes Drehmoment aufgebracht werden, obwohl der Benutzer gegenläufig drehen will und somit eine Freigabe erfolgen kann. Nur muss die Steuerungseinrichtung zunächst "mitbekommen", dass in die Gegenrichtung gedreht wird, wozu das Bedienelement mindestens einen Rasterschritt bewegt werden muss. Dabei hilft eine hohe Winkelauflösung erheblich.

Besonders bevorzugt bildet der (sichtbare) Teil des Drehknopfes (sichtbare Teil der Dreheinheit) nicht einen Teil des Magnetkreises. Besonders bevorzugt kann der sichtbare Teil des Drehknopfes nach Belieben ausgeführt werden, so kann der Drehknopf verchromt oder aus Plastik, Glas sein oder beledert werden etc., da der Drehknopf ein "Designelement" ist.

Vorzugsweise sind die Übertragungselemente bzw. Drehkörper (Laufrollen) stirnseitig abgerundet oder bombiert, damit diese axial nur eine Punktberührung mit der Grundplatte bzw. dem Deckel haben. Dadurch wird die Grundreibung und somit das Grundmoment erheblich reduziert.

Auf einen Kontaktring kann verzichtet werden.

Vorzugsweise ist die Welle magnetisch leitend, wodurch Baugröße, Gewicht und Kosten reduziert werden. Vorzugsweise besteht die Welle aus einem niederlegierten Stahl wie z. B. S235. Damit die darauf laufende Dichtung wenig Reibung produziert und die Welle nicht beschädigt (Laufrille), ist die Welle vorzugsweise hartverchromt.

Der Umlaufring besteht vorzugsweise aus magnetisch gut leitendem bzw. weichmagnetischem Stahl und ist mit der Welle drehfest verbunden, insbesondere verpresst.

Der Bedienkopf bzw. die Dreheinheit ist vorzugsweise über ein Momentenübertragungselement wie z. B. einen Vierkant mit Schlitz mit der Welle verbunden. Der Bedienkopf bzw. die Dreheinheit wird durch das Momentenübertragungselement (z. B. Verschraubung über eine Senkkopfschraube) spielfrei verspannt.

It is possible for the minicomputer to be activated from a standby mode or idle mode and to change to an operating mode and vice versa by means of rotational movement of the rotating unit.

Preferably, the control device is suitable and designed to dynamically control the magnetic field generation device and to dynamically generate the magnetic field from the magnetic field generation device or a corresponding force on the basis of a rotational angle in order to provide a dynamic and angle-dependent haptic latching pattern.

In ongoing developments at least one separate contact ring or one separate contact element is arranged between the two components, wherein the contact ring and/or the contact element is/are elastic. Such a contact ring can have a round, square, oval or other cross section.

A channel is preferably formed between the two components, and in particular at least a plurality of rotating bodies are provided in the channel.

The basic body comprises, in particular, a base plate and a holding housing. A shaft can be rotatably held on the holding housing. In particular, a magnetorheological medium is held between the basic body and the shaft. The holding housing may be the housing of the minicomputer.

In all configurations, a gap or a channel, which is at least partially filled, in particular, with a magnetorheological medium and, in particular, a magnetorheological fluid, can be provided between the rotating unit and the basic body. A controllable magnetic field which acts on the channel can be used to influence a coupling intensity between the rotating unit and the basic body, with the result that a coupling intensity and therefore the rotational resistance can be varied during rotation of the rotating unit by deliberately temporally generating and/or switching off the magnetic field.

For example, a considerable haptic distance can be felt if a rotational resistance or a torque needed to rotate the rotating unit is changed from 0.02 Newton meters to 0.04 Newton meters.

In preferred developments, the rotating unit is connected to the shaft in a rotationally fixed manner. The shaft is in particular rotatably supported at one end on the base plate. The basic body can have in each case a circumferential running surface for the rotating bodies adjacent to the base plate. At least one running surface in particular has at least one circumferential groove for the rotating bodies. The running surface of the shaft can be formed on an enlarged circumferential ring and have an increased diameter. In particular, the circumferential ring is separated, on an end face, from an end face of the holding housing by a gap. A free axial distance in the gap is preferably considerably shorter than a free radial distance at the channel between the rotating unit and the basic body.

A holding space which may be annular, for example, is preferably formed in the holding housing. An electrical coil is preferably arranged in the holding space. The electrical coil is arranged, in particular, substantially axially adjacent to the rotating bodies.

It is preferred for the holding housing and the circumferential ring to consist of a material with better magnetic conductivity than the base plate.

In particular, the two components of the transmission apparatus can be coupled to one another selectively and in a controlled manner.

In the sense of this application, the term "coupling intensity" is understood as meaning the coupling force and/or the coupling torque between the two components. If linear force transmission is desired, for example, the coupling intensity corresponds to the coupling force. If a torque is intended to be transmitted, the coupling intensity is used to mean the coupling torque.

The viscosity of the magnetorheological medium can preferably be changed by the field, as a result of which it is possible to influence the displacement work needed for the relative movement of the components and/or rotating bodies which can be moved relative to one another.

Displacement work is also understood as meaning the displacement force needed to displace the medium during a relative movement.

A considerable and surprising advantage of the magnetorheological transmission apparatus used results from the considerably intensified effect of the magnetic field from the magnetic field generation device in the channel. The acute-angled region containing the medium acts as a lever and therefore virtually like a strong mechanical lever transmission, the lever considerably intensifying the effect of the magnetic field by a multiple. As a result, either the field strength of the magnetic field generation device can be reduced with an effect which remains the same or else the effect of the magnetic field is intensified with a field strength which remains the same or the effect is even considerably increased with a reduced field strength. The acute-angled region containing the medium increases the effect by a multiple, in particular, if the magnetic field acts on the medium. In particular, the magnetic field acts at least occasionally on the acute-angled region which contains the magnetorheological medium or is formed.

As a result of the fact that the rotating body is arranged at a considerable free distance from the at least one component, a macroscopic wedge which can be used to transmit strong clutch or braking torques can be produced. Considerable construction volume can be saved as a result of the completely surprising multiplication of the effect. The effect used is based on the wedge formation (cluster formation) and not only the magnetorheological concatenation of individual particles. The typical reaction time for the wedge formation requires several milliseconds, while individual particles are concatenated according to the MRF effect already within approximately 1 millisecond. This time duration, which is multiple times longer, is due to the wedge formation. Such a considerable intensification of the effect was not expected. The longer reaction time of, for example, 5, 10, or 20 milliseconds is more than sufficient in many applications.

The channel can also be an intermediate space or a space which is open on four sides.

An acute-angled region of the channel is defined as that channel region which appears approximately to have an acute angle in at least one cross section through the shape of the rotating body and components. The sides of the region do not have to be straight and can also be curved and/or have another contour. The acute-angled region defines that part of the channel in which the rotating body and components are at the shortest distance from one another, in particular, or touch, and the adjoining region, in which the surfaces of the rotating body and components move away from one another.

Under the effect of a magnetic field, the acute-angled region containing the magnetorheological medium is formed, in which a considerably increased viscosity is present.

Excellent torque to weight ratio, which can be greater than 100 Nm/kg, is possible.

A rotating body is preferably set into a rotational movement by a relative velocity in relation to at least one component. It is possible for the circumferential velocity of the rotating body to be equal to the relative velocity in relation to the component. However, it is also possible for the circumferential velocity of the rotating body on its outer surface to be greater than or less than the relative velocity. In particular, it is possible for the circumferential velocity of the rotating body on its outer surface to be less than the relative velocity of the rotating body in relation to the component.

The rotating body can be designed to be substantially rotationally symmetrical around at least one axis of rotation. It is likewise possible for the rotating body to be designed to be rotationally symmetrical around a plurality of axes of rotation. For example, the rotating body can be in the form of a sphere or ellipsoid. It is also possible for the rotating body to be in the form of a cylinder, roller, or generally a rolling body. In particular, an approximately cylindrical configuration has proven to be advantageous since, in the case of a cylindrical rotating body, for example, the acute-angled region containing the medium forms over the entire width of the rotating body and is thus substantially wedge-shaped. In these and other configurations, the acute-angled region has a wedge shape.

However, it is not necessary for the rotating body to be rotationally symmetrical. Rotating bodies having elliptical or egg-shaped cross sections or rotating bodies having indentations like golf balls or having regular or irregular indentations and/or protrusions can also advantageously be used. The surface of the rotating bodies can be smooth, but does not have to be. Since the rotating bodies are not used to mount and support the components relative to one another, a symmetrical and/or smooth surface is not necessary. Rotating bodies having a rough and/or irregular surface can even be advantageous since the wedge effect is intensified. Increased wear does not occur since the rotating bodies are not used for mounting and transmitting load-bearing forces.

The effect is preferably not intensified solely due to intensification or bundling of the magnetic field, but rather above all also due to the particles clustered in front of the rotating bodies or rollers and the compaction thereof. Owing to the magnetic field, the particles cannot move away and thus compact more rapidly to form a wedge. The wedge can be externally controlled easily via switch. The advantage in the case of magnetorheological fluids such as MRF is that the wedge can disengage again by canceling the magnetic field. The wedge can be influenced using the magnetic field—without mechanical movement or force introduction. It has proven to be advantageous for targeted influencing and reliable control that the free distance between the rotating body and the component is greater than a multiple of the particle diameter.

The diameter of the particles of the magnetorheological medium is between 1 μm and 10 μm, in particular. The typical mean diameter of the particles of the magnetorheological medium is the arithmetically averaged diameter of the particles which are larger than the smallest percent and which are smaller than the largest percent. As a rule, this value corresponds to the mean value of the diameters of the largest and the smallest particle, that is to say 5.5 μm in the selected example. If, however, for example, a very small number of even smaller particles are present, this does not change the typical mean diameter thus determined. The same applies if, for example, individual particles having a diameter of 10.5 μm or 11 μm are to be included.

The free distance between the rotating body and the component is preferably greater than 30 μm and, in particular, less than 300 μm. The typical mean diameter of the particles is preferably between 3 μm and 7 μm. The free distance between the rotating body and the component is preferably greater than 70 μm and, in particular, less than 250 μm.

The acute-angled region advantageously wedges the two components, which are freely movable relative to one another without a magnetic field, upon application of a magnetic field. A mechanical wedge in the form of a separate fixed part is not required for this purpose.

The acute-angled region is preferably provided between the body and one component in such a manner that the acute-angled region tapers in the direction of the relative movement of the component relative to the rotating body. If a cylindrical rotating body rolls on a flat surface of one component, the acute-angled region forms in a wedge shape in front of the rotating body. A wedge which is concatenated as a whole and inhibits the relative movement of the rotating body to the component arises due to the concatenation of the particles in the medium.

The rotating body and, in particular, each rotating body is particularly preferably in the form of a separate part between the first and second components. It is then preferred for one component, as the outer component, to surround the other component, as the inner component. For example, a (drive) shaft can be provided as the inner component. The other or outer component can be used for braking, for example, and can radially surround the shaft. The rotating bodies can be provided between the shaft and the outer component. It has been shown that rotating bodies which rotate around their own axis are considerably better for achieving the wedge effect. Finished bearing shells are not necessary. The transmission of a clutch or braking torque functions independently of the quality of the rolling surfaces.

At least one separate bearing or roller bearing is provided for mounting the two components. The rotating bodies ensure, with the wedge effect, the transmission of the desired torques, while the roller bearing or bearings ensure(s) the defined guiding and support of the two components and the uniform running gap.

In all configurations, the free distance is preferably at least twice, five times and, in particular, ten times as great as the largest typical particle diameter. In specific configurations, a free distance of between approximately five times and, in particular, ten times and twenty times the largest typical particle diameter has proven to be advantageous. In the case of larger free distances, the maximum transmittable torque is reduced again since the wedge effect subsides. In the event of excessively short free distances, a blockade can occur even without a magnetic field. In addition, disengagement of the wedge after the shutdown of the magnetic field then cannot always be ensured.

The mean particle diameter is understood as meaning the arithmetic mean of minimum and maximum particle diameters. Most MRF have magnetically polarizable particles which have a size distribution of between approximately 1 µm and 10 µm. The mean particle diameter is 5.5 µm in this example. In the case of variable size distributions, the largest typical particle diameter is understood as meaning a particle diameter which is exceeded by only fewer than 1% of the particles. The largest typical particle diameter is somewhat less than 10 µm in the mentioned example, so that 10 µm can be presumed to be the largest typical particle diameter here.

The free distance is preferably greater than 1/500 and preferably greater than 1/250 and, in particular, greater than 1/100 and particularly preferably greater than 1/50 of a diameter of at least one rotating body, and, in particular, the free distance is less than 1/10 and, in particular, less than 1/20 of the diameter of the rotating body.

The free distance is preferably greater than 1/300 of the external diameter of the inner component and/or greater than 1/500 of the internal diameter of the outer component. The free distance is preferably greater than 30 µm and in particular less than 200 µm.

Variations by +/−20% are preferably possible in the case of all numeric specifications. A particle is understood below as meaning a magnetically polarizable particle.

If oversized rotating bodies and/or shaft diameters are used, other distances can be advantageous. An advantage of this magnetorheological transmission apparatus having at least two components which can be coupled is that the wedge formation is manufacturing tolerant, that is to say, for example, manufacturing-related and installation-related differences in gap heights, surfaces, dimensions and also thermal expansions or load-related shifts of components have a minor influence thereon and cause negligible torque or force differences.

For example, a structurally related change of the gap within certain system limits can also be detected by sensors and worked out by field adaptation, for example.

In preferred configurations, the rotating body is part of the first or the second component. This means that the rotating body, which is in the form of a rotating body, for example, is part of the first component and rolls on the second component, for example. The rotating body can also be without mechanical connection to both components, however.

In the acute-angled region, which is wedge-shaped, for example, the ferromagnetic particles concatenate in the medium upon application of an external magnetic field and result in a locally more solid structure which opposes the further relative movement between the rotating body and the adjacent component. The particles in the wedge-shaped part can be additionally compacted in the direction of movement in front of the rotating body by the rolling movement of the rotating body. However, depending on the design of the rotating body, this compaction can also be performed by pitching, tilting, or other movements relative to a component.

For example, if the rotating body rolls on the surface of one component and such an acute-angled region forms in front of the rotating body, particles in the medium are entrained and set into rotational movement by the outer surface due to the rotational movement of the rotating body, but the hardening acute-angled region strongly opposes such a rotational movement. The acute-angled region in wedge shape results in a force on the rotating body away from the component. Such a force and a movement resulting therefrom can optionally also be used for fine adjustment purposes. A rotational movement can preferably be converted into an axial displacement of the rotating body by the acute-angled region in wedge shape when the magnetic field is activated. The rotating body is thus virtually caused to float by the particles. It is also possible to provide the rotating body or a component with thread-shaped notches, for example, or to mount them at an incline relative to one another, in order to change the effective direction of the resulting force or to further increase the achievable force transmission. A linear movement can thus be converted into a rotational movement using a type of threaded rod. The relative movement is inhibited by applying a field.

It is likewise preferred for the rotating body to be in the form of a separate part between the first component and the second component. Such a configuration can be particularly advantageous since two acute-angled regions or wedge-shaped regions can occur between the rotating body and the two components. If the rotating body practically rests against the first component on one side and practically rests against the second component on the other side, acute-angled regions which are subjected to the magnetic field from the magnetic field generation device form on both sides. The effect is thus increased. It is not necessary for this purpose for the rotating body to rest completely against the first component or the second component. A small gap remains between the rotating body and the respective component. The size of the gap is dependent, inter alia, on the properties of the medium. In particular, the size of the gap can be at least five times and preferably at least ten times or twenty times a typical or mean particle diameter.

The ferromagnetic particles consist, in particular, of carbonyl iron powder. The fluid can be an oil, for example.

It is also possible for magnetorheological and electrorheological media to be used jointly. The use of other media which are influenced and concatenated, for example, by corresponding fields is also conceivable. It is likewise possible to use media which change their rheological properties depending on other physical variables such as temperature or shear velocity.

The channel can be completely or also only partially filled with the medium. At least the acute-angled region of the channel is preferably filled with the medium.

In all configurations, the first and/or second component can be rotationally symmetric. For example, the components can each be in the form of plates or cylindrical bodies, between which rotating bodies are provided, in order to increase the effect of the magnetic field from the magnetic field generation device accordingly through the wedge effect.

In all configurations, it is preferred for the magnetic field to run through the rotating body and, in particular, substantially transversely to the relative movement of the components relative to one another and from one component to the other component at least partially through the rotating body. Such a configuration has proven to be particularly effective since the effect of the magnetic field at the transition points from the rotating body to the walls of the channel is particularly strong. Depending on the acting magnetic field, it is therefore advantageous if the rotating body is at least partially magnetically conductive. In particular, at least one component and in particular both components and/or the at least one rotating body is/are made at least partially of a ferromagnetic material. The relative permeability is preferably greater than 500. The relative permeability of the material can also be 1000, 2000, or more. Rotating bodies made of a ferromagnetic steel, such as ST37, are possible, for example.

The material can be demagnetized by a damped magnetic alternating field, so that a lower base torque is achieved without a residual field.

In all configurations, it is preferred for the magnetic field generation device to comprise at least one permanent magnet and/or at least one coil. It is also possible to use one or more permanent magnets and one or more electrical coils.

It is possible and preferred to permanently change the magnetization of the permanent magnet by means of at least one magnetic pulse from an electrical coil. In such a configuration, the permanent magnet is influenced by magnetic pulses from the coil such that the field strength of the permanent magnet is permanently changed. The permanent magnetization of the permanent magnet can be set by means of the magnetic pulse from the magnetic field generation device to an arbitrary value between zero and the remanence of the permanent magnet. The polarity of the magnetization is also variable. A magnetic pulse for setting a magnetization of the permanent magnet is, in particular, shorter than 1 minute and preferably shorter than 1 second and the length of the pulse is particularly preferably less than 10 milliseconds.

As an effect of a pulse, the shape and strength of the magnetic field are permanently maintained in the permanent magnet. The strength and shape of the magnetic field can be changed by means of at least one magnetic pulse from the magnetic field generation device. The permanent magnet can be demagnetized by a damped magnetic alternating field.

AlNiCo, for example, is suitable as a material for such a permanent magnet with variable magnetization, but other materials having comparable magnetic properties may also be used. In addition, it is possible to produce the entire magnetic circuit or parts thereof from a steel alloy with strong residual magnetism (high remanence) instead of a permanent magnet.

It is possible to use the permanent magnet to generate a permanent static magnetic field which can have a dynamic magnetic field from the coil superimposed on it in order to set the desired field strength. The current value of the field strength can be varied arbitrarily by the magnetic field from the coil. It is also possible to use two separately controllable coils.

In all configurations, it is preferred to provide at least one control device. It is also possible to use an energy store, for example a capacitor, to store at least a fraction of the required energy. At least one sensor or a plurality of sensors can be used to detect relevant data, for example the relative velocity of the components in relation to one another or the prevailing field strength and the like. It is also possible to use a temperature sensor as the sensor, which triggers an alarm if predetermined temperature conditions are exceeded, for example. A rotational angle encoder can advantageously be used to have data relating to the angle position of the components in relation to one another at any time.

In all configurations, it is preferred that the permanent magnet at least partially consists of a hard magnetic material whose coercive field strength is greater than 1 kA/m and, in particular, greater than 5 kA/m and preferably greater than 10 kA/m.

The permanent magnet can at least partially consist of a material which has a coercive field strength of less than 1000 kA/m and preferably less than 500 kA/m and particularly preferably less than 100 kA/m.

The magnetorheological transmission apparatus is part of an operating device which comprises, in particular, an operating or control knob or the like.

The rotating body and at least one component can touch at at least one point or on at least one line. It is possible and preferred for the rotating body to be at rest relative to at least one component.

The rotating body can preferably move relative to at least one component, for example in the form of a rotational or tilting movement.

The field strength can have a strong gradient depending on the respective distance between the rotating body and components.

The field strength preferably increases in the acute-angled region between the rotating body and components toward the region having the shortest distance.

The need for maintenance is low since few and simple parts are used. If necessary, the maintenance can be carried out by simply replacing the magnetorheological fluid. The structure is simple and robust and power feedthroughs are not required. In addition, the energy requirement is lower than in the prior art because the wedge effect substantially contributes to influencing the relative movement of the components. It is possible to achieve a torque/weight ratio of >100 Nm/kg.

In magnetorheological clutches or brakes without a wedge effect, the magnetic field poles move relative to one another and generate shear forces (direct shear mode) in the interposed MR fluid. The shear forces vary depending on the magnetic field. No magnetic field means no or low shear forces (no chain formation in the MRF), maximum magnetic field means maximum shear forces and therefore maximum braking force or braking torque. In simplified form, the magnetic field and shear forces are proportional.

In the present invention, through appropriate design of the individual components, dimensioning, and field introduction, a very advantageous behavior which deviates therefrom can be provided. This advantageous behavior is expressed in that a substantially lower magnetic field, and therefore a lower current intensity, is needed to maintain the acute-angled embodiment or the MR fluid wedge than is needed for the initial generation of the wedge. This is because the particle cluster no longer falls apart so easily once it has first been accumulated and has been quasi-mechanically compacted by the special movements fundamental to this invention under the influence of a correctly introduced magnetic field. As a result, for example, after a corresponding time for achieving this state, a braking torque can be maintained using the fraction of the magnetic field or electrical power (coil current), which is advantageous in terms of energy.

If clutches having magnetorheological fluids according to the prior art are loaded beyond the maximum transmittable clutch torque, individual particle chains begin to break apart, whereby slip or slipping through results. The maximum clutch torque is maintained, however, or sometimes even slightly increases, and the clutch does not disengage. Depending on the application, this can be undesirable, for example if a drill bit of a drill jams during drilling.

In the present invention, through appropriate design of the individual components, dimensioning, and field introduction, a very advantageous behavior which deviates therefrom can be provided. This advantageous behavior is expressed in that, if a maximum force is exceeded between the moving parts, the wedge (material cluster) generated by the magnetic field is suddenly pressed through the gap (material displaced) and the force decreases suddenly at the same time. On account of the relative movement resulting therefrom and the high applied force, a new wedge does not form, as a result of which the relative force remains low. In the case of overload clutches, this behavior is very advantageous. The maximum force (triggering force) or the maximum torque (triggering torque) can be preset via the magnetic field.

Furthermore, demixing, sedimentation, and centrifugal force problems are reliably avoided since continuous mixing of the particles in the medium is achieved by the rotating bodies which are rotating.

On account of the substantially higher transmittable torques and forces, it is possible to implement clutches, brakes or the like having substantially smaller diameters. On account of the low MRF channel height and the rotational movement of the rotating bodies, demixing is practically not relevant in the case of the present invention.

The invention can be used in manifold ways. Use in vehicles or in machine tools or household appliances is likewise possible.

The invention can also be used in the case of a three-dimensional movement. The rotation and pendulum movement can thus be restricted or blocked by the MRF wedge. The acting torque is continuously adjustable and switching times in the range of a few milliseconds can be achieved. The structure is simple and no mechanically moving parts are required for varying the torque. A further advantage is that almost noiseless operation is possible. The additional costs are low and a magnetorheological transmission apparatus according to the invention can be designed to be operationally reliable if, for example, a permanent magnet with remanence is used to set a magnetic field. The wedge effect enormously intensifies the effect, with the result that a smaller installation space is achievable.

In all configurations, the rotating bodies do not have to be smooth, but rather can have rough or uneven surfaces.

The minicomputer can also be used as a haptic operating device. Use is possible as controllers for crane operation or the like. In this case, the rotation can be controlled more stiffly, depending on the load. It can also be controlled on the basis of the load height.

The use in "force feedback" applications or in "steer by wire" applications is also of interest. The use of the minicomputer on operating elements in vehicles, automobile radios, stereo systems etc., generally: infotainment, is also possible.

In all configurations, it is also possible to use magnetic seals to seal an apparatus according to the invention, in addition to a seal with a sealing lip. The seal can be produced via a permanent magnet here. Advantages of such a configuration are smaller base forces, freedom from wear, and the permissibility of greater manufacturing tolerances. In addition, there is a defined overload behavior since a defined breakthrough occurs if the overload is exceeded. It is possible to use such a seal in front of or behind an apparatus according to the invention or to use it in front and behind.

A significant advantage of the magnetic seal is the very low friction; however, it can be necessary to use yet another seal since such a seal possibly only holds back MRF particles and allows oil as the base fluid to pass through the gap over time, for example. Therefore, such a magnetic seal can be used as an outer seal in order to hold back MRF particles. A further seal, for example a conventional seal, then only seals off the carrier medium.

A movement of the magnet can be used to achieve lubrication in the MRF, as well as material transport and cooling, for example via hydrodynamic effects. In addition, a flow away from the seal can be achieved and pressure differences can be dissipated.

In order to set the play between two parts, for example, or to remove play from a design and to compensate for manufacturing tolerances, for example, it is possible to use a force or an axial force and/or a radial force which is caused by an MRF wedge effect.

In all configurations, it is preferred to provide a settable permanent magnetic field strength via remanence. In preferred embodiments, a bearing having a magnetorheological transmission apparatus according to the invention has no or only minimal residual magnetism (remanence) itself. Otherwise, a position-dependent counterforce of different strength can occur since the parts move in relation to one another.

In advantageous configurations, the remanence material should be arranged in a general region of the bearing which is permeated, in particular, by the magnetic field in a position-independent manner, thus, for example, the inner shaft or the outer shell etc.

However, it is also preferred to use the effect of the position-dependent magnetization by using, for example, the inner running surface having remanence in order to generate specific latching torques, for example. This can be performed, for example, for haptic feedback about variable latching torques with respect to their strength, the rotational angle, or the end stop or the like. Not all bearing balls have to be ferromagnetic, depending on the desired setting capability.

It is also possible to provide a magnetorheological transmission apparatus having a design deviating from the conventional bearing structure. For example, the direction of the magnetic field can also be oriented at least partially or completely approximately parallel to the axis. At least partial orientation parallel to the rotational direction or movement direction or in the tangential direction is also possible. It is also possible for the entire magnetic circuit to be arranged nearly or completely in the interior or on the end face.

The material of the magnetorheological transmission apparatus does not have to be completely ferromagnetic; depending on the desired application or magnetization, it can be advantageous if individual parts of the magnetorheological transmission apparatus are not ferromagnetic or are only partially ferromagnetic.

Depending on the application, it is also conceivable to manufacture at least one part from different materials, to obtain locally differing magnetic properties.

The minicomputer preferably functions with a magnetorheological transmission apparatus with a wedge effect. The position or the rotational angle of the rotary knob can be determined via the rotary encoder and the rotational resistance can be varied in a wide range. Thus, for example, a haptic interface with variable latching torques and arbitrarily settable end stop can be constructed, which changes its properties depending on the currently selected menu. A low or high torque and/or a small or large latching pattern/ripple and also a variable latching pattern—depending on the menu to be operated—can be set. The profile of the torque increase and decrease can be set or varied depending on the situation, for example as a square-wave, sinusoidal, sawtooth, or arbitrary profile. A stop can also be simulated. The stop can be hard or can have a predefined or situation-dependent torque profile. The torque profile can be different during rotation in one direction than during rotation in the other direction.

The rotating unit or the rotary knob as one component is preferably fixedly connected to the shaft as the other component which is in turn rotatably mounted in the housing. The relative movement or relative position is detected via a rotary encoder, for example via a magnetic, optical or (via buttons) mechanical incremental encoder. A potentiometer with sliding contacts can also be used, but only specific rotational angles are usually permissible using said potentiometer.

A sealing ring is advantageous so that the magnetorheological fluid remains in the housing. The seal can also only consist of permanent magnets or a combination of a permanent magnet and a conventional seal.

The inner region, i.e. the volume enclosed by the seal and housing, is at least partially filled with a magnetorheological fluid.

The housing is preferably designed as a pot, i.e. it is closed on one side. Only one sealing ring is thus required. A continuous shaft (two-sided shaft) is also conceivable.

The coil can generate a magnetic field, wherein the magnetic circuit is closed via the housing, the shaft, and the magnetorheological transmission apparatus. The magnetic field required for the wedge effect can thus build up in the magnetorheological transmission apparatus. The coil is advantageously fixedly connected to the housing, which makes the cable routing easier.

The structure is robust and can be designed such that almost no magnetic stray fields are generated outside the housing. However, many other structure variants are conceivable, which can have specific advantages depending on the application.

For example, the coil can also be arranged outside the housing, the magnetic field then acting on the magnetorheological transmission apparatus through the housing. No mechanical connection is necessary here between the coil and the housing; the coupling of the magnetic circuits is sufficient to influence the magnetorheological transmission apparatus in the housing. In particular, the coil does not have to be permanently on or in proximity to the housing and can be designed such that it can be removed from the housing as a separate unit. Permanent magnets can also be provided in the magnetic circuit.

In a preferred embodiment, the rotary knob can be electromagnetically driven, for example, and can also actively exert a force (force feedback) in order to be able to statically generate a specific countertorque. In this design, a better torque to installation space ratio is achieved than in many designs according to the prior art. In addition, the production costs are low because of the simple structure since, for example, the rolling surfaces of the components do not have to be highly precise in haptic applications and also generally do not have to withstand high speeds and a large number of revolutions. In general, the magnetorheological transmission apparatus described here has a very low base friction (OFF state). A battery and a control command transmission unit (radio, WLAN, Bluetooth, antenna) are preferably also integrated in the actuator or rotary knob. The haptic knob can then be placed anywhere and does not require a wired control connection or current connection. The MRF wedge principle requires very little current (power) in relation to the torque. It is therefore also highly suitable for battery operation or for wireless energy supply. Both the required energy and control commands and also, for example, measured values from sensors such as rotational angles can be transmitted wirelessly.

A preferred embodiment manages without a battery and receives the energy required for the function by means of inductive coupling. Embodiments which acquire the energy required for operation directly from the environment and buffer it locally (energy harvesting) are also particularly preferred. Thermoelectric generators, solar cells, elements which convert vibrational energy into electrical energy, and others, as well as corresponding local energy stores are possible for the energy conversion. It is also conceivable to use the movement of the magnetorheological transmission apparatus itself to generate energy.

If a magnetic field is applied to the magnetorheological transmission apparatus at least partially via a permanent magnet, and the magnetization of the magnetic field is permanently changed by at least one magnetic pulse from at least one electrical coil, several advantages result. In specific cases, weight and space advantages can be achieved, for example by using the remanence and the pulsed operation of a coil which does not always have to be energized. The wires of the coil can be dimensioned to be thinner and lighter because they are each energized only for a short operating time. This can result in advantages in the case of weight, power demand, space requirement, and costs.

Therefore, it can be advantageous in specific applications that, due to the pulsed operation of the electrical coil, it can be significantly smaller than if it must be designed for a switched-on duration of 100%. The heating of the coil usually does not play a role in pulsed operation since short-term power loss peaks are buffered by the intrinsic heat capacity of the coil and the parts surrounding the coil. Very high current densities in the turns can thus be tolerated or thinner lines can be used, as long as the mean power loss remains acceptable over longer periods of time.

In the case of a smaller coil, the magnetic circuit surrounding the coil can also usually be smaller, which is why a comparatively large amount of installation space, material, weight, and costs can be saved. Only the energy expenditure for a single pulse increases here, but this can be very well tolerated depending on the application. Overall, a large amount of energy can nonetheless be saved in comparison with a continuously energized coil.

In all configurations, it can be possible to supply the power in a wireless manner. The power can be supplied, for example, from the current source to the power electronics or from the power electronics to the coil via electrical, magnetic, or electromagnetic coupling, for example a radio link. When used in a bicycle, the power can be supplied externally via a docking station, for example. It is also possible to supply energy to all loads (forks, rear shock absorbers, display) via an energy source on a bicycle, for example. The power can also be supplied similarly in the case of a ski boot, ski, mobile telephone, or to the sensors.

An energy supply via radio can possibly have worse efficiency than conventional wiring. In addition, the energy transmission and its range can be limited. However, such disadvantages do not interfere depending on the application. It is advantageous that no wear of the contacts occurs. The energy transmission is usually secure from polarity reversal and short-circuit-proof since only a limited power is present on the secondary side. Furthermore, cable breaks are not possible and the apparatus is more movable as a whole.

In such configurations, however, it is advantageous to buffer the energy for at least one pulse in a capacitor or energy store. The energy supply of the system can thus have a smaller power since short-term power peaks of a pulse are absorbed by the capacitor. In addition, a discontinuous or pulsed energy supply can also be used.

One possible expansion stage of the present invention is a fully autonomous system which is wirelessly supplied with energy. For example, use on a bicycle is conceivable, in which case the system is supplied with energy by at least one small magnet on a tire.

In general, arbitrary "energy harvesting" units can thus be used to supply energy, for example solar cells, thermoelectric generators, or piezoelectric crystals. Elements which convert vibrations into energy can thus also be used very advantageously for the supply.

An embodiment similar to that in an electric toothbrush is also conceivable, in which the energy is supplied by inductive coupling. For example, the rechargeable battery can be inductively charged, without damaged cables or corroded or soiled contacts obstructing the charging process. Energy can be transmitted over longer distances via magnetic resonance.

The power supply of the remanence pulse can be effected via induction, as in the case of electric toothbrushes. The combination of the MRF wedge principle with remanence is particularly power-saving and advantageous.

A loudspeaker or a noise generating unit can also be integrated or assigned. This is advantageous since the rotary knob as the MRF wedge knob is mechanically noiseless per se. Both the rotation without and also with a latching pattern and/or the virtual stops are noiseless per se. The generation of the MRF wedge for a torque increase or to generate a latching pattern is likewise noiseless per se. By means of the noise source, such as a loudspeaker or a piezoelectric loudspeaker, for example, clicking can be associated with the virtual latching pattern at each latching position. The type, volume and duration of the noise can be individually assigned, but can also be changed or turned off if the user wishes.

Therefore, the torque, the latching pattern, the stops and the noise are programmable or adaptive. The noises can also be generated via external loudspeakers, for example standard loudspeakers in the automobile or the loudspeakers of the hi-fi system in the home.

The haptic knob can therefore practically replace the mouse wheel of a computer mouse. In the case of the latching pattern, not only the angular distance of the latching pattern can be settable, but rather also its profile shape, thickness etc. A latching pattern characteristic curve can therefore more or less be predefined.

The haptic rotary knob can also be mounted on an operating surface or on a screen. So that the display does not have to be removed for fastening the knob, it can consist of an upper part on the display and a lower part below the display. Data transmission via induction or the like, for example, is preferably provided. The display can thus be produced more cheaply as a surface.

It is also possible for an MRF haptic knob to also be pressed. The pressing can also act through an MRF whose properties are variable via a magnetic field.

The screen displays the information to be set which changes depending on the application. The function of the haptic knob is adapted thereto. In one case, adjustment is made by means of a latching pattern (for example setting the volume; a volume scale which can also have a logarithmic scale appears on the display).

In another case, adjustment can be made between two positions without a latching pattern, but with variable torque, thus, for example, between the 8:00 position and the 16:00 position, in which case an increasing torque can be provided in each case before the end position. The latching pattern can also be used to approach defined positions, for example if a name input is requested.

The display can also be in the form of a touchscreen. Menu items can thus be rapidly selected and fine adjustments can be made by means of the rotating actuator. For example, it is not desirable in the case of automobiles to control the volume of the radio via touchscreen since the driver would otherwise always have to look for a long time at what and where he is currently adjusting, which distracts him. He also finds the rotating actuator with a brief glance or without looking at it.

The adjustment using a mechanical actuator is also simpler and safer than via a touch display when cycling, for example. This is also true, in particular, if the cyclist is wearing gloves, for example, whereby the operation of a touch display is difficult or even impossible.

A combination of a display or touch display and a mechanical rotating actuator with variable torque/latching pattern is also possible. Such minicomputers can also be of interest outside, for example, in the case of controllers for industrial installations, remote controls for televisions or radio vehicles such as toy helicopters, for example, and on PCs and games consoles, and control consoles for military applications (drone aircraft, rockets).

It is also possible for a haptic rotary knob with a display to replace the current computer mouse.

It is possible for the rotary knob or the actuator to be countersunk in the normal state and to be extended only if needed.

It is also possible to embody such a structural unit as a slide controller, in particular in combination with a linear MRF wedge unit.

It is also possible to equip a magnetorheological transmission apparatus with one or more poles and one or more elevations. In all configurations, it is possible for elevations or the like, which protrude from one component in the direction of the other component, for example, to be provided between the two components of the magnetorheological transmission apparatus.

Such a configuration is possible and preferred both in the case of rotational mobility and in the case of linear mobility of the two components with respect to one another.

Only one elevation can be provided or a plurality of elevations can be provided. It is possible for a ball or a roller or another rotating body to be arranged on at least one elevation and to be at least partially accommodated by the elevation.

If elevations are provided on one component, it is preferred for at least one pole or at least one magnetization unit or at least one magnet or one coil to be provided on the other component. The number of magnetization units or poles can be 1 or else greater.

The shape of the elevations can fundamentally be arbitrary and can be semicircular, pointed or blunt, for example. The holding region of rotating bodies is preferably accordingly rounded.

One or more magnetization units or poles can be in the form of an electrical coil plus core or a permanent magnet or can consist of remanence material or a combination thereof.

The distances between individual elevations and/or magnetization units are preferably approximately uniform, but can also be arbitrary.

The depth, i.e. the radial extent or the axial extent, of individual elevations or magnetization units with respect to others can be different.

The field strength which is applied to or acts on the individual magnetization units can, in particular, also vary at the same time.

The speed of the rotating bodies does not have to be equal to the rolling speed, and can also deviate therefrom, for example by step-down or step-up transmissions. The inner part which is formed by the elevations, for example in the shape of a star, can be mounted off-center to the outer part.

Such a magnetorheological transmission apparatus can be used, for example, as a haptic knob with a latching pattern or in furniture and drawer guides with positions.

The magnet or each magnetization unit or the inner part and/or the outer part can also consist of remanence material.

Since magnetorheological fluids concatenate very rapidly upon the application of a magnetic field, it can be sufficient in the normal state, for example when driving an automobile, if the magnetic field is turned off. It is generally entirely sufficient to only turn on the field when a first rotational angle change is initiated. A significant amount of energy can thus be saved.

Alternatively, a base torque can be implemented with remanence. When a rotational angle change is registered, a dynamic magnetic field can be built up, which can also pulsate to generate a virtual latching pattern.

In configurations in which the remanence is utilized, the magnetic field for the remagnetization can be externally applied. A corresponding coil, which acts through a cylinder, for example, can be used for the remagnetization. A selected menu item is preferably activated when the haptic operating device and/or the rotating unit is/are pressed. The display unit can be touch-sensitive (for example capacitive, inductive etc.), such that a menu item can be selected by touching it with the finger or the like, for example. In all of these configurations, it is possible and preferred for both pressing of the haptic operating device and operation using the finger to be possible.

The display unit may be an LCD, TFT, IPS, Retina, Nova, White Magic, OLED, AMOLED or other screen type.

The method according to the invention is used, in particular, to operate a minicomputer and preferably a smartwatch. In this case, a haptic operating device having a rotating unit is used and selectable menu items are displayed on a display unit. A menu item can be selected by rotating the rotating unit. A rotational resistance is dynamically changed during rotation of the rotating unit. This makes it possible to generate a variable and, in particular, haptic latching pattern.

The method according to the invention has particular advantages. A considerable advantage of the method according to the invention is that it becomes possible to dynamically change the rotational resistance upon actuation of the rotating unit. As a result, the user can be made aware of properties haptically and therefore perceptibly. For example, an end of a list can be indicated in a list of menu items to be displayed. For this purpose, the rotational resistance can become stronger upon reaching a list of menu items, for example.

A haptic latching pattern having latching points is preferably dynamically generated during rotation of the rotating unit. In this case, the rotating unit latches at a number of haptically perceptible latching points, in particular during rotation. For this purpose, a local minimum of the rotational resistance can be respectively present at the latching points, for example. Adjacent to the latching points, a local maximum of the resistance may be present or a plateau is generated there and has a constant rotational resistance until a next latching point with a local minimum of the rotational resistance is reached at a different angle.

The invention makes it possible to easily operate a minicomputer having an accordingly small display. In this case, the display unit may be touch-sensitive. Operation may then be possible by touching the touch-sensitive display unit. It is also possible to operate the minicomputer by rotating the rotating unit. In this case, when selecting a contact from a list of contacts, for example, each individual contact can be displayed as a menu item. The individual contacts are then passed through during rotation of the rotating unit.

It is possible for the rotating unit to have an actuation sensor or for the rotating unit to be assigned an actuation sensor for axial forces and/or displacements, with the result that a function of the minicomputer is possibly initiated upon axially pressing the rotating unit. For example, the currently selected menu entry or the currently displayed menu entry can be selected upon pressing the rotating unit in the axial direction (or upon pulling the rotational unit in the axial direction).

If the currently selected menu entry corresponds to a contact, the individual contact information (telephone numbers, addresses etc.) is displayed and can possibly be processed.

If, in contrast, the displayed menu entry or menu item corresponds to a function to be performed, the currently selected function is activated upon pressing the rotating unit in the axial direction and/or upon pulling the rotating unit in the axial direction. For example, a submenu can be called up for this purpose or the function is a function which can be performed directly, for example the writing of a text message or an email or the starting of a program.

The communication unit of the minicomputer is used, in particular, to start and provide data connections to a local area network or to the Internet or to determined and/or previously selected computers or networks or the like.

The minicomputer can advantageously be coupled to a handheld computer, such as a smartphone or a laptop or the like, in order to interchange data.

A latching point or at least one latching point or a multiplicity of latching points is/are particularly preferably generated by deliberately generating a magnetic field at a channel which is at least partially filled with a magnetorheological medium.

In the case of the minicomputer and also in the case of the method, an angular position of the rotating unit is preferably detected and the rotational resistance is preferably set on the basis of the detected angular position, in particular via an intensity of the magnetic field.

An end stop is preferably dynamically generated in at least one direction of rotation. In this case, the rotational resistance is preferably set to be considerably stronger at the end stop than at other rotational angles and/or at latching points.

In particular, a latching point of a determined angle position is generated by virtue of a stronger rotational resistance being generated at angular locations adjacent to the determined angle position than at the angle position determined for the latching point.

An angular distance between at least two adjacent latching points is preferably dynamically set. This means that the angular distance can then situation referred itself. If, for example, only two latching points are provided, the angular distance can be larger than when a multiplicity of latching points are intended to be generated.

In all cases, it is preferably possible to rotate the rotating unit endlessly and/or freely in the switched-off state.

In all configurations, it is possible to use a permanent magnet, the magnetic field of which can have a magnetic field from an electrical coil dynamically superimposed on it. This makes it possible to set a permanent rotational resistance even in the switched-off state. This rotational resistance can possibly also be reduced in the switched-on state.

In all configurations, it is preferred for the number of latching points to correspond to the number of currently available menu items or list entries or to correspond to an integer multiple of the number of latching points.

A selected menu item is preferably activated upon pressing the haptic operating device and/or the rotating unit.

It is possible that an associated method step is carried out or an associated submenu is displayed and the number of latching points is dynamically adapted to the selectable menu items in the submenu when a menu item is activated.

In all cases, the rotating unit can be in the form of a crown and can visually correspond to the crowns from known wristwatches. A smartwatch equipped with this is much easier to operate, on account of the controllable haptic properties, than those from the prior art.

Not only data relevant to the situation can be displayed and adjusted on the display unit, but other data, for example the time, SMS, the phone book, can also be displayed.

In the case of the display unit, it is possible to use two fingers to zoom using "pinch to zoom" by virtue of the fingers being pulled apart or together. This is not always possible on a conventional smartwatch since the display is too small to comfortably or conveniently zoom using two fingers.

Operation with a glove, for example in the winter, is also easier. Smartwatches usually have a capacitive display which can scarcely be operated or, depending on the manufacturer, cannot be operated at all with gloves. A haptic operating device has clear advantages here. When using a mobile telephone, removal of the glove is still accepted since the mobile telephone often has to be pulled from a pocket. In the case of a smartwatch, however, quick access is very advantageous. In addition, scrolling can be incorrectly detected as pressing in small displays, which can be avoided in the present invention.

Other features which are considered as characteristic for the invention are set forth in the appended claims.

Although the invention is illustrated and described herein as embodied in a minicomputer and method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Exemplary embodiments of minicomputers 300 with haptic operating devices 200 are explained below with reference to the accompanying figures. In this case, a haptic operating device 200 has in each case a magnetorheological transmission apparatus 1. Identical or similar parts are provided with the same reference symbols.

Figure 1:
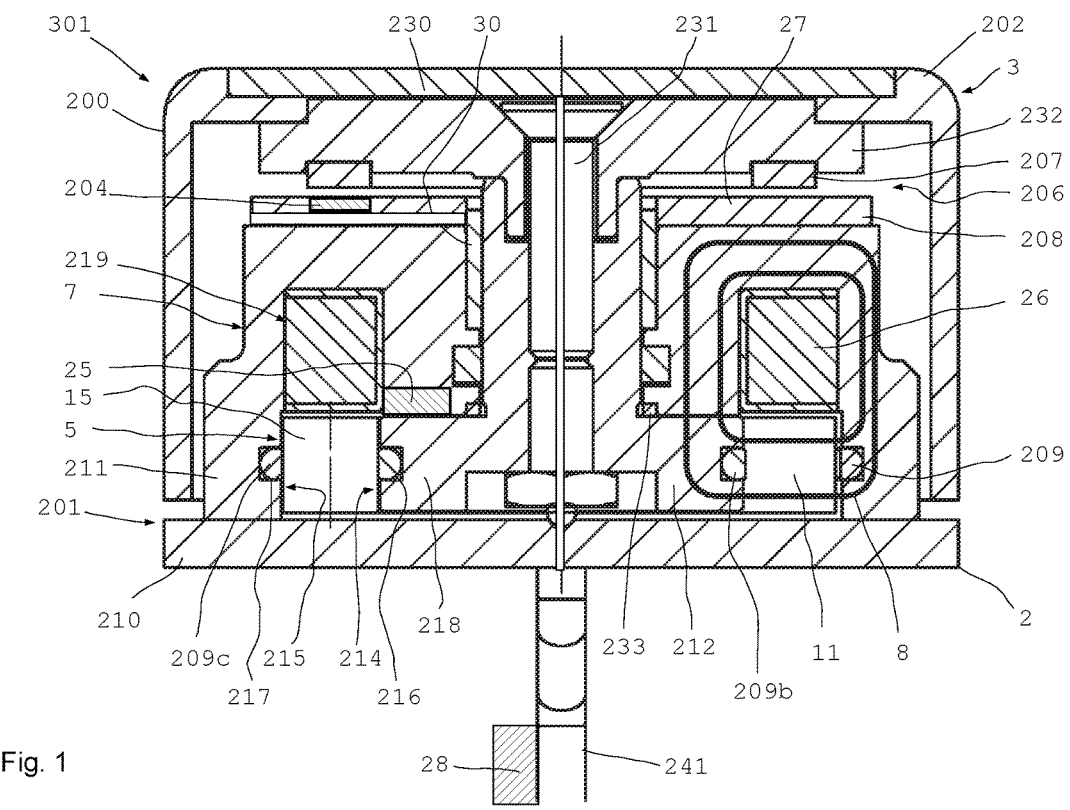
FIG. 1 is a cross section taken through a crown forming a haptic operating device of a minicomputer according to the invention.

Referring now to the figures of the drawing in detail and first, particularly, to FIG. 1 thereof, there is shown a schematic cross section of a first crown 301 of a minicomputer 300 with a haptic operating device 200. The haptic operating device 200 contains a magnetorheological transmission apparatus 1, the precise function of which is explained further below with reference to FIG. 3.

FIG. 1 shows a cross section, the stationary basic body 201 or the housing of the minicomputer 300 being used as the component 2 here, on which the rotating unit 202 is rotatably held as the component 3. The basic body 201 has a holding housing 211 which is fastened to a separate base plate 210. For example, the holding housing 211 can be adhesively bonded to the base plate 210 after the parts arranged in the holding housing have been mounted. In comparison with the basic body 201, the rotating unit 202 is rotatably held here. The rotating unit 202 comprises a shaft 212 here, to which a holder 232 is screwed via a screw 231. The holder 232 is surrounded by the actual rotating unit 202. The rotating unit 202 can be externally gripped and rotated.

The shaft 212 is rotatably mounted on the holding housing 211 via a bearing 30. The bearing 30 may be in the form of a sliding bearing (plain), for example, but may also comprise any other rolling bearing.

An annular holding space 213, which is filled with an electrical coil 26 as a field generation device 7 here, is provided in the internal space 213 in the basic body 201, which is rotationally symmetrical here, and more precisely in the holding housing 211. Possible clearances can be filled, for example, with a potting compound or a filler which is simultaneously used to hold the electrical coil 26 in the annular holding space.

As depicted on the left side of FIG. 1, it is possible for an additional permanent magnet 25 or a plurality of additional permanent magnets 25 to be provided on the holding housing 211 in order to generate a permanent magnetic field independently of a current source. If necessary, the magnetization of the permanent magnet 25 can be changed using corresponding magnetic pulses from the electrical coil 26.

A channel 5 which is partially filled with rotating bodies 11, which are cylindrical here and, in particular, are arranged symmetrically over the circumference of the channel 5, is provided in the internal space 213 between the holding housing 211 and the shaft 212. The rotating bodies co-rotate during rotation of the two components 2, 3 with respect to one another since the rotating bodies 11 are usually in contact with the holding housing 211 and/or the shaft 212 and therefore roll thereon.

At least one contact ring 209 (friction ring) can be provided for the purpose of assisting with the rolling and ensuring rolling contact. Such a contact ring may be in the form of an O-ring or rectangular ring, in particular, and may consist of a rubber-like material, for example.

Such a contact ring 209 may be arranged, for example, in a circumferential groove 217 on the running surface 215 of the holding housing 211. It is also possible for a further contact ring 209*b* to be arranged in a groove 216 on the running surface 214 on an enlarged circumferential ring 218 of the shaft 212. Der Umlaufring 218 kann einstückig mit der Welle 212 ausgebildet sein. Vorzugsweise ist der Umlaufring 218 ein separates und drehfest mit der Welle 212 verbundenes Bauteil. Vorzugsweise besteht der Umlaufring 218 aus einem gut magnetisch leitenden Material. Vorzugsweise besteht der Umlaufring 218 aus einem weichmagnetischen Material.

It is possible and preferred for a contact ring 209 to be arranged in the groove 217 and for a contact ring 209*b* to be arranged in the inner circumferential groove 216 on the running surface 214 of the circumferential ring 218.

Alternatively, it is also possible for the individual rotatable transfer bodies, i.e., rotating bodies 11 are magnetic field concentrators each to be provided with a contact ring 209*c*, a contact ring 209*c* then extending around a rotating body 11. In the case of such a configuration as well, it is ensured that the rotating bodies 11 and their contact ring 209 each have contact with the shaft 212 or the holding housing 211, thus ensuring continuous rotation of the rotating bodies if the rotating unit 202 is rotated.

Implementing the device without the insertion of (flexible) contact elements or contacting rings makes it possible to achieve even less basic friction and it is therefore particularly preferred.

In the exemplary embodiment here, a defined axial distance between the holding housing 211 and an axial surface of the circumferential ring 218 is ensured via a stop ring 233. The internal space 213 is sealed via a seal 46, with the result that the magnetorheological medium cannot escape from the internal space 213.

A circumferential gap, at which an angle sensor is arranged, is provided between the cover or the holder for 232 and the holding housing 211. The angle sensor 206 preferably consists of at least two parts 207 and 208, the sensor part 207 having magnets or other positional marks or the like at particular angle positions, for example, with the result that a rotational movement of the rotating unit 202 can be detected at the holding housing 211 via the sensor part 208 mounted on the electronics, for example. In this case, both an absolute angle position and a relative angle change can be sensed. The angle sensor 206 or a separate actuation sensor 204 can be used to sense an axial movement or an axial force on the rotating unit 202 or the operating device 200 as a whole. For example, a slight distance change between the holder 232 and the holding housing 211, which can be sensed by the actuation sensor 204, can be achieved by exerting an axial force. It is also possible for certain parts or the outer rotating ring of the rotating unit 202 to be axially displaceable counter to a spring force, with the result that axial actuation of the operating device 200 can be sensed. The electronics of the haptic operating element preferably operate with a control clock of 4 kHz or more.

The display unit which is rotatable together with the rotating unit 202 here can be supplied with the necessary data and the required electrical current via a cable feed and a central channel.

The rotating unit 202 forms the outer part of the crown 301 here.

Figure 2:
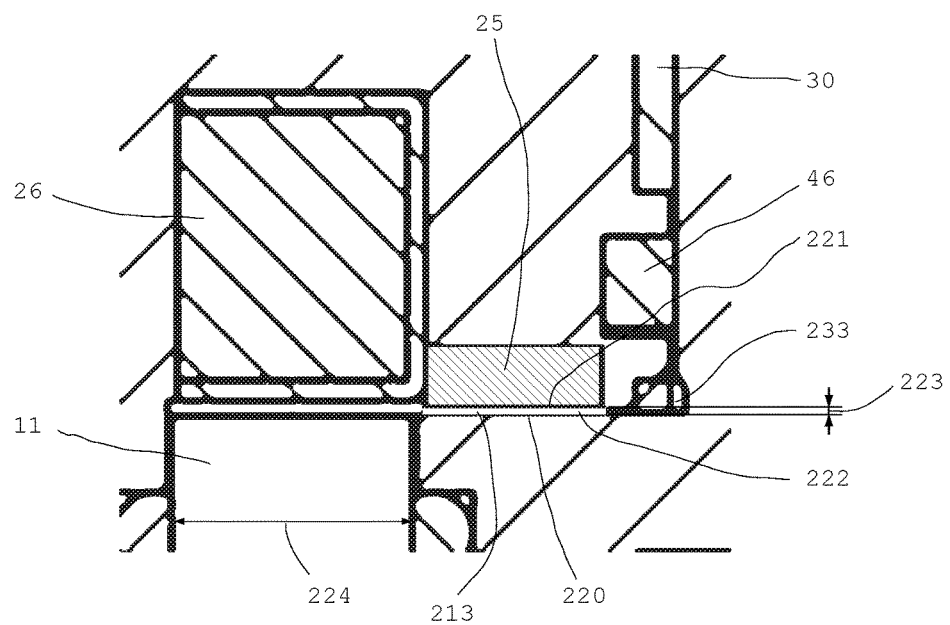
FIG. 2 shows an enlarged detail from FIG. 1.

FIG. 2 shows an enlarged detail from FIG. 1, in which case the rotating body 11—the rotating bodies 11 of all of the embodiments may be referred to as rotatable transfer elements or as magnetic field concentrators—and the electrical coil 26 and also a permanent magnet 25 are visible. The axial distance 223 between the end face 220 at the shaft 212 and the end face 221 at the holding housing 211 is clearly discernible here. This axial distance 223 is considerably shorter than the radial distance 224 between the circumferential ring 218 and the running surface 215 in the holding housing 211.

A short distance 223 is advantageous since the magnetic field 8 (compare FIG. 1) passes through the gap 222 in the axial direction. Relatively low magnetic losses are possible with a thin gap.

It is also possible for the shaft 212 to be introduced into the interior of the minicomputer 300 and for the rotational resistance to be dynamically generated there. It is also possible to dispense with the use of MRF, and the relatively low rotational resistances required here can be generated directly via magnetic forces or the like.

The functional principle for generating torques in the haptic operating device 200 according to FIG. 1 is described below with reference to FIG. 3.

Figure 3:
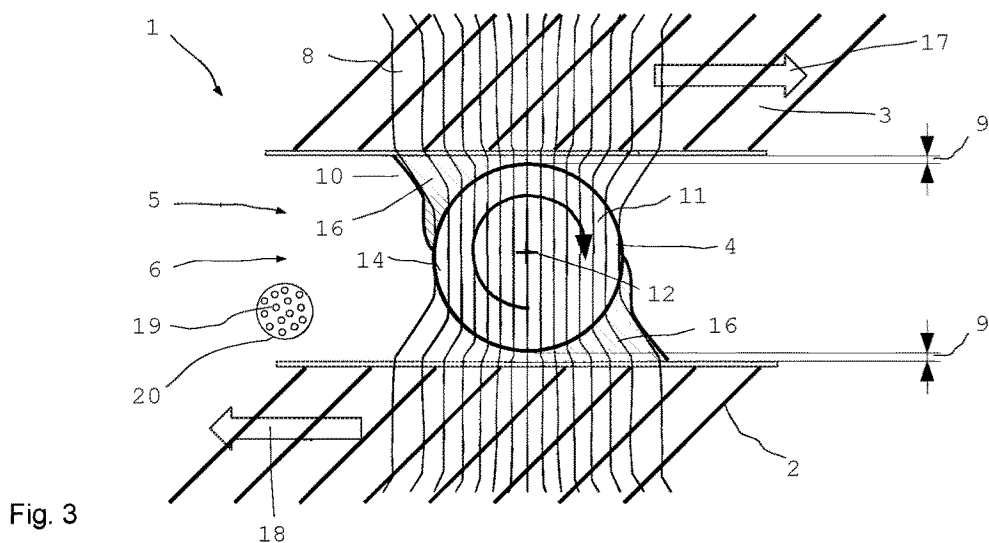
FIG. 3 shows a highly schematic view of the operating principle of a magnetorheological transmission apparatus of the haptic operating device in cross section.

FIG. 3 shows a highly schematic cross-sectional view of a magnetorheological transmission apparatus 1 according to the invention for influencing the force transmission between two components 2 and 3. In this case, a rotating body 11 is provided as a separate part 4 between the two components 2 and 3 in FIG. 1. The rotating body 11 is in the form of a ball 14 here. However, it is likewise possible for rotating bodies 11 to be in the form of cylinders or ellipsoids, rollers or other rotatable rotating bodies. In the actual sense, rotating bodies which are not rotationally symmetrical, for example a gear wheel, or rotating bodies 11 having a particular surface structure can also be used as rotating bodies. The rotating bodies 11 are not used for mounting relative to one another, but rather for transmitting torque.

A channel 5 which is filled here with a medium 6 is provided between the components 2 and 3 of the magnetorheological transmission apparatus 1. The medium here is a magnetorheological fluid 20 which comprises, for example, as the carrier fluid, an oil containing ferromagnetic particles 19. Glycol, fat, or viscous substances can also be used as the carrier medium without being restricted thereto. The carrier medium may also be gaseous or it is possible to dispense with the carrier medium (vacuum). In this case, only particles which can be influenced by the magnetic field are filled into the channel.

The ferromagnetic particles 19 are preferably carbonyl iron powder, the size distribution of the particles depending on the specific use. A particle size distribution of between one and ten micrometers is specifically preferred, but larger particles of 20, 30, 40 and 50 micrometers are also possible. Depending on the application, the particle size can also become considerably larger and can even advance into the millimeter range (particle spheres). The particles may also have a special coating/casing (titanium coating, ceramic casing, carbon casing etc.) so that they better withstand the high pressure loads which occur depending on the application. For this application, the MR particles can be produced not only from carbonyl iron powder (pure iron) but also from special iron (harder steel), for example.

The rotating body 11 is caused to rotate about its axis of rotation 12 by the relative movement 17 of the two components 2 and 3 and practically runs on the surface of the component 3. At the same time, the rotating body 11 runs on the surface of the other component 2, with the result that there is a relative velocity 18 there.

Strictly speaking, the rotating body 11 does not have any direct contact with the surface of the component 2 and/or 3 and therefore does not roll directly thereon. The free distance 9 between the rotating body 11 and one of the surfaces of the component 2 or 3 is 140 μm, for example. In one specific configuration with particle sizes of between 1 μm and 10 μm, the free distance is between 75 μm and 300 μm, in particular, and particularly preferably between 100 μm and 200 μm.

The free distance 9 is, in particular, at least 10 times the diameter of a typical mean particle diameter. The free distance 9 is preferably at least 10 times the size of a largest typical particle. As a result of the lack of direct contact, a very low base friction/force/torque is produced during relative movement of the components 2 and 3 with respect to one another.

If a magnetic field is applied to the magnetorheological transmission apparatus 1, the field lines are formed on the basis of the distance between the rotating bodies 11 and the components 2, 3. The rotating body consists of a ferromagnetic material and of ST 37 here, for example. The steel type ST 37 has a magnetic permeability μr of approximately 2000. The field lines pass through the rotating body and are concentrated in the rotating body. A high flux density prevails in the channel 5 on the radial entry and exit surface of the field lines on the rotating body. The inhomogeneous and strong field there results in local and strong crosslinking of the magnetically polarizable particles 19. The effect is greatly increased by the rotational movement of the rotating body 11 in the direction of the wedge forming in the magnetorheological fluid, and the possible braking or clutch torque is extremely increased far beyond the magnitude which can normally be produced in the magnetorheological fluid. The rotating body 11 and the component 2, 3 preferably at least partially consist of ferromagnetic material, which is why the magnetic flux density becomes higher, the shorter the distance between the rotating body 11 and the component 2, 3. As a result, a substantially wedge-shaped region 16 forms in the medium, in which the gradient of the magnetic field increases greatly toward the acute angle at the contact point/the region at the shortest distance.

Despite the distance between the rotating body 11 and component 2, 3, the rotating body 11 can be caused to rotate by the relative velocity of the surfaces with respect to one another. The rotational movement is possible without and also with an acting magnetic field 8.

If the magnetorheological transmission apparatus 1 is exposed to a magnetic field 8 from a magnetic field generation device 7 (not illustrated here in FIG. 1), the individual particles 19 of the magnetorheological fluid 20 are concatenated along the lines of the magnetic field 8. It should be noted that the vectors depicted in FIG. 1 only roughly schematically illustrate that region of the field lines which is relevant to influencing the MRF 20. The field lines occur substantially in a manner perpendicular to the surfaces of the ferromagnetic components in the channel 5 and need not run in a rectilinear manner, in particular in the acute-angled region 10.

At the same time, on the circumference of the rotating body 11, some material of the magnetorheological fluid 20 is concomitantly caused to rotate, with the result that an acute-angled region 10 forms between the component 3 and the rotating body 11. On the other side, an identical acute-angled region 10 is produced between the rotating body 11 and the component 2. The acute-angled regions 10 may have a wedge shape 16 in the case of cylindrical rotating bodies 11, for example. The wedge shape 16 impedes the further rotation of the rotating body 11, with the result that the effect of the magnetic field on the magnetorheological fluid is intensified since the acting magnetic field inside the acute-angled region 10 results in greater cohesion of the medium 6 there. This intensifies the effect of the magnetorheological fluid in the accumulated cluster (the chain formation in the fluid and therefore the cohesion or viscosity), which makes it difficult to rotate or move the rotating body 11 further.

The wedge shape 16 makes it possible to transmit considerably greater forces or torques than would be possible with a comparable structure which uses only the shear movement without a wedge effect.

The forces which can be directly transmitted by the applied magnetic field represent only a small portion of the forces which can be transmitted by the apparatus. The magnetic field makes it possible to control the wedge formation and therefore the mechanical force intensification. The mechanical intensification of the magnetorheological effect can be such that it is possible to transmit a force, even after an applied magnetic field has been switched off, if the particles have been wedged.

It has been found that the wedge effect of the acute-angled regions 10 results in a considerably greater effect of a magnetic field 8 of a particular strength. In this case, the effect can be intensified by a multiple. In a specific case, the relative velocity of two components 2 and 3 relative to one another was influenced approximately 10 times as much as in the prior art in the case of MRF clutches. The possible intensification depends on different factors. It can possibly also be intensified by a greater surface roughness of the rotating bodies 11. It is also possible for outwardly projecting projections to be provided on the outer surface of the rotating bodies 11, which projections may result in even stronger wedge formation.

The wedge effect is distributed in a two-dimensional manner between the rotating body 11 and the components 2 or 3.

Figures 4, 5:
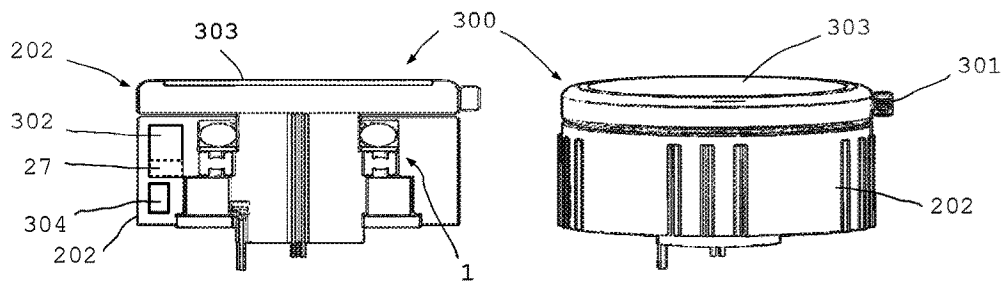
FIG. 4 shows a minicomputer according to the invention with a haptic operating device.
FIG. 5 shows a slightly inclined, perspective illustration of the minicomputer according to FIG. 4.

FIG. 4 shows a schematic illustration of a minicomputer 300 which is embodied here as a smartwatch. The housing of the smartwatch can serve as the basic body. At least one haptic operating device 200 is provided. A crown 301 can be seen here. Furthermore, a rotating unit 202 is provided and is fitted to the housing 201. In the minicomputer 300 according to FIGS. 4 and 5, a magnetorheological transmission apparatus 1 is provided here in order to generate the required magnetic forces and the accordingly acting braking forces/braking torques.

A processor 302 is schematically depicted in the interior of the minicomputer. A control device 27 may be part of the processor 302. It is also possible for a separate control device 27 to be assigned to the crown 301 or to the rotating unit 202 in order to relieve the load on the processor, for example. The processor 302 can spend more time periods in standby, thus making it possible to save energy.

It is also possible to see a communication unit 304 which can set up a network connection or another data connection to other computers or devices, in particular in a wireless manner.

Figures 6, 7:
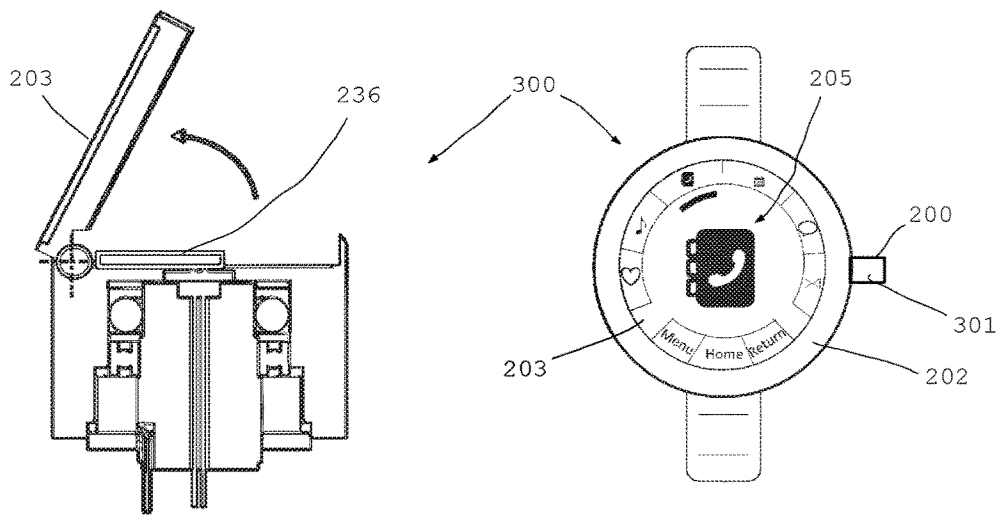
FIG. 6 shows another embodiment of a minicomputer.
FIG. 7 shows another embodiment of a minicomputer according to the invention.
Figure 8A:
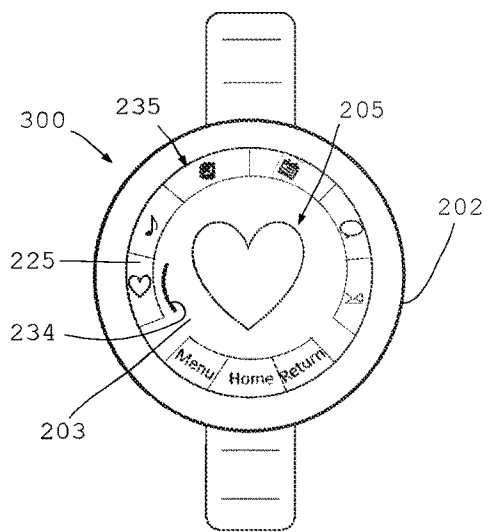
Figure 8B:
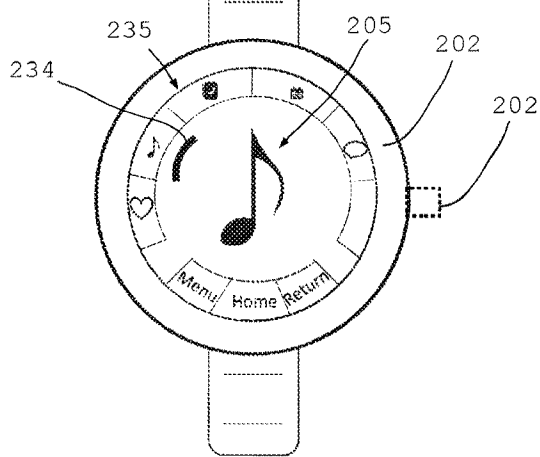
Figure 8C:
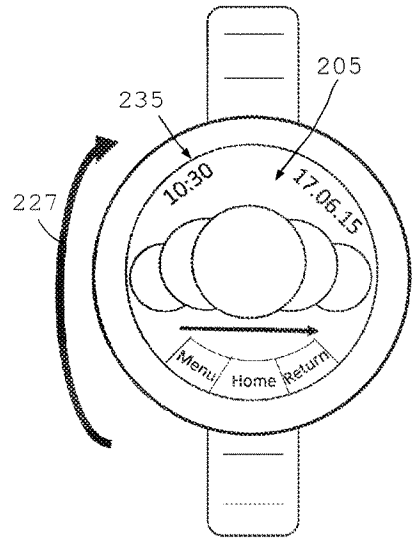
Figure 9A:
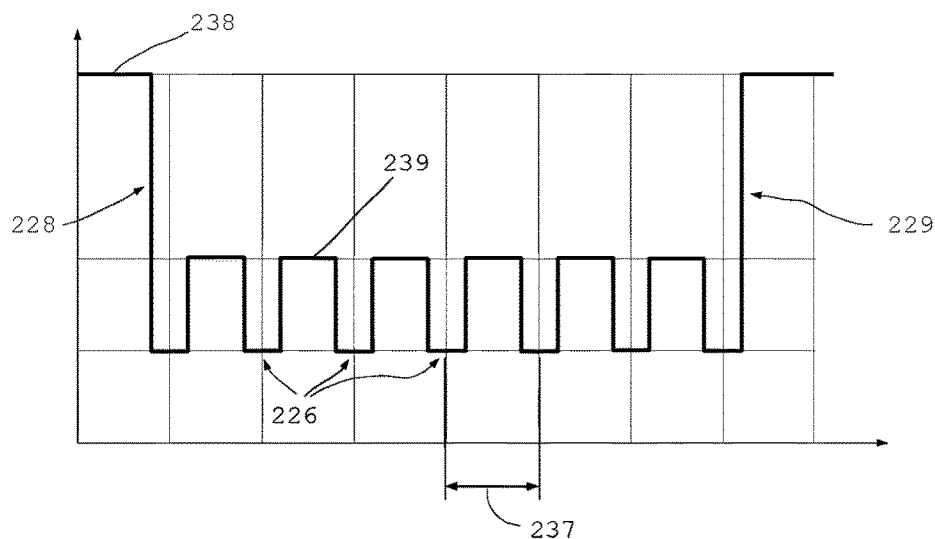
Figure 9B:
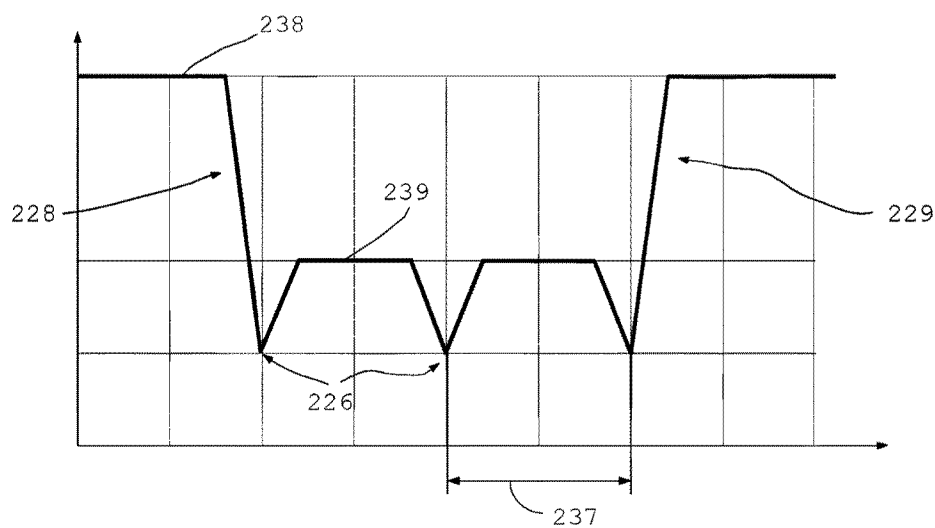
Figure 9C:
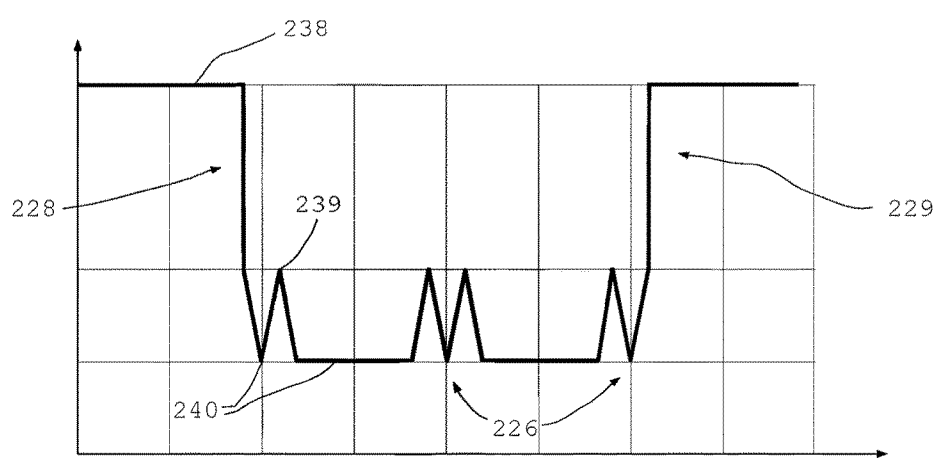

FIG. 6 shows a variant of the exemplary embodiment according to FIG. 4, in which case the cover with the display unit 203 is hinged, with the result that, after opening, a fingerprint sensor 236 or touchpad or the like is available in order to authenticate a user, for example. It is possible for a camera to be integrated in the display unit, which camera allows the face or a fingertip of the user to be identified using a photo.

FIG. 7 shows a schematic plan view of a smartwatch according to the invention in the form of a minicomputer 300. This minicomputer 300 can also have two rotating units 202, 301. However, it is also possible for only one rotating unit 202, 301 to be provided. Different symbols 205 can be seen on the display unit 203. The display unit 203 is also touch-sensitive, in particular.

The rotating unit 202 or the crown 301 is respectively part of a haptic operating device.

The respectively current angle position of the rotating unit 202 can be sensed via a rotary encoder. As a result, arbitrary haptic signals can be output on the basis of the control, depending on the position, rotational angle, angular velocity etc. The rotary encoder can also be supplemented with a torque sensor.

Such haptic operating devices can also be produced with an (additional) MRF shear mode.

The haptic operating device 200 requires little space and, on account of the small space requirement and the low power consumption in the range of milliwatts or below, is suitable for the minicomputer 300. The latching pattern of the haptic operating device 200 can be set on the basis of the situation.

Three-dimensional movement elements with variable haptics and robust and precise mounting are fundamentally difficult to produce and are therefore not inexpensive. In contrast, the combination of an arrangement of the rotating bodies which is capable of pendulum movements with a magnetorheological fluid, for example, can be produced in a very cost-effective manner.

A four-dimensional rotary knob which can be displaced and can also be additionally rotated in three directions, for example, can also be provided.

The combination of a 3-D knob with longitudinal adjustment of an MRF wedge therefore results in a 4-D actuating element. A field generation unit can be used to influence or vary all four directions of movement.

Instead of a kinematic and, for example, parallelogram-like pivoting mechanism, it is also possible to use an elastic/deformable element which, as a flexible and semi-rigid arm, for example, can consist of coiled metal tubing in the form of a swan's neck. One advantage is that the user does not always have to grip the screen, which reduces soiling. In addition, the adjustment and the zooming, for example, take place more quickly: gripping the screen with one finger and moving the rotating controller with another finger can initiate a zooming process, for example. The same applies to the volume, writing with uppercase and lowercase letters or selecting special buttons or a second level during typing.

The user can thus also press with one finger on a separate menu bar in order to search for the type of desired actuation. He then performs the desired action using the rotating controller. The latching pattern of the rotating controller then adapts automatically, thus, for example, "on"-"off" or volume control with a latching pattern possibly having a dynamic stop. If the screen is rotated during the actuation (touch display) (for example, as in the case of mobile telephones or handheld computers—90° from portrait format to landscape format), the latching pattern adapts automatically, i.e. it co-rotates. For example, if the setting range were from 6 o'clock to 12 o'clock when it is held upright, this would change from 12 o'clock to 6 o'clock upon rotation by 90° in the clockwise direction without adaptation. This also applies if the display is installed in the knob itself. Such a haptic element can be haptic in all or individual directions (only rotate, rotate and press; joystick etc.). The haptics adjust themselves depending on the selected action.

One advantage can also result upon the selection of a list such as a telephone book list, for example, since such entries are often too small for "targeting" for large fingers.

Advantages also result in the dark or for people with spectacles who are not currently wearing them. Feedback is received via the haptic rotating controller and the user knows what he is doing when it is currently dark, for example.

The functionality and the method of operation of a minicomputer 300 according to the invention are explained below with reference to FIGS. 8A to 8C using the example of a smartwatch.

Figure 8A:
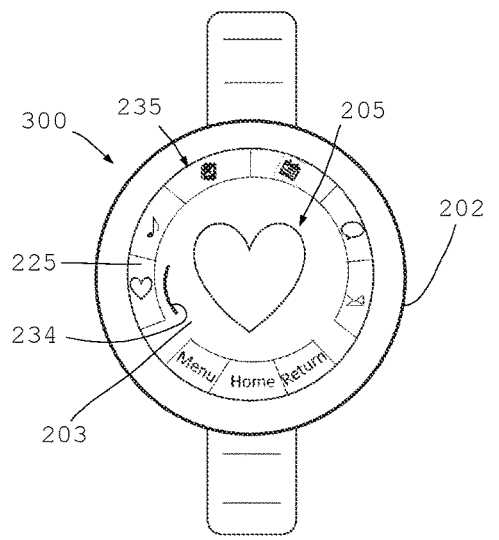
FIGS. 8A-8C show a control sequence of a minicomputer according to the invention.

In this case, FIG. 8A shows a plan view of the smartwatch 300 according to the invention with a haptic operating device 200. The haptic operating device 200 may be used, in particular, to select menu items or list entries or the like. The smartwatch has here a rotating ring on the housing which surrounds the display 203 as the rotating unit 202.

FIG. 8A illustrates the operating state "pulse measurement." The display unit 203 centrally displays a graphical symbol—a heart—with the operating state on the rotating unit 202. A menu ring 235, on which the individual selectable menu items 225 are depicted, is graphically illustrated further on the outside. There are nine menu items in FIG. 8A, in which case the indicator 234 is illustrated beside the selected operating state or beside the currently active operating state.

Rotating the rotating unit 202 in the direction of rotation 227 (here to the right or in the clockwise direction) then makes it possible to select the menu item for setting the audio system or for selecting a piece of music.

Figure 8B:
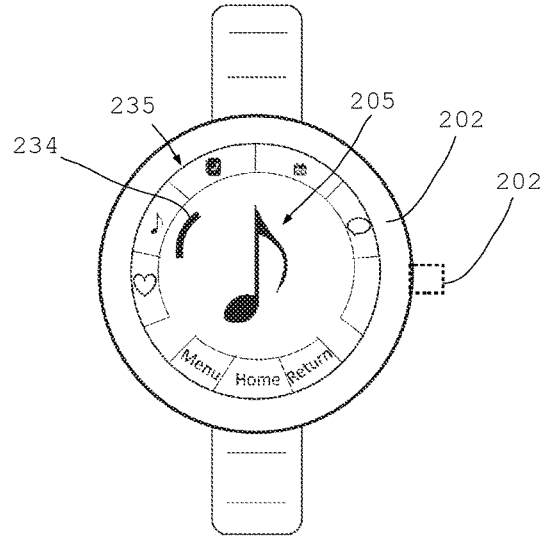

This state is illustrated in FIG. 8B where the clef is depicted as the graphical symbol 205 in the center of the display unit 203. The indicator 234 indicates that the corresponding menu item 225 is active.

Rotating the rotating unit 202 further finally makes it possible to reach and activate the other menu items.

Figure 8C:
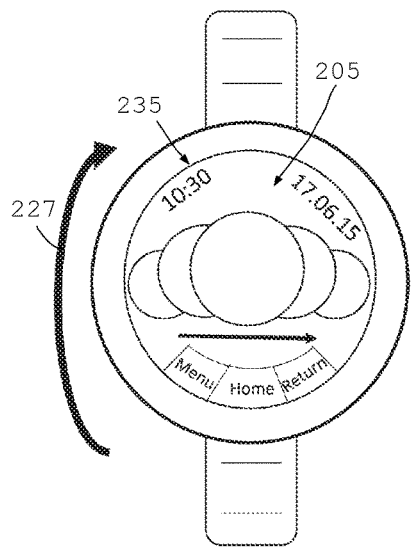

FIG. 8C shows a number of list entries or photos or menu items, the focus being changed to one of the list entries or menu items by rotating the rotating unit. The arrow indicates the scrolling direction.

The corresponding menu entry can be selected by pressing the touch-sensitive surface of the display unit 203. It is also possible for a selection which has been made to be confirmed by (axially) pressing the crown 301 or by pressing on the rotating unit. The photo is then displayed in an enlarged manner or the contact information overall is displayed etc.

Actuating the rotating unit 202 and rotating it in the clockwise direction results in the next photo being reached as the next latching point. In this case, a separate latching point is provided for each menu entry.

A rotational movement in the opposite direction, that is to say in the anticlockwise direction, leads back to the other menu items.

In all cases, the number of latching points for the rotating unit 202 is adapted to the number of available menu items (photos, contacts etc.). This means that nine different latching points are provided in FIG. 8A, whereas the number of latching points in FIG. 8C is dependent on the number of present or available list entries. It is possible to dynamically generate right-hand and left-hand end stops, with the result that the rotating unit cannot be rotated further as desired in the switched-on state.

Overall, a smartwatch 300 is provided, in which operation via a rotating unit 202 with a haptic latching pattern is performed. The available latching points are generated dynamically or adaptively.

Figure 9A:
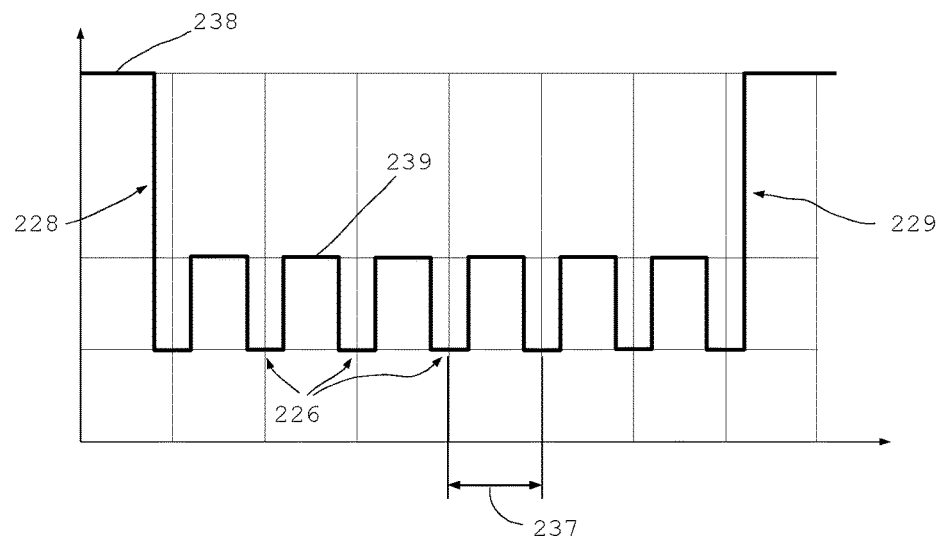
FIGS. 9A-9C show possible torque profiles against the rotational angle of a haptic operating device of a minicomputer according to the invention.
Figure 9B:
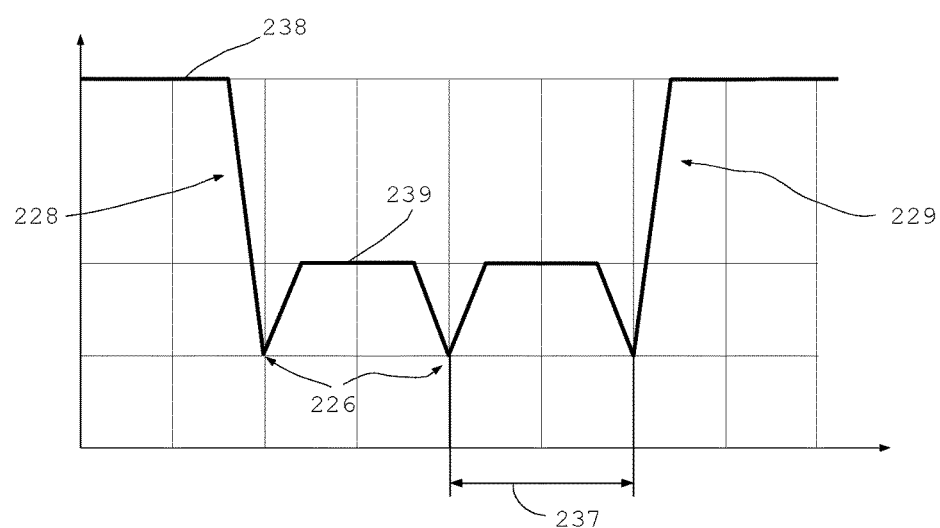
Figure 9C:
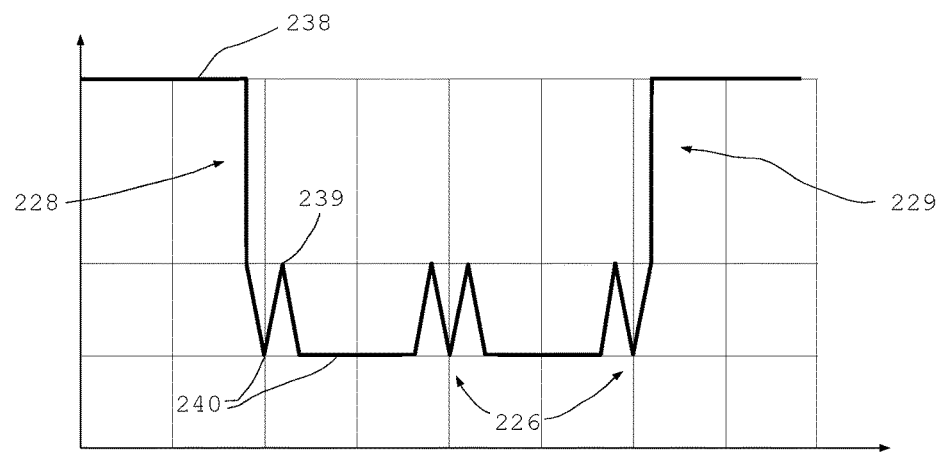
Figure 1:
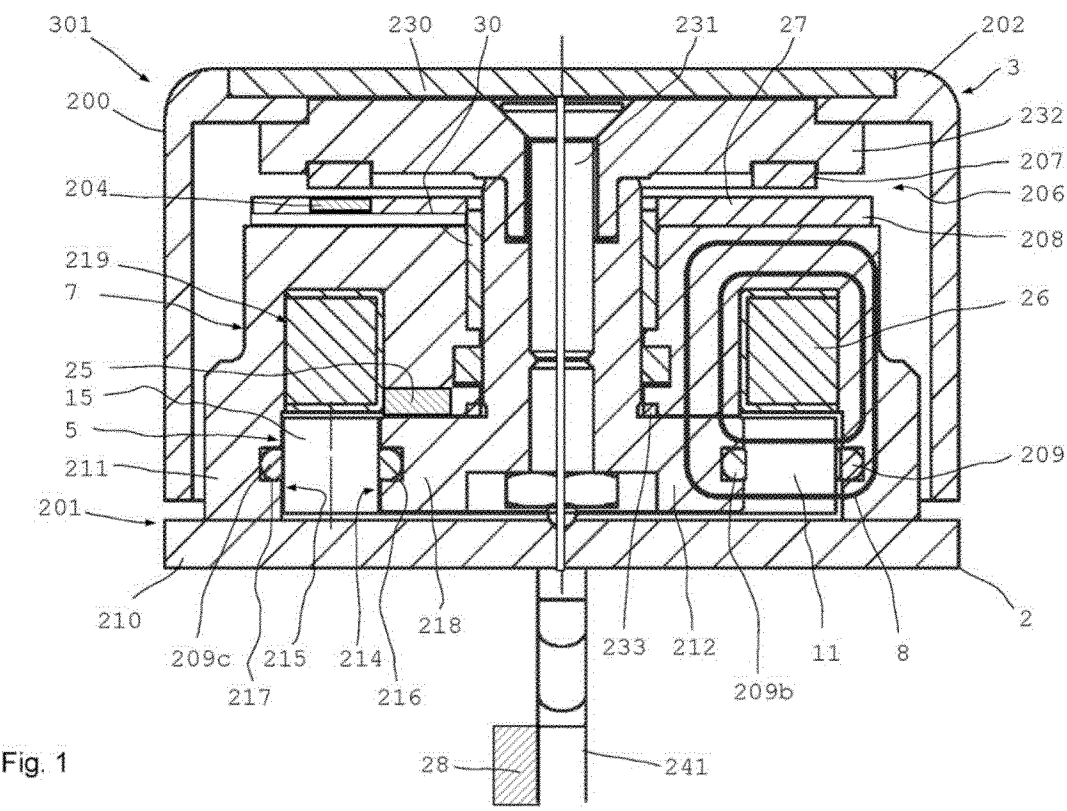
Figure 2:
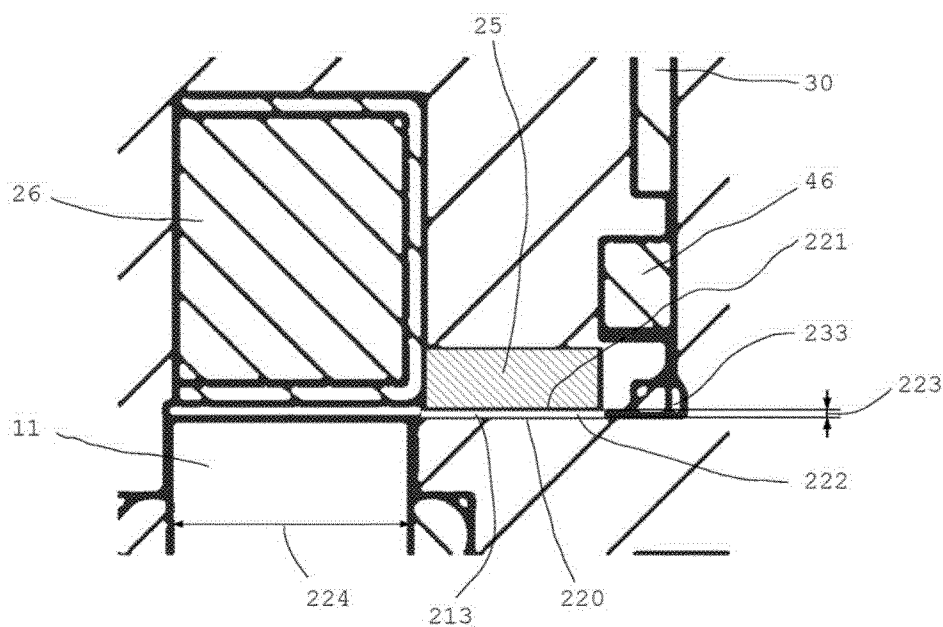

FIGS. 9A, 9B and 9C illustrate possible embodiment variants for the dynamically generated magnetic field or the dynamically generated braking torque on the basis of the rotational angle.

In this case, FIG. 9A shows a variant in which a left-hand end stop 228 and a right-hand end stop 229 are generated. During further rotation, a high magnetic field or a high rotational resistance or stop torque 238 is generated there, as a result of which the rotating unit 202 opposes a high resistance to a rotational movement.

A first latching point 226 corresponding to a first menu item 225 is provided directly beside the left-hand end stop 228. If the next menu item is intended to be selected, the rotating unit 202 must be rotated in the clockwise direction. For this purpose, the dynamically generated higher magnetic field or latching torque 239 or its frictional torque must be overcome before the next latching point 226 is reached. In FIG. 9A, a constant magnetic field is respectively generated at the latching points 226 and in the regions in between for a certain angular range, which magnetic field is considerably lower at the latching points than in the regions in between and is again considerably lower than at the stops 228, 229.

An angular distance 237 between individual latching points can be dynamically changed and is adapted to the number of available latching points or menu items.

FIG. 9B shows a variant in which the magnetic field does not suddenly increase toward the end stops 228, 229 but rather has a steep profile. Furthermore, ramp-like gradients of the magnetic field are respectively provided at the latching points 226 toward both rotation sides, as a result of which the rotational resistance increases in the corresponding directions of rotation. Only three latching points 226 are provided here with the same operating device 200, the angular distance 237 of which latching points is greater than in the example according to FIG. 9A.

FIG. 9C shows a variant in which there is a lower rotational resistance between individual latching points 226 and an increased magnetic field 239 is respectively generated only directly adjacent to the latching points 226 in order to enable engagement at the individual latching points 226 and, at the same time, to provide only a low rotational resistance between individual latching points.

In principle, it is also possible to mix the methods of operation and the magnetic field profiles shown in FIGS. 9A, 9B and 9C. For example, the magnetic field profile can accordingly be set differently for different submenus.

If the knob is not rotated, that is to say the angle is constant, the current is preferably continuously reduced over time.

The current can also be dependent on the velocity and/or be dependent on the rotational angle velocity of the haptic knob.

In allen Ausgestaltungen ist eine Bewegungsmustererkennung möglich. Bewegt oder dreht der Benutzer den Bedienknopf nach einem (vorbestimmten) Muster, so wird das erkannt. Beispielsweise kann der Benutzer z. B. zweimal links und zweimal rechts mit relativ (ganz wenig) Winkel drehen. Der Sensor (Drehgeber) und die Elektronik erkennen dieses Bewegungsmuster und schalten davon abhängig eine hinterlegte Funktion, z.B. wird das gewählte (oder ein vordefiniertes) Menü danach ausgeführt (bestätigt). Weiteres Beispiel: Zweimal kurz im Uhrzeigersinn kann aber auch bedeuten, dass Menü soll um zwei Menüpunkte nach unten gehen. Das Bewegungsmuster kann beliebig vorgegeben sein oder vom Nutzer angelegt werden. Der Bedienknopf kann dies auch erlernen. Die auszuführenden Funktionen können auch vorgegeben oder vom Nutzer zugeordnet werden. Es sind viele Bewegungsmuster möglich.

Insgesamt stellt die Erfindung einen vorteilhaften Minicomputer 300 mit einer haptischen Bedieneinrichtung 200 und ein entsprechend vorteilhaftes Verfahren zur Steuerung zur Verfügung. Die Anzahl und Art der Rasterpunkte wird dynamisch an die Anzahl der zur Verfügung stehenden Menüpunkte angepasst. Die Bedieneinrichtung 200 des Minicomputers in FIG. 1 wurde getestet und hat ein gemessenes Grundmoment von ca. 0.015 Nm und ein Maximalmoment von>5 Nm (Faktor 300).

In all cases, the effective torque can be set on the basis of the speed using pulse width modulation (PWM), for example. Large axial and radial forces can be generated using an oblique expanding mandrel. The particles may have a round, rod-shaped or any other form.

The rheological fluid may consist of a wide variety of constituents which individually or in combination may be: Fe, carbon steel, NdFeB (neodymium), AlNiCo, samarium, cobalt, silicon, carbon fiber, stainless steel, polymers, soda-lime glass, ceramic and non-magnetic metals and the like. Dimorphic magnetorheological fluids containing nanotubes or/and nano wires are also possible.

The carrier fluid may consist, in particular, of the following constituents or a combination thereof: oils and preferably synthetic or non-synthetic oils, hydraulic oil, glycol, water, grease, fats and the like.

The following is a summary list of reference numerals and the corresponding structure used in the above description of the invention:

| | |
|---|---|
| 1 | Apparatus |
| 2, 3 | Component |
| 4 | Separate part |
| 5 | Channel |
| 6 | Medium |
| 7 | Magnetic field generation device |
| 8 | Field |
| 9 | Free distance |
| 10 | Acute-angled region |
| 11 | Rotating body |
| 12 | Axis of rotation |
| 13 | Rotating body |

-continued

| | |
|---|---|
| 14 | Ball |
| 15 | Cylinder |
| 16 | Wedge shape |
| 17 | Direction of the relative movement |
| 18 | Direction of the relative movement |
| 19 | Magnetic particle |
| 20 | Fluid |
| 25 | Permanent magnet |
| 26 | Coil |
| 27 | Control device |
| 28 | Energy store |
| 29 | Sensor |
| 30 | Bearing |
| 46 | Sealing ring |
| 47 | Shaft |
| 200 | Operating device |
| 201 | Basic body |
| 202 | Rotating unit |
| 203 | Display unit |
| 204 | Actuation sensor |
| 205 | Graphical symbol |
| 206 | Angle sensor |
| 207 | Sensor part |
| 208 | Sensor part |
| 209 | Contact ring, friction ring |
| 210 | Base plate |
| 211 | Holding housing |
| 212 | Shaft |
| 213 | Internal space |
| 214 | Running surface of 212 |
| 215 | Running surface of 211 |
| 216 | Groove |
| 217 | Groove |
| 218 | Circumferential ring with 214 and 216 |
| 219 | Holding space for 26 |
| 220 | End face of 218 |
| 221 | End face of 211 |
| 222 | Gap |
| 223 | Axial distance |
| 224 | Radial distance |
| 225 | Menu item |
| 226 | Latching point |
| 227 | Direction of rotation |
| 228 | End stop |
| 229 | End stop |
| 230 | Cover |
| 231 | Screw |
| 232 | Holder |
| 233 | Stop ring |
| 234 | Indicator |
| 235 | Menu ring |
| 236 | Fingerprint sensor |
| 237 | Angular distance |
| 238 | Stop torque |
| 239 | Latching torque |
| 240 | Base torque |
| 242 | Outer limb |
| 243 | Radially inner region |
| 244 | Inner limb |
| 300 | Minicomputer, smartwatch |
| 301 | Crown |
| 302 | Processor |
| 303 | Display unit, display |
| 304 | Communication unit |

The invention claimed is:

1. A method of operating a minicomputer, the method comprising: providing the minicomputer with a processor, a display unit, and a haptic operating device having a rotating unit, and displaying selectable menu items on the display unit; selecting a menu item by rotating the rotating unit; dynamically changing a rotational resistance of the rotating unit during a rotation of the rotating unit; and defining a plurality of latching points according to the menu items displayed on the display unit; haptically perceptively latching the rotating unit at the latching points during the rotation of the rotating unit, by selectively increasing the rotational resistance of the rotating unit at the latching points and enabling the rotating unit to be endlessly and freely rotatable in a switched-off state.

2. The method according to claim 1, which comprises dynamically changing a number of the haptically perceptible latching points in dependence on an operation of the minicomputer, by deliberately generating a magnetic field at a channel at least partially filled with a magnetorheological medium.

3. The method according to claim 1, which comprises detecting an angular position of the rotating unit and setting the rotational resistance on a basis of the detected angular position.

4. The method according to claim 1, which comprises dynamically generating an end stop in at least one direction of rotation, and setting the rotational resistance at the end stop to be perceptively stronger than at a latching point.

5. The method according to claim 1, which comprises dynamically setting an angular distance between at least two adjacent latching points and enabling the rotating unit to be endlessly and freely rotatable in a switched-off state.

6. The method according to claim 1, which comprises setting the number of latching points to correspond to a number of currently available menu items or list entries.

7. The method according to claim 1, which comprises carrying out an associated method step or displaying an associated submenu and dynamically adapting the number of latching points to the selectable menu items in the submenu when a menu item is activated.

8. A minicomputer, comprising:
a processor, a display unit connected to said processor and a communication unit connected to said processor;
a haptic operating device including a rotatable rotating unit having a rotational resistance opposing a rotation of said rotating unit;
a controllable transmission apparatus operatively associated with said rotating unit and configured for dynamically changing the rotational resistance against the rotation of said rotating unit during the rotation thereof by setting a given increased rotational resistance at defined latching points and enabling the rotating unit to be endlessly and freely rotatable in a switched-off state; and
a control device connected to said controllable transmission apparatus and configured for dynamically adjusting the rotational resistance of said rotating unit and for dynamically setting an angular distance between at least two adjacent latching points in dependence on a menu displayed on said display unit.

9. The minicomputer according to claim 8, wherein said control device is configured to dynamically change a number of haptically perceptible latching points in dependence on an operation of the minicomputer.

10. The minicomputer according to claim 8, wherein said control device is configured to dynamically change a number of haptically perceptible latching points in dependence on an operation of the minicomputer, by deliberately generating a magnetic field at a channel at least partially filled with a magnetorheological medium.

11. The minicomputer according to claim 8, which comprises at least one sensor for detecting an angular position of said rotating unit.

12. The minicomputer according to claim 8, wherein said control device is configured to dynamically generate an end stop in at least one direction of rotation, and to set the rotational resistance at the end stop to be perceptively stronger than at a latching point.

13. The minicomputer according to claim 8, wherein said control device is configured to set the number of latching points to correspond to a number of currently available menu items or list entries.

14. The minicomputer according to claim 8, wherein said processor is configured to carry out an associated method step or displaying an associated submenu and to dynamically adapt a number of latching points to the selectable menu items in the submenu when a menu item is activated.

15. A method of operating a minicomputer, the method comprising: providing the minicomputer with a processor, a display unit with a touch display, and a haptic operating device having a rotating unit; displaying a menu with selectable menu items on the touch display; selecting a menu item by touching a respective menu item on the touch display or by rotating the rotating unit; during a rotation of the rotating unit, dynamically changing a rotational resistance of the rotating unit by defining a plurality of latching points according to the menu items displayed on the display unit; haptically perceptively latching the rotating unit at the latching points during the rotation of the rotating unit, by selectively increasing the rotational resistance of the rotating unit at the latching points; and enabling the rotating unit to be endlessly and freely rotatable in a switched-off state.

16. The method according to claim 15, which comprises detecting an angular position of the rotating unit and setting the rotational resistance on a basis of the detected angular position.

17. The method according to claim 15, which comprises dynamically generating an end stop in at least one direction of rotation, and setting the rotational resistance at the end stop to be perceptively stronger than at a latching point.

18. The method according to claim 15, which comprises dynamically setting an angular distance between at least two adjacent latching points and enabling the rotating unit to be endlessly and freely rotatable in the switched-off state.

19. The method according to claim 15, which comprises setting the number of latching points to correspond to a number of currently available menu items or list entries.

20. The method according to claim 15, which comprises carrying out an associated method step or displaying an associated submenu and dynamically adapting the number of latching points to the selectable menu items in the submenu when a menu item is activated.

* * * * *

UNITED STATES PATENT AND TRADEMARK OFFICE
CERTIFICATE OF CORRECTION

PATENT NO. : 10,429,959 B2
APPLICATION NO. : 15/200945
DATED : October 1, 2019
INVENTOR(S) : Stefan Battlogg It is certified that error appears in the above-identified patent and that said Letters Patent is hereby corrected as shown below:

Please delete patent 10,429,959 B2 in its entirety and insert patent 10,429,959 B2 in its entirety.

Signed and Sealed this
Sixth Day of October, 2020

Andrei Iancu
*Director of the United States Patent and Trademark Office*

(12) United States Patent
Battlogg

(10) Patent No.: US 10,429,959 B2
(45) Date of Patent: Oct. 1, 2019

(54) MINICOMPUTER WITH A ROTATING UNIT AND METHOD OF OPERATING THE MINICOMPUTER

(71) Applicant: INVENTUS ENGINEERING GMBH, St. Anton i.m. (AT)

(72) Inventor: Stefan Battlogg, St. Anton I.M. (AT)

(73) Assignee: Inventus Engineering GmbH, St. Anton i.m. Montafon (AT)

( * ) Notice: Subject to any disclaimer, the term of this patent is extended or adjusted under 35 U.S.C. 154(b) by 402 days.

(21) Appl. No.: 15/200,945

(22) Filed: Jul. 1, 2016

(65) Prior Publication Data
US 2017/0045958 A1    Feb. 16, 2017

Related U.S. Application Data

(63) Continuation-in-part of application No. 14/747,025, filed on Jun. 23, 2015, which is a continuation-in-part (Continued)

(30) Foreign Application Priority Data

Sep. 15, 2010  (DE) .............. 10 2010 045 436
Dec. 23, 2010  (DE) .............. 10 2010 055 833
Jul. 1, 2015   (DE) .............. 10 2015 110 634

(51) Int. Cl.
*H05K 5/00* (2006.01)
*G06F 3/0362* (2013.01)
(Continued)

(52) U.S. Cl.
CPC .......... *G06F 3/0362* (2013.01); *F16D 37/02* (2013.01); *F16D 57/002* (2013.01); *G04G 21/08* (2013.01); *G05G 1/08* (2013.01); *G05G 5/03* (2013.01); *G06F 1/163* (2013.01); *G06F 1/169* (2013.01); *G06F 3/038* (2013.01); *G06F 3/0482* (2013.01); *G06F 3/0487* (2013.01);
(Continued)

(58) Field of Classification Search
CPC ........................................................ H05K 5/00
See application file for complete search history.

(56) References Cited

U.S. PATENT DOCUMENTS 9,091,309 B2   7/2015  Battlogg
2002/0057152 A1   5/2002  Elferich et al.
(Continued)

FOREIGN PATENT DOCUMENTS

DE   10245354 A1   4/2004
DE   102010055833 A1   3/2012
EP   1168622 A2   1/2002

*Primary Examiner* — Jerry Wu
(74) *Attorney, Agent, or Firm* — Laurence A. Greenberg; Werner H. Stemer; Ralph E. Locher

(57) ABSTRACT

A minicomputer has a processor and a display unit and a communication unit and a haptic operating device. The haptic operating device has a rotatable rotating unit with a rotational resistance which can be changed by way of a control device. Selectable menu items are displayed on a display unit and a menu item is selected by rotating the rotating unit. A rotational resistance of the rotating unit is dynamically changed during a rotation of the rotating unit and the rotating unit is latched at a plurality of haptically perceptible latching points during the rotation of the rotating unit.

20 Claims, 4 Drawing Sheets

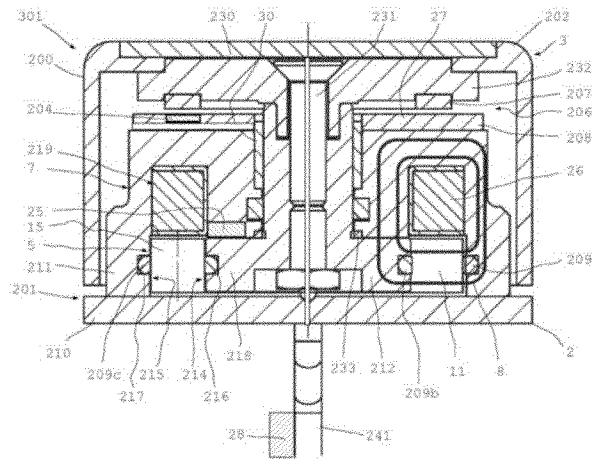

US 10,429,959 B2
Page 2

Related U.S. Application Data of application No. 13/823,781, filed as application No. PCT/EP2011/004623 on Sep. 15, 2011, now Pat. No. 9,091,309.

(51) Int. Cl.
| | |
|---|---|
| *G05G 5/03* | (2008.04) |
| *G05G 1/08* | (2006.01) |
| *F16D 57/00* | (2006.01) |
| *G06F 3/038* | (2013.01) |
| *G06F 1/16* | (2006.01) |
| *G06F 3/0482* | (2013.01) |
| *G06F 3/0487* | (2013.01) |
| *G04G 21/08* | (2010.01) |
| *F16D 37/02* | (2006.01) |
| *F16D 37/00* | (2006.01) |

(52) U.S. Cl.
CPC .................. *F16D 2037/002* (2013.01); *F16D 2300/0214* (2013.01); *F16D 2300/18* (2013.01)

(56) References Cited

U.S. PATENT DOCUMENTS

| | | | |
|---|---|---|---|
| 2006/0055582 A1 | 3/2006 | Wendt | |
| 2010/0283588 A1* | 11/2010 | Gomez | G06F 3/016 340/407.2 |

* cited by examiner

MINICOMPUTER WITH A ROTATING UNIT AND METHOD OF OPERATING THE MINICOMPUTER

CROSS-REFERENCE TO RELATED APPLICATION

This application is a continuation-in-part of copending patent application Ser. No. 14/747,025, filed Jun. 23, 2015; which was a continuation-in-part of patent application Ser. No. 13/823,781, filed Mar. 15, 2013, now Patent No. U.S. Pat. No. 9,091,309 B2, issued Jun. 28, 2015; which was a § 371 national stage of international patent application PCT/EP2011/004623, filed Sep. 15, 2011; this application further claims the priority of German patent applications DE 10 2010 045 436, filed Sep. 15, 2010, DE 10 2010 055 833, filed Dec. 23, 2010, and DE 10 2015 110 634.5, filed Jul. 1, 2015; the prior applications are herewith incorporated herein in their entirety.

BACKGROUND OF THE INVENTION

Field of the Invention:

The present invention relates to a minicomputer and a method. In particular, the invention relates to a smartwatch or a smart device having a processor and a display unit and a communication unit and an operating device, the operating device comprising a rotatable rotating unit.

The prior art has disclosed minicomputers and, in particular, handheld computers or smartwatches each having a processor and a display unit. In the case of minicomputers having a small display size in particular, as is the case with smartwatches, operation using the finger may be difficult since the fingertip on the display covers a large part of the display.

Minicomputers in which, in a similar manner to that in conventional watches, a rotating crown is used to control various menu items or regions on the display by rotating the crown have therefore been disclosed. A smartwatch equipped with said rotating crown is considerably easier to operate than if the smartwatch can be operated only by gesture control.

EP 1 168 622 A2 has disclosed, in FIG. 1, an electronically controlled fluid-filled rotary knob as a haptic operating element, a thin shearing gap which is filled with magnetorheological fluid being provided between a rotationally fixed soft magnetic yoke ring and a likewise rotationally fixed soft magnetic ring. A thin-walled and rotatable adjusting wheel is arranged in the shearing gap. A corresponding braking torque acts on the basis of a magnetic field acting on the shearing gap. The disadvantage of this is the extremely extensive thin shearing gap which surrounds the stationary outer soft magnetic ring on the outside and inside, with the result that the base friction is very high on account of the included fluid (magnetorheological fluid=viscosity similar to honey). In addition, the adjusting wheel is predefined by the shape of the rotationally fixed soft magnetic ring which is part of the magnetic circuit. As a result, the adjusting wheel cannot be produced from any desired materials. FIG. 2 of EP 1 168 622 A2 discloses another exemplary embodiment in which the adjusting wheel is used as return iron and is a rotatable part of the magnetic circuit. The adjusting wheel completely surrounds a stationary arrangement of a yoke iron, coils and a plurality of yoke rings. The magnetic field runs radially through the shearing gap. The disadvantage is the thin shearing gap which is likewise very extensive and is practically as large as the inner surface of the adjusting wheel. In addition, the adjusting wheel is part of the magnetic circuit and can therefore be produced only from particular materials having required magnetic properties. FIG. 3 of EP 1 168 622 A2 discloses another exemplary embodiment having a rotating actuator and a laminated stator part which consists of soft magnetic material, has an armature winding and produces a radially running magnetic field in a magnetically active gap between a radially inner stator part and a radially outer stator part. Both stator parts are connected to one another and consist of a soft magnetic material. The gap contains an annular and non-magnetic rotor which is connected to a bell-shaped operating body via a shaft. The gap also contains a magnetorheological fluid. Around the shaft, the rotor has a bell-shaped rotor body, the annular wall of which engages in the gap between the radially inner stator part and the radially outer stator part. In this exemplary embodiment as well, the shearing area between the rotor body and the stator parts is very large, thus producing a very high base torque. Operation using a finger is not possible in daily operation. Therefore, a haptic operating element according to EP 1 168 622 A2 is not suitable for use as a sensitive haptic operating element for a minicomputer or a smartwatch. The required operating forces are precisely much too large for such applications.

It has been found during tests that a haptic operating element can be used commercially as a standard product for infotainment in automobiles, for rotating actuators on smart devices or as an actuator on devices (for example: oscilloscope), for example, virtually only when the base torque (idling torque with the magnetic field switched off; off-state torque) is less than 0.2 Newton meters (Nm). This applies to typical rotary knob diameters of 30, 40 or 50 mm. If a particularly small rotary knob diameter (for example <5 or 10 mm) is used, a considerably lower base torque is very advantageous.

A base torque of less than 0.2 Nm cannot be easily achieved in a standard product with a magnetorheological basis. Brakes or clutches with magnetorheological fluid (MRF) can be used in steer-by-wire (large steering wheel or large force introduction distance) or to brake operations in machines. In commercially available products, the base torque is 0.4 to 0.6 Nm, that is to say a factor of 10 to 40 above the prior art of purely mechanical rotating actuators. The maximum torque of these units is between 5 and 12 Nm. The important factor between the base torque and the maximum torque (operating range factor) is therefore in the range of 12 to 20 in the prior art. Therefore, no MRF operating knob according to the MRF shearing principle has hitherto been implemented as a standard part in automobiles, for example. The situation is similar in smartwatches or other smart devices or when a lower base torque is required.

SUMMARY OF THE INVENTION

It is accordingly an object of the invention to provide a device and a method which overcome the above-mentioned and other disadvantages of the heretofore-known devices and methods of this general type and which provide for an improved operation option for minicomputers and, in particular, for smartwatches.

With the foregoing and other objects in view there is provided, in accordance with the invention, a minicomputer, comprising:

(1) a processor, a display unit connected to said processor and a communication unit connected to said processor;

(2) a haptic operating device including a rotatable rotating unit having a rotational resistance opposing a rotation thereof;

(3) a controllable transmission apparatus operatively associated with said rotating unit and configured for dynamically changing a rotational resistance against a rotation of said rotating unit during the rotation thereof, said controllable transmission apparatus including a magnetic field generating unit and an amount of magnetorheological medium disposed to magnetically adhere to said rotating unit upon being subjected to a magnetic field generated by said magnetic field generating unit and to thereby vary the rotational resistance acting on said haptic operating device against a rotation thereof; and (4) a control device configured for adjusting the rotational resistance of said haptic operating device A minicomputer according to the invention is in the form of a smartwatch or a smart device, in particular, and can be worn on a user's wrist, for example. The minicomputer has at least one processor and at least one display unit and at least one communication unit. A haptic operating device is also provided. The haptic operating device has, in particular, a basic body and a rotatable rotating unit. The haptic operating device has a rotational resistance which can be changed by means of a control device.

The haptic operating device also preferably has a controllable transmission apparatus in order to make it possible to dynamically change the rotational resistance during rotation of the rotating unit. In particular, the transmission apparatus has at least two components which can be coupled, and the coupling intensity of which can be influenced. A magnetorheological medium which can be influenced by a magnetic field and has magnetically polarizable particles is arranged in a channel between the couplable components for the purpose of influencing the coupling intensity. At least one magnetic field generation device is provided for generating at least one magnetic field in order to influence the magnetorheological medium using the magnetic field. The basic body is coupled to one of the two components and the rotating unit is coupled to the other of the two components. For example, it is possible for the rotating unit to be rotatably held and/or mounted on a housing of the minicomputer. The basic body can be coupled directly or indirectly to one of the two components and the rotating unit can be coupled directly or indirectly to the other of the two components. Coupling via a transmission, toothing or kinematics, for example, is possible. In particular, at least one rotatable transmission element is arranged in the channel as a magnetic field concentrator, the rotatable transmission element being caused to rotate during a rotational movement of at least one of the components which can be coupled.

The minicomputer according to the invention has many advantages. A considerable advantage is that the operating device can be changed during operation. As a result, an adapted rotational resistance can be adjusted to the user during rotation of the haptic operating device or during rotation of the rotating unit on the basis of the current state and the current conditions.

In preferred developments, the rotating unit is assigned a controllable transmission apparatus which can be used to dynamically change the rotational resistance during rotation of the rotating unit. The controllable transmission apparatus may be used as a braking unit and may suitably set the rotational resistance. In particular, the rotating unit is rotatable with respect to the basic body and/or a housing of the minicomputer.

A considerable adavantage of the invention is that the magnetic field concentrator concentrates the magnetic field onto a smaller area. The transmission element may be in the form of a ball or roller, for example, without being restricted to these forms, and concentrates the magnetic field, that is to say the magnetic field is changed between the two components which are moved relative to one another and is concentrated from a large area onto a small area (a transition area). The ratio of these areas is considerably greater than 1 and, in particular, greater than 2, greater than 5 or, in particular, greater than 10 or even 20 or 50. In principle, this is the ratio of the cylindrical area of the inner ring in relation to (the region of) the tangent edge of a roller or in relation to a ball point multiplied by a number of the transmission elements, in particular 15, for example.

The transmission element concentrates the magnetic field and forms a magnetic field or flux density concentrator.

The transmission element is connected neither to the first component nor to the second component in a rotationally fixed manner. The field concentrator can move "arbitrarily" between the two components.

Such a minicomputer according to the invention has many advantages. The minicomputer allows a very small base torque, thus making it possible to easily rotate the rotating unit or a rotary knob formed on the haptic operating device. An operator can conveniently rotate the rotating part, for example a crown of a smartwatch, using his little finger. A base torque which is less than 0.2 Nm and, in particular, less than 0.10 Nm and possibly less than 0.07 Nm and preferably less than 0.05 Nm is enabled, thus enabling convenient operation in daily use even if used frequently. It is not necessary to grip the rotating part using two fingers in order to rotate the rotating part (even repeatedly in succession). Simple touching and rotating using only one finger also generally suffice.

At the same time, a simple structure is enabled and only few parts are used. As a result of the simple structure, in which torque is transmitted through the magnetorheological medium or magnetorheological fluid (MRF) only inside the channel at least to the greatest extent, a particularly low base torque (base torque=torque needed for rotation when the electrical coil is switched off) can be achieved during operation of the minicomputer.

A minicomputer having an operating element according to EP 1 168 622 A2 could not be used since the base torque would be too high because a very large amount of shearing area is used. The ratio of active area to useful area (shearing area) is very unfavorable there. The shearing gap must be small for technological reasons, which in turn greatly increases the friction (fluid friction). The active shearing gap filled with MRF is very large.

In the present invention, the channel on the minicomputer has a large radial extent (channel height), with the result that the base friction caused by the MRF per se, when the magnetic field is switched off or is low, is very low on account of the large radial extent. The large radial extent results in a large channel area. In contrast to this, however, the transmission/contact areas are very small. Only transmission elements (for example rollers) affect the moving and stationary parts. The channel is very large and has low fluid friction.

In the structure according to EP 1 168 622 A2, the very thin gap contains MRF, which has substantially worse coefficients of friction on account of the iron particles and high viscosity (similar to chocolate sauce). The structure according to EP 1 168 622 A2 resembles a sliding bearing and the structure resembles a rolling bearing here. A base torque of <0.1 Nm is not possible in the case of an MRF structure according to the shearing principle, which is intended to be able to be commercially used as a standard product. A smartwatch having such an operating element can be operated only with difficulty.

In particular, the basic body comprises a base plate and an annular holding housing with a holding space arranged in the latter, the holding space being radially delimited to the outside by an outer limb of the holding housing extending substantially in the axial direction. The shaft is preferably rotatably held centrally on the holding housing. In particular, the electrical coil is held in the holding space. In particular, a circumferential ring which is connected to the shaft in a rotationally fixed manner adjoins the holding housing in a radially inner region and in a manner separated by a thin axial gap. The channel is preferably arranged in the holding space and is radially delimited to the outside at least substantially or completely by the outer limb and is radially delimited to the inside at least substantially or completely by the circumferential ring, with the result that a substantial part of the magnetic field from the magnetic field generation device runs through the holding housing, the channel and the circumferential ring.

The holding housing particularly preferably comprises an inner limb in the radially inner region, which inner limb is adjoined by the circumferential ring in a manner separated by the thin axial gap. In particular, a radial cross section of the holding housing has an approximately U-shaped configuration. The holding space is then encompassed between the inner limb and the outer limb. The outer limb is preferably longer than the inner limb.

In particular, the shaft is held in a central passage on the inner limb. The electrical coil is preferably held in the holding space between the inner and outer limbs.

The inner limb is preferably separated from the circumferential ring connected to the shaft by the thin axial gap.

The circumferential ring preferably consists of a soft magnetic material and the shaft has a hardened surface or an accordingly hard surface coating. This makes it possible to reliably prevent run marks of the bearing, and suitable and good magnetic properties are provided.

A configuration in which a radial cross section of the holding housing has an approximately U-shaped design and a circumferential inner limb (running in the axial direction) and a circumferential outer limb running approximately concentrically with respect to the latter are included and the circumferential ring connected to the shaft in a rotationally fixed manner axially adjoins the inner limb (separated only by a thin gap) provides very many advantages. A compact and cost-effective structure, in which only a very low base friction occurs, is enabled. A base torque of less than and even considerably less than 0.1 Nm is enabled. Therefore, rotary knobs which need to be operated frequently and do not have to be firmly gripped with the entire hand or two fingers but also rotary knobs which can be moved using one finger and only a gentle pressure can also be equipped. The structure enables an optimum magnetic circuit in which the magnetic resistances are low.

At least one display unit is preferably assigned.

The control device is preferably suitable and designed to dynamically set the rotational resistance of the transmission apparatus in the rotating unit. This means that the rotational resistance of the transmission apparatus can be settable on the basis of the rotational angle. For example, a stop can be set in at least one direction of rotation, with the result that the user notices an appreciably larger rotational resistance during rotation of the rotating unit and upon reaching a certain rotational angle.

It is possible for the rotational resistance to be changed in particular stages or continuously. It is also possible to provide end stops in both directions of rotation.

In preferred developments, the control device is set up to dynamically generate a haptic latching pattern during rotation of the rotating unit. Such a haptic latching pattern has a changed rotational resistance at at least one angular location. For example, the rotational resistance can be reduced at one angular location in comparison with adjacent angular locations. It is also possible for the rotational resistance to be increased at a particular angle location, whereas it is lower, in relative terms, at adjacent angular locations.

It is also possible to generate relative maxima of the rotational resistance, between which a relative minimum of the rotational resistance is applied, at two relatively closely adjacent angular locations. This makes it possible to achieve perceptible latching.

In all configurations, the torque profile required for rotation is preferably dynamically changed during rotation of the rotating unit.

The rotating unit is preferably rotatable with respect to the display unit. The display unit is particularly preferably connected to the basic body in a rotationally fixed manner.

It is possible for a sensor to be provided, which sensor is used, in particular, as an angle sensor and can be used to sense an angle change and, in particular, an absolute angle position between the rotating unit and the basic body. As a result of such a sensor or angle sensor, it is possible to react to a rotational movement of the rotating unit at any time.

It is preferably possible to detect the direction of rotation. A high angular resolution is preferably possible. The finer the angular resolution, the earlier it is possible to recognize (or speculate) the wishes of the operator (reversal of the direction of rotation, finer adjustment). The control device (electronics/software) can react accordingly. A Hall sensor (EP 1 168 622 A2) is generally much too inaccurate for this purpose since only a few hundred "counts/revolution" are possible. The sensor or angle sensor is preferably designed to enable an angular resolution of $0.2°$ and, in particular, at least $0.1°$ or $0.05°$ or better. Angular resolutions of more than 100,000 "counts/revolution" (better than approximately 1/300 degree) are desirable. With an angular resolution of better than $0.2°$ or $0.1°$, a movement pattern can be derived from extremely small movements.

In the case of low sensor resolutions, the "operating element" or the rotating unit or the rotary knob can remain with a "sticking" feeling (a high torque is needed for actuation), which haptically feels very unpleasant and is therefore very disadvantageous. In the case of a reversal of the direction of rotation at an end stop, for example, a high torque must then be initially applied even though the user wishes to carry out rotation in the opposite direction and a release can therefore be effected. Only the control device must initially "notice" that rotation is being carried out in the opposite direction, for which purpose the operating element must be moved by at least one latching step. In this case, a high angular resolution helps considerably.

The (visible) part of the rotary knob (visible part of the rotating unit) particularly preferably does not form part of the magnetic circuit. The visible part of the rotary knob can particularly preferably have any desired design; the rotary knob can thus be chromium-plated or can be made of plastic or glass or can be covered with leather etc. since the rotary knob is a "design element".

The transmission elements or rotating bodies (running rollers) are preferably rounded or cambered on the end face so that they axially have only point contact with the base plate or the cover. This considerably reduces the base friction and therefore the base torque.

It is possible to dispense with a contact ring.

The shaft is preferably magnetically conductive, thus reducing the size, weight and costs. The shaft preferably consists of a low-alloy steel, for example S235. So that the seal running thereon does not produce much friction and does not damage the shaft (race), the shaft is preferably hard-chromium-plated.

The circumferential ring preferably consists of steel having good magnetic conductivity or soft magnetic steel and is connected to the shaft in a rotationally fixed manner, in particular pressed.

The operating knob or the rotating unit is preferably connected to the shaft via a torque transmission element, for example a square with a slot. The operating knob or the rotating unit is braced without play by the torque transmission element (for example screwing using a countersunk screw).

It is possible for the minicomputer to be activated from a standby mode or idle mode and to change to an operating mode and vice versa by means of rotational movement of the rotating unit.

Preferably, the control device is suitable and designed to dynamically control the magnetic field generation device and to dynamically generate the magnetic field from the magnetic field generation device or a corresponding force on the basis of a rotational angle in order to provide a dynamic and angle-dependent haptic latching pattern.

In ongoing developments at least one separate contact ring or one separate contact element is arranged between the two components, wherein the contact ring and/or the contact element is/are elastic. Such a contact ring can have a round, square, oval or other cross section.

A channel is preferably formed between the two components, and in particular at least a plurality of rotating bodies are provided in the channel.

The basic body comprises, in particular, a base plate and a holding housing. A shaft can be rotatably held on the holding housing. In particular, a magnetorheological medium is held between the basic body and the shaft. The holding housing may be the housing of the minicomputer.

In all configurations, a gap or a channel, which is at least partially filled, in particular, with a magnetorheological medium and, in particular, a magnetorheological fluid, can be provided between the rotating unit and the basic body. A controllable magnetic field which acts on the channel can be used to influence a coupling intensity between the rotating unit and the basic body, with the result that a coupling intensity and therefore the rotational resistance can be varied during rotation of the rotating unit by deliberately temporally generating and/or switching off the magnetic field.

For example, a considerable haptic distance can be felt if a rotational resistance or a torque needed to rotate the rotating unit is changed from 0.02 newton meters to 0.04 newton meters.

In preferred developments, the rotating unit is connected to the shaft in a rotationally fixed manner. The shaft is in particular rotatably supported at one end on the base plate. The basic body can have in each case a circumferential running surface for the rotating bodies adjacent to the base plate. At least one running surface in particular has at least one circumferential groove for the rotating bodies. The running surface of the shaft can be formed on an enlarged circumferential ring and have an increased diameter. In particular, the circumferential ring is separated, on an end face, from an end face of the holding housing by a gap. A free axial distance in the gap is preferably considerably shorter than a free radial distance at the channel between the rotating unit and the basic body.

A holding space which may be annular, for example, is preferably formed in the holding housing. An electrical coil is preferably arranged in the holding space. The electrical coil is arranged, in particular, substantially axially adjacent to the rotating bodies.

It is preferred for the holding housing and the circumferential ring to consist of a material with better magnetic conductivity than the base plate.

In particular, the two components of the transmission apparatus can be coupled to one another selectively and in a controlled manner.

In the sense of this application, the term "coupling intensity" is understood as meaning the coupling force and/or the coupling torque between the two components. If linear force transmission is desired, for example, the coupling intensity corresponds to the coupling force. If a torque is intended to be transmitted, the coupling intensity is used to mean the coupling torque.

The viscosity of the magnetorheological medium can preferably be changed by the field, as a result of which it is possible to influence the displacement work needed for the relative movement of the components and/or rotating bodies which can be moved relative to one another.

Displacement work is also understood as meaning the displacement force needed to displace the medium during a relative movement.

A considerable and surprising advantage of the magnetorheological transmission apparatus used results from the considerably intensified effect of the magnetic field from the magnetic field generation device in the channel. The acute-angled region containing the medium acts as a lever and therefore virtually like a strong mechanical lever transmission, the lever considerably intensifying the effect of the magnetic field by a multiple. As a result, either the field strength of the magnetic field generation device can be reduced with an effect which remains the same or the effect of the magnetic field is intensified with a field strength which remains the same or the effect is even considerably increased with a reduced field strength. The acute-angled region containing the medium increases the effect by a multiple, in particular, if the magnetic field acts on the medium. In particular, the magnetic field acts at least occasionally on the acute-angled region which contains the magnetorheological medium or is formed.

As a result of the fact that the rotating body is arranged at a considerable free distance from the at least one component, a macroscopic wedge which can be used to transmit strong clutch or braking torques can be produced. Considerable construction volume can be saved as a result of the completely surprising multiplication of the effect. The effect used is based on the wedge formation (cluster formation) and not only the magnetorheological concatenation of individual particles. The typical reaction time for the wedge formation requires several milliseconds, while individual particles are concatenated according to the MRF effect already within approximately 1 millisecond. This time duration, which is multiple times longer, is due to the wedge formation. Such a considerable intensification of the effect was not expected. The longer reaction time of, for example, 5, 10, or 20 milliseconds is more than sufficient in many applications.

The channel can also be an intermediate space or a space which is open on four sides.

An acute-angled region of the channel is defined as that channel region which appears approximately to have an acute angle in at least one cross section through the shape of the rotating body and components. The sides of the region do not have to be straight and can also be curved and/or have another contour. The acute-angled region defines that part of the channel in which the rotating body and components are at the shortest distance from one another, in particular, or touch, and the adjoining region, in which the surfaces of the rotating body and components move away from one another.

Under the effect of a magnetic field, the acute-angled region containing the magnetorheological medium is formed, in which a considerably increased viscosity is present.

Excellent torque to weight ratio, which can be greater than 100 Nm/kg, is possible.

A rotating body is preferably set into a rotational movement by a relative velocity in relation to at least one component. It is possible for the circumferential velocity of the rotating body to be equal to the relative velocity in relation to the component. However, it is also possible for the circumferential velocity of the rotating body on its outer surface to be greater than or less than the relative velocity. In particular, it is possible for the circumferential velocity of the rotating body on its outer surface to be less than the relative velocity of the rotating body in relation to the component.

The rotating body can be designed to be substantially rotationally symmetrical around at least one axis of rotation. It is likewise possible for the rotating body to be designed to be rotationally symmetrical around a plurality of axes of rotation. For example, the rotating body can be in the form of a sphere or ellipsoid. It is also possible for the rotating body to be in the form of a cylinder, roller, or generally a rolling body. In particular, an approximately cylindrical configuration has proven to be advantageous since, in the case of a cylindrical rotating body, for example, the acute-angled region containing the medium forms over the entire width of the rotating body and is thus substantially wedge-shaped. In these and other configurations, the acute-angled region has a wedge shape.

However, it is not necessary for the rotating body to be rotationally symmetrical. Rotating bodies having elliptical or egg-shaped cross sections or rotating bodies having indentations like golf balls or having regular or irregular indentations and/or protrusions can also advantageously be used. The surface of the rotating bodies can be smooth, but does not have to be. Since the rotating bodies are not used to mount and support the components relative to one another, a symmetrical and/or smooth surface is not necessary. Rotating bodies having a rough and/or irregular surface can even be advantageous since the wedge effect is intensified. Increased wear does not occur since the rotating bodies are not used for mounting and transmitting load-bearing forces.

The effect is preferably not intensified solely due to intensification or bundling of the magnetic field, but rather above all also due to the particles clustered in front of the rotating bodies or rollers and the compaction thereof. Owing to the magnetic field, the particles cannot move away and thus compact more rapidly to form a wedge. The wedge can be externally controlled easily via switch. The advantage in the case of magnetorheological fluids such as MRF is that the wedge can disengage again by canceling the magnetic field. The wedge can be influenced using the magnetic field—without mechanical movement or force introduction.

It has proven to be advantageous for targeted influencing and reliable control that the free distance between the rotating body and the component is greater than a multiple of the particle diameter.

The diameter of the particles of the magnetorheological medium is between 1 µm and 10 µm, in particular. The typical mean diameter of the particles of the magnetorheological medium is the arithmetically averaged diameter of the particles, which are larger than the smallest percent and which are smaller than the largest percent. As a rule, this value corresponds to the mean value of the diameters of the largest and the smallest particle, that is to say 5.5 µm in the selected example. If, however, for example, a very small number of even smaller particles are present, this does not change the typical mean diameter thus determined. The same applies if, for example, individual particles having a diameter of 10.5 µm or 11 µm are to be included.

The free distance between the rotating body and the component is preferably greater than 30 µm and, in particular, less than 300 µm. The typical mean diameter of the particles is preferably between 3 µm and 7 µm. The free distance between the rotating body and the component is preferably greater than 70 µm and, in particular, less than 250 µm.

The acute-angled region advantageously wedges the two components, which are freely movable relative to one another without a magnetic field, upon application of a magnetic field. A mechanical wedge in the form of a separate fixed part is not required for this purpose.

The acute-angled region is preferably provided between the body and one component in such a manner that the acute-angled region tapers in the direction of the relative movement of the component relative to the rotating body. If a cylindrical rotating body rolls on a flat surface of one component, the acute-angled region forms in a wedge shape in front of the rotating body. A wedge which is concatenated as a whole and inhibits the relative movement of the rotating body to the component arises due to the concatenation of the particles in the medium.

The rotating body and, in particular, each rotating body is particularly preferably in the form of a separate part between the first and second components. It is then preferred for one component, as the outer component, to surround the other component, as the inner component. For example, a (drive) shaft can be provided as the inner component. The other or outer component can be used for braking, for example, and can radially surround the shaft. The rotating bodies can be provided between the shaft and the outer component. It has been shown that rotating bodies which rotate around their own axis are considerably better for achieving the wedge effect. Finished bearing shells are not necessary. The transmission of a clutch or braking torque functions independently of the quality of the rolling surfaces.

At least one separate bearing or roller bearing is provided for mounting the two components. The rotating bodies ensure, with the wedge effect, the transmission of the desired torques, while the roller bearing or bearings ensure(s) the defined guiding and support of the two components and the uniform running gap.

In all configurations, the free distance is preferably at least twice, five times and, in particular, ten times as great as the largest typical particle diameter. In specific configurations, a free distance of between approximately five times and, in particular, ten times and twenty times the largest typical particle diameter has proven to be advantageous. In the case of larger free distances, the maximum transmittable torque is reduced again since the wedge effect subsides. In the event of excessively short free distances, a blockade can occur even without a magnetic field. In addition, disengagement of the wedge after the shutdown of the magnetic field then cannot always be ensured.

The mean particle diameter is understood as meaning the arithmetic mean of minimum and maximum particle diameters. Most MRF have magnetically polarizable particles which have a size distribution of between approximately 1 μm and 10 μm. The mean particle diameter is 5.5 μm in this example. In the case of variable size distributions, the largest typical particle diameter is understood as meaning a particle diameter which is exceeded by only fewer than 1% of the particles. The largest typical particle diameter is somewhat less than 10 μm in the mentioned example, so that 10 μm can be presumed to be the largest typical particle diameter here.

The free distance is preferably greater than 1/500 and preferably greater than 1/250 and, in particular, greater than 1/100 and particularly preferably greater than 1/50 of a diameter of at least one rotating body, and, in particular, the free distance is less than 1/10 and, in particular, less than 1/20 of the diameter of the rotating body.

The free distance is preferably greater than 1/300 of the external diameter of the inner component and/or greater than 1/500 of the internal diameter of the outer component. The free distance is preferably greater than 30 μm and in particular less than 200 μm.

Variations by +/−20% are preferably possible in the case of all numeric specifications. A particle is understood as meaning a magnetically polarizable particle.

If oversized rotating bodies and/or shaft diameters are used, other distances can be advantageous. An advantage of this magnetorheological transmission apparatus having at least two components which can be coupled is that the wedge formation is manufacturing tolerant, that is to say, for example, manufacturing-related and installation-related differences in gap heights, surfaces, dimensions and also thermal expansions or load-related shifts of components have a minor influence thereon and cause negligible torque or force differences.

For example, a structurally related change of the gap within certain system limits can also be detected by sensors and worked out by field adaptation, for example.

In preferred configurations, the rotating body is part of the first or the second component. This means that the rotating body, which is in the form of a rotating body, for example, is part of the first component and rolls on the second component, for example. The rotating body can also be without mechanical connection to both components, however.

In the acute-angled region, which is wedge-shaped, for example, the ferromagnetic particles concatenate in the medium upon application of an external magnetic field and result in a locally more solid structure which opposes the further relative movement between the rotating body and the adjacent component. The particles in the wedge-shaped part can be additionally compacted in the direction of movement in front of the rotating body by the rolling movement of the rotating body. However, depending on the design of the rotating body, this compaction can also be performed by pitching, tilting, or other movements relative to a component.

For example, if the rotating body rolls on the surface of one component and such an acute-angled region forms in front of the rotating body, particles in the medium are entrained and set into rotational movement by the outer surface due to the rotational movement of the rotating body, but the hardening acute-angled region strongly opposes such a rotational movement. The acute-angled region in wedge shape results in a force on the rotating body away from the component. Such a force and a movement resulting therefrom can optionally also be used for fine adjustment purposes. A rotational movement can preferably be converted into an axial displacement of the rotating body by the acute-angled region in wedge shape when the magnetic field is activated. The rotating body is thus virtually caused to float by the particles. It is also possible to provide the rotating body or a component with thread-shaped notches, for example, or to mount them at an incline relative to one another, in order to change the effective direction of the resulting force or to further increase the achievable force transmission. A linear movement can thus be converted into a rotational movement using a type of threaded rod. The relative movement is inhibited by applying a field.

It is likewise preferred for the rotating body to be in the form of a separate part between the first component and the second component. Such a configuration can be particularly advantageous since two acute-angled regions or wedge-shaped regions can occur between the rotating body and the two components. If the rotating body practically rests against the first component on one side and practically rests against the second component on the other side, acute-angled regions which are subjected to the magnetic field from the magnetic field generation device form on both sides. The effect is thus increased. It is not necessary for this purpose for the rotating body to rest completely against the first component or the second component. A small gap remains between the rotating body and the respective component. The size of the gap is dependent, inter alia, on the properties of the medium. In particular, the size of the gap can be at least five times and preferably at least ten times or twenty times a typical or mean particle diameter.

The ferromagnetic particles consist, in particular, of carbonyl iron powder. The fluid can be—an oil, for example.

It is also possible for magnetorheological and electrorheological media to be used jointly. The use of other media which are influenced and concatenated, for example, by corresponding fields is also conceivable. It is likewise possible to use media which change their rheological properties depending on other physical variables such as temperature or shear velocity. The channel can be completely or also only partially filled with the medium. At least the acute-angled region of the channel is preferably filled with the medium.

In all configurations, the first and/or second component can be rotationally symmetric. For example, the components can each be in the form of plates or cylindrical bodies, between which rotating bodies are provided, in order to increase the effect of the magnetic field from the magnetic field generation device accordingly through the wedge effect.

In all configurations, it is preferred for the magnetic field to run through the rotating body and, in particular, substantially transversely to the relative movement of the components relative to one another and from one component to the other component at least partially through the rotating body. Such a configuration has proven to be particularly effective since the effect of the magnetic field at the transition points from the rotating body to the walls of the channel is particularly strong. Depending on the acting magnetic field, it is therefore advantageous if the rotating body is at least partially magnetically conductive. In particular, at least one component and in particular both components and/or the at least one rotating body is/are made at least partially of a ferromagnetic material. The relative permeability is preferably greater than 500. The relative permeability of the material can also be 1000, 2000, or more. Rotating bodies made of a ferromagnetic steel, such as ST37, are possible, for example.

The material can be demagnetized by a damped magnetic alternating field, so that a lower base torque is achieved without a residual field.

In all configurations, it is preferred for the magnetic field generation device to comprise at least one permanent magnet and/or at least one coil. It is also possible to use one or more permanent magnets and one or more electrical coils.

It is possible and preferred to permanently change the magnetization of the permanent magnet by means of at least one magnetic pulse from an electrical coil. In such a configuration, the permanent magnet is influenced by magnetic pulses from the coil such that the field strength of the permanent magnet is permanently changed. The permanent magnetization of the permanent magnet can be set by means of the magnetic pulse from the magnetic field generation device to an arbitrary value between zero and the remanence of the permanent magnet. The polarity of the magnetization is also variable. A magnetic pulse for setting a magnetization of the permanent magnet is, in particular, shorter than 1 minute and preferably shorter than 1 second and the length of the pulse is particularly preferably less than 10 milliseconds.

As an effect of a pulse, the shape and strength of the magnetic field are permanently maintained in the permanent magnet. The strength and shape of the magnetic field can be changed by means of at least one magnetic pulse from the magnetic field generation device. The permanent magnet can be demagnetized by a damped magnetic alternating field.

AlNiCo, for example, is suitable as a material for such a permanent magnet with variable magnetization, but other materials having comparable magnetic properties may also be used. In addition, it is possible to produce the entire magnetic circuit or parts thereof from a steel alloy with strong residual magnetism (high remanence) instead of a permanent magnet.

It is possible to use the permanent magnet to generate a permanent static magnetic field which can have a dynamic magnetic field from the coil superimposed on it in order to set the desired field strength. The current value of the field strength can be varied arbitrarily by the magnetic field from the coil. It is also possible to use two separately controllable coils.

In all configurations, it is preferred to provide at least one control device. It is also possible to use an energy store, for example a capacitor, to store at least a fraction of the required energy. At least one sensor or a plurality of sensors can be used to detect relevant data, for example the relative velocity of the components in relation to one another or the prevailing field strength and the like. It is also possible to use a temperature sensor as the sensor, which triggers an alarm if predetermined temperature conditions are exceeded, for example. A rotational angle encoder can advantageously be used to have data relating to the angle position of the components in relation to one another at any time.

In all configurations, it is preferred that the permanent magnet at least partially consists of a hard magnetic material whose coercive field strength is greater than 1 kA/m and, in particular, greater than 5 kA/m and preferably greater than 10 kA/m.

The permanent magnet can at least partially consist of a material which has a coercive field strength of less than 1000 kA/m and preferably less than 500 kA/m and particularly preferably less than 100 kA/m.

The magnetorheological transmission apparatus is part of an operating device which comprises, in particular, an operating or control knob or the like.

The rotating body and at least one component can touch at at least one point or on at least one line. It is possible and preferred for the rotating body to be at rest relative to at least one component.

The rotating body can preferably move relative to at least one component, for example in the form of a rotational or tilting movement.

The field strength can have a strong gradient depending on the respective distance between the rotating body and components.

The field strength preferably increases in the acute-angled region between the rotating body and components toward the region having the shortest distance.

The need for maintenance is low since few and simple parts are used. If necessary, the maintenance can be carried out by simply replacing the magnetorheological fluid. The structure is simple and robust and power feedthroughs are not required. In addition, the energy requirement is lower than in the prior art because the wedge effect substantially contributes to influencing the relative movement of the components. It is possible to achieve a torque/weight ratio of >100 Nm/kg.

In magnetorheological clutches or brakes without a wedge effect, the magnetic field poles move relative to one another and generate shear forces (direct shear mode) in the interposed MR fluid. The shear forces vary depending on the magnetic field. No magnetic field means no or low shear forces (no chain formation in the MRF), maximum magnetic field means maximum shear forces and therefore maximum braking force or braking torque. In simplified form, the magnetic field and shear forces are proportional.

In the present invention, through appropriate design of the individual components, dimensioning, and field introduction, a very advantageous behavior which deviates therefrom can be provided. This advantageous behavior is expressed in that a substantially lower magnetic field, and therefore a lower current intensity, is needed to maintain the acute-angled embodiment or the MR fluid wedge than is needed for the initial generation of the wedge. This is because the particle cluster no longer falls apart so easily once it has first been accumulated and has been quasi-mechanically compacted by the special movements fundamental to this invention under the influence of a correctly introduced magnetic field. As a result, ---for example, after a corresponding time for achieving this state, a braking torque can be maintained using the fraction of the magnetic field or electrical power (coil current), which is advantageous in terms of energy.

If clutches having magnetorheological fluids according to the prior art are loaded beyond the maximum transmittable clutch torque, individual particle chains begin to break apart, whereby slip or slipping through results. The maximum clutch torque is maintained, however, or sometimes even slightly increases, and the clutch does not disengage. Depending on the application, this can be undesirable, for example, if a drill bit of a drill jams during drilling In the present invention, through appropriate design of the individual components, dimensioning, and field introduction, a very advantageous behavior which deviates therefrom can be provided. This advantageous behavior is expressed in that, if a maximum force is exceeded between the moving parts, the wedge (material cluster) generated by the magnetic field is suddenly pressed through the gap (material displaced) and the force decreases suddenly at the same time. On account of the relative movement resulting therefrom and the high applied force, a new wedge does not form, as a result of which the relative force remains low. In the case of overload clutches, this behavior is very advantageous. The maximum force (triggering force) or the maximum torque (triggering torque) can be preset via the magnetic field.

Furthermore, demixing, sedimentation, and centrifugal force problems are reliably avoided since continuous mixing of the particles in the medium is achieved by the rotating bodies which are rotating.

On account of the substantially higher transmittable torques and forces, it is possible to implement clutches, brakes or the like having substantially smaller diameters. On account of the low MRF channel height and the rotational movement of the rotating bodies, demixing is practically not relevant in the case of the present invention.

The invention can be used in manifold ways. Use in vehicles or in machine tools or household appliances is likewise possible.

The invention can also be used in the case of a three-dimensional movement. The rotation and pendulum movement can thus be restricted or blocked by the MRF wedge. The acting torque is continuously adjustable and switching times in the range of a few milliseconds can be achieved. The structure is simple and no mechanically moving parts are required for varying the torque. A further advantage is that almost noiseless operation is possible. The additional costs are low and a magnetorheological transmission apparatus according to the invention can be designed to be operationally reliable if, for example, a permanent magnet with remanence is used to set a magnetic field. The wedge effect enormously intensifies the effect, with the result that a smaller installation space is achievable.

In all configurations, the rotating bodies do not have to be smooth, but rather can have rough or uneven surfaces.

The minicomputer can also be used as a haptic operating device. Use is possible as controllers for crane operation or the like. In this case, the rotation can be controlled more stiffly, depending on the load. It can also be controlled on the basis of the load height.

The use in "force feedback" applications or in "steer by wire" applications is also of interest. The use of the minicomputer on operating elements in vehicles, automobile radios, stereo systems etc., is also possible.

In all configurations, it is also possible to use magnetic seals to seal an apparatus according to the invention, in addition to a seal with a sealing lip. The seal can be produced via a permanent magnet here. Advantages of such a configuration are smaller base forces, freedom from wear, and the permissibility of greater manufacturing tolerances. In addition, there is a defined overload behavior since a defined breakthrough occurs if the overload is exceeded. It is possible to use such a seal in front of or behind an apparatus according to the invention or to use it in front and behind.

A significant advantage of the magnetic seal is the very low friction; however, it can be necessary to use yet another seal since such a seal possibly only holds back MRF particles and allows oil as the base fluid to pass through the gap over time, for example. Therefore, such a magnetic seal can be used as an outer seal in order to hold back MRF particles. A further seal, for example a conventional seal, then only seals off the carrier medium.

A movement of the magnet can be used to achieve lubrication in the MRF, as well as material transport and cooling, for example via hydrodynamic effects. In addition, a flow away from the seal can be achieved and pressure differences can be dissipated.

In order to set the play between two parts, for example, or to remove play from a design and to compensate for manufacturing tolerances, for example, it is possible to use a force or an axial force and/or a radial force which is caused by an MRF wedge effect.

In all configurations, it is preferred to provide a settable permanent magnetic field strength via remanence. In preferred embodiments, a bearing having a magnetorheological transmission apparatus according to the invention has no or only minimal residual magnetism (remanence) itself. Otherwise, a position-dependent counterforce of different strength can occur since the parts move in relation to one another.

In advantageous configurations, the remanence material should be arranged in a general region of the bearing which is permeated, in particular, by the magnetic field in a position-independent manner, thus, for example, the inner shaft or the outer shell etc.

However, it is also preferred to use the effect of the position-dependent magnetization by using, for example, the inner running surface having remanence in order to generate specific latching torques, for example. This can be performed, for example, for haptic feedback about variable latching torques with respect to their strength, the rotational angle, or the end stop or the like. Not all bearing balls have to be ferromagnetic, depending on the desired setting capability.

It is also possible to provide a magnetorheological transmission apparatus having a design deviating from the conventional bearing structure. For example, the direction of the magnetic field can also be oriented at least partially or completely approximately parallel to the axis. At least partial orientation parallel to the rotational direction or movement direction or in the tangential direction is also possible. It is also possible for the entire magnetic circuit to be arranged nearly or completely in the interior or on the end face.

The material of the magnetorheological transmission apparatus does not have to be completely ferromagnetic; depending on the desired application or magnetization, it can be advantageous if individual parts of the magnetorheological transmission apparatus are not ferromagnetic or are only partially ferromagnetic.

Depending on the application, it is also conceivable to manufacture at least one part from different materials, to obtain locally differing magnetic properties.

The minicomputer preferably functions with a magnetorheological transmission apparatus with a wedge effect. The position or the rotational angle of the rotary knob can be determined via the rotary encoder and the rotational resistance can be varied in a wide range. Thus, for example, a haptic interface with variable latching torques and arbitrarily settable end stop can be constructed, which changes its properties depending on the currently selected menu. A low or high torque and/or a small or large latching pattern/ripple and also a variable latching pattern—depending on the menu to be operated—can be set. The profile of the torque increase and decrease can be set or varied depending on the situation, for example as a square-wave, sinusoidal, sawtooth, or arbitrary profile. A stop can also be simulated. The stop can be hard or can have a predefined or situation-dependent torque profile. The torque profile can be different during rotation in one direction than during rotation in the other direction.

The rotating unit or the rotary knob as one component is preferably fixedly connected to the shaft as the other component which is in turn rotatably mounted in the housing. The relative movement or relative position is detected via a rotary encoder, for example via a magnetic, optical or (via buttons) mechanical incremental encoder. A potentiometer with sliding contacts can also be used, but only specific rotational angles are usually permissible using said potentiometer.

A sealing ring is advantageous so that the magnetorheological fluid remains in the housing. The seal can also only consist of permanent magnets or a combination of a permanent magnet and a conventional seal.

The inner region, i.e. the volume enclosed by the seal and housing, is at least partially filled with a magnetorheological fluid.

The housing is preferably designed as a pot, i.e. it is closed on one side. Only one sealing ring is thus required. A continuous shaft (two-sided shaft) is also conceivable.

The coil can generate a magnetic field, wherein the magnetic circuit is closed via the housing, the shaft, and the magnetorheological transmission apparatus. The magnetic field required for the wedge effect can thus build up in the magnetorheological transmission apparatus. The coil is advantageously fixedly connected to the housing, which makes the cable routing easier.

The structure is robust and can be designed such that almost no magnetic stray fields are generated outside the housing. However, many other structure variants are conceivable, which can have specific advantages depending on the application.

For example, the coil can also be arranged outside the housing, the magnetic field then acting on the magnetorheological transmission apparatus through the housing. No mechanical connection is necessary here between the coil and the housing; the coupling of the magnetic circuits is sufficient to influence the magnetorheological transmission apparatus in the housing. In particular, the coil does not have to be permanently on or in proximity to the housing and can be designed such that it can be removed from the housing as a separate unit. Permanent magnets can also be provided in the magnetic circuit.

In a preferred embodiment, the rotary knob can be electromagnetically driven, for example, and can also actively exert a force (force feedback) in order to be able to statically generate a specific countertorque. In this design, a better torque to installation space ratio is achieved than in many designs according to the prior art. In addition, the production costs are low because of the simple structure since, for example, the rolling surfaces of the components do not have to be highly precise in haptic applications and also generally do not have to withstand high speeds and a large number of revolutions. In general, the magnetorheological transmission apparatus described here has a very low base friction (OFF state). A battery and a control command transmission unit (radio, WLAN, Bluetooth, antenna) are preferably also integrated in the actuator or rotary knob. The haptic knob can then be placed anywhere and does not require a wired control connection or current connection. The MRF wedge principle requires very little current (power) in relation to the torque. It is therefore also highly suitable for battery operation or for wireless energy supply. Both the required energy and control commands and also, for example, measured values from sensors such as rotational angles can be transmitted wirelessly.

A preferred embodiment manages without a battery and receives the energy required for the function by means of inductive coupling. Embodiments which acquire the energy required for operation directly from the environment and buffer it locally (energy harvesting) are also particularly preferred. Thermoelectric generators, solar cells, elements which convert vibrational energy into electrical energy, and others, as well as corresponding local energy stores are possible for the energy conversion. It is also conceivable to use the movement of the magnetorheological transmission apparatus itself to generate energy.

If a magnetic field is applied to the magnetorheological transmission apparatus at least partially via a permanent magnet, and the magnetization of the magnetic field is permanently changed by at least one magnetic pulse from at least one electrical coil, several advantages result. In specific cases, weight and space advantages can be achieved, for example by using the remanence and the pulsed operation of a coil which does not always have to be energized. The wires of the coil can be dimensioned to be thinner and lighter because they are each energized only for a short operating time. This can result in advantages in the case of weight, power demand, space requirement, and costs.

Therefore, it can be advantageous in specific applications that, due to the pulsed operation of the electrical coil, it can be significantly smaller than if it must be designed for a switched-on duration of 100%. The heating of the coil usually does not play a role in pulsed operation since short-term power loss peaks are buffered by the intrinsic heat capacity of the coil and the parts surrounding the coil. Very high current densities in the turns can thus be tolerated or thinner lines can be used, as long as the mean power loss remains acceptable over longer periods of time.

In the case of a smaller coil, the magnetic circuit surrounding the coil can also usually be smaller, which is why a comparatively large amount of installation space, material, weight, and costs can be saved. Only the energy expenditure for a single pulse increases here, but this can be very well tolerated depending on the application. Overall, a large amount of energy can nonetheless be saved in comparison with a continuously energized coil.

In all configurations, it can be possible to supply the power in a wireless manner. The power can be supplied, for example, from the current source to the power electronics or from the power electronics to the coil via electrical, magnetic, or electromagnetic coupling, for example a radio link. When used in a bicycle, the power can be supplied externally via a docking station, for example. It is also possible to supply energy to all loads (forks, rear shock absorbers, display) via an energy source on a bicycle, for example. The power can also be supplied similarly in the case of a ski boot, ski, mobile telephone, or to the sensors.

An energy supply via radio can possibly have worse efficiency than conventional wiring. In addition, the energy transmission and its range can be limited. However, such disadvantages do not interfere depending on the application. It is advantageous that no wear of the contacts occurs. The energy transmission is usually secure from polarity reversal and short-circuit-proof since only a limited power is present on the secondary side. Furthermore, cable breaks are not possible and the apparatus is more movable as a whole.

In such configurations, however, it is advantageous to buffer the energy for at least one pulse in a capacitor or energy store. The energy supply of the system can thus have a smaller power since short-term power peaks of a pulse are absorbed by the capacitor. In addition, a discontinuous or pulsed energy supply can also be used.

One possible expansion stage of the present invention is a fully autonomous system which is wirelessly supplied with energy. For example, use on a bicycle is conceivable, in which case the system is supplied with energy by at least one small magnet on a tire.

In general, arbitrary "energy harvesting" units can thus be used to supply energy, for example solar cells, thermoelectric generators, or piezoelectric crystals. Elements which convert vibrations into energy can thus also be used very advantageously for the supply.

An embodiment similar to that in an electric toothbrush is also conceivable, in which the energy is supplied by inductive coupling. For example, the rechargeable battery can be inductively charged, without damaged cables or corroded or soiled contacts obstructing the charging process. Energy can be transmitted over longer distances via magnetic resonance.

The power supply of the remanence pulse can be effected via induction, as in the case of electric toothbrushes. The combination of the MRF wedge principle with remanence is particularly power-saving and advantageous.

A loudspeaker or a noise generating unit can also be integrated or assigned. This is advantageous since the rotary knob as the MRF wedge knob is mechanically noiseless per se. Both the rotation without and also with a latching pattern and/or the virtual stops are noiseless per se. The generation of the MRF wedge for a torque increase or to generate a latching pattern is likewise noiseless per se. By means of the noise source, such as a loudspeaker or a piezoelectric loudspeaker, for example, clicking can be associated with the virtual latching pattern at each latching position. The type, volume and duration of the noise can be individually assigned, but can also be changed or turned off if the user wishes.

Therefore, the torque, the latching pattern, the stops and the noise are programmable or adaptive. The noises can also be generated via external
loudspeakers, for example standard loudspeakers in the automobile or the loudspeakers of the hi-fi system in the home.

The haptic knob can therefore practically replace the mouse wheel of a computer mouse. In the case of the latching pattern, not only the angular distance of the latching pattern can be settable, but rather also its profile shape, thickness etc. A latching pattern characteristic curve can therefore more or less be predefined.

The haptic rotary knob can also be mounted on an operating surface or on a screen. So that the display does not have to be removed for fastening the knob, it can consist of an upper part on the display and a lower part below the display. Data transmission via induction or the like, for example, is preferably provided. The display can thus be produced more cheaply as a surface.

It is also possible for an MRF haptic knob to also be pressed. The pressing can also act through an MRF whose properties are variable via a magnetic field.

The screen displays the information to be set which changes depending on the application. The function of the haptic knob is adapted thereto. In one case, adjustment is made by means of a latching pattern (for example setting the volume; a volume scale which can also have a logarithmic scale appears on the display).

In another case, adjustment can be made between two positions without a latching pattern, but with variable torque, thus, for example, between the 8:00 position and the 16:00 position, in which case an increasing torque can be provided in each case before the end position. The latching pattern can also be used to approach defined positions, for example if a name input is requested.

The display can also be in the form of a touchscreen. Menu items can thus be rapidly selected and fine adjustments can be made by means of the rotating actuator. For example, it is not desirable in the case of automobiles to control the volume of the radio via touchscreen since the driver would otherwise always have to look for a long time at what and where he is currently adjusting, which distracts him. He also finds the rotating actuator with a brief glance or without looking at it.

The adjustment using a mechanical actuator is also simpler and safer than via a touch display when cycling, for example. This is also true, in particular, if the cyclist is wearing gloves, for example, whereby the operation of a touch display is difficult or even impossible.

A combination of a display or touch display and a mechanical rotating actuator with variable torque/latching pattern is also possible. Such minicomputers can also be of interest outside, for example, in the case of controllers for industrial installations, remote controls for televisions or radio vehicles such as toy helicopters, for example, and on PCs and games consoles, and control consoles for military applications (drone aircraft, rockets).

It is also possible for a haptic rotary knob with a display to replace the current computer mouse.

It is possible for the rotary knob or the actuator to be countersunk in the normal state and to be extended only if needed.

It is also possible to embody such a structural unit as a slide controller, in particular in combination with a linear MRF wedge unit.

It is also possible to equip a magnetorheological transmission apparatus with one or more poles and one or more elevations. In all configurations, it is possible for elevations or the like, which protrude from one component in the direction of the other component, for example, to be provided between the two components of the magnetorheological transmission apparatus.

Such a configuration is possible and preferred both in the case of rotational mobility and in the case of linear mobility of the two components with respect to one another.

Only one elevation can be provided or a plurality of elevations can be provided. It is possible for a ball or a roller or another rotating body to be arranged on at least one elevation and to be at least partially accommodated by the elevation.

If elevations are provided on one component, it is preferred for at least one pole or at least one magnetization unit or at least one magnet or one coil to be provided on the other component. The number of magnetization units or poles can be 1 or else greater.

The shape of the elevations can fundamentally be arbitrary and can be semicircular, pointed or blunt, for example. The holding region of rotating bodies is preferably accordingly rounded.

One or more magnetization units or poles can be in the form of an electrical coil plus core or a permanent magnet or can consist of remanence material or a combination thereof.

The distances between individual elevations and/or magnetization units are preferably approximately uniform, but can also be arbitrary.

The depth, i.e. the radial extent or the axial extent, of individual elevations or magnetization units with respect to others can be different.

The field strength which is applied to or acts on the individual magnetization units can, in particular, also vary at the same time.

The speed of the rotating bodies does not have to be equal to the rolling speed, and can also deviate therefrom, for example by step-down or step-up transmissions. The inner part which is formed by the elevations, for example in the shape of a star, can be mounted off-center to the outer part.

Such a magnetorheological transmission apparatus can be used, for example, as a haptic knob with a latching pattern or in furniture and drawer guides with positions.

The magnet or each magnetization unit or the inner part and/or the outer part can also consist of remanence material.

[0171] Since magnetorheological fluids concatenate very rapidly upon the application of a magnetic field, it can be sufficient in the normal state, for example when driving an automobile, if the magnetic field is turned off. It is generally entirely sufficient to only turn on the field when a first rotational angle change is initiated. A significant amount of energy can thus be saved. [0172] Alternatively, a base torque can be implemented with remanence. When a rotational angle change is registered, a dynamic magnetic field can be built up, which can also pulsate to generate a virtual latching pattern. [0173] In configurations in which the remanence is utilized, the magnetic field for the remagnetization can be externally applied. A corresponding coil, which acts through a cylinder, for example, can be used for the remagnetization. A selected menu item is preferably activated when the haptic operating device and/or the rotating unit is/are pressed. The display unit can be touch-sensitive (for example capacitive, inductive etc.), such that a menu item can be selected by touching it with the finger or the like, for example. In all of these configurations, it is possible and preferred for both pressing of the haptic operating device and operation using the finger to be possible. [0174] The display unit may be an LCD, TFT, IPS, Retina, Nova, White Magic, OLED, AMOLED or other screen type.

The method according to the invention is used, in particular, to operate a minicomputer and preferably a smartwatch. In this case, a haptic operating device having a rotating unit is used and selectable menu items are displayed on a display unit. A menu item can be selected by rotating the rotating unit. A rotational Alternatively, a base torque can be implemented with remanence. When a rotational angle change is registered, a dynamic magnetic field can be built up, which can also pulsate to generate a virtual latching pattern.

In configurations in which the remanence is utilized, the magnetic field for the remagnetization can be externally applied. A corresponding coil, which acts through a cylinder, for example, can be used for the remagnetization. A selected menu item is preferably activated when the haptic operating device and/or the rotating unit is/are pressed. The display unit can be touch-sensitive (for example capacitive, inductive etc.), such that a menu item can be selected by touching it with the finger or the like, for example. In all of these configurations, it is possible and preferred for both pressing of the haptic operating device and operation using the finger to be possible.

The display unit may be an LCD, TFT, IPS, Retina, Nova, White Magic, OLED, AMOLED or other screen type.

The method according to the invention is used, in particular, to operate a minicomputer and preferably a smartwatch. In this case, a haptic operating device having a rotating unit is used and selectable menu items are displayed on a display unit. A menu item can be selected by rotating the rotating unit. A rotational resistance is dynamically changed during rotation of the rotating unit. This makes it possible to generate a variable and, in particular, haptic latching pattern.

The method according to the invention has particular advantages. A considerable advantage of the method according to the invention is that it becomes possible to dynamically change the rotational resistance upon actuation of the rotating unit. As a result, the user can be made aware of properties haptically and therefore perceptibly. For example, an end of a list can be indicated in a list of menu items to be displayed. For this purpose, the rotational resistance can become stronger upon reaching a list of menu items, for example, the rotating unit in the axial direction (or upon pulling the rotational unit in the axial direction).

If the currently selected menu entry corresponds to a contact, the individual contact information (telephone numbers, addresses etc.) is displayed and can possibly be processed.

If, in contrast, the displayed menu entry or menu item corresponds to a function to be performed, the currently selected function is activated upon pressing the rotating unit in the axial direction and/or upon pulling the rotating unit in the axial direction. For example, a submenu can be called up for this purpose or the function is a function which can be performed directly, for example the writing of a text message or an email or the starting of a program.

The communication unit of the minicomputer is used, in particular, to start and provide data connections to a local area network or to the Internet or to determined and/or previously selected computers or networks or the like.

The minicomputer can advantageously be coupled to a handheld computer, such as a smartphone or a laptop or the like, in order to interchange data.

A latching point or at least one latching point or a multiplicity of latching points is/are particularly preferably generated by deliberately generating a magnetic field at a channel which is at least partially filled with a magnetorheological medium.

In the case of the minicomputer and also in the case of the method, an angular position of the rotating unit is preferably detected and the rotational resistance is preferably set on the basis of the detected angular position, in particular via an intensity of the magnetic field.

An end stop is preferably dynamically generated in at least one direction of rotation. In this case, the rotational resistance is preferably set to be considerably stronger at the end stop than at other rotational angles and/or at latching points.

In particular, a latching point of a determined angle position is generated by virtue of a stronger rotational resistance being generated at angular locations adjacent to the determined angle position than at the angle position determined for the latching point.

An angular distance between at least two adjacent latching points is preferably dynamically set. This means that the angular distance can then situation referred itself. If, for example, only two latching points are provided, the angular distance can be larger than when a multiplicity of latching points are intended to be generated.

In all cases, it is preferably possible to rotate the rotating unit endlessly and/or freely in the switched-off state.

In all configurations, it is possible to use a permanent magnet, the magnetic field of which can have a magnetic field from an electrical coil dynamically superimposed on it.

This makes it possible to set a permanent rotational resistance even in the switched-off state. This rotational resistance can possibly also be reduced in the switched-on state.

In all configurations, it is preferred for the number of latching points to correspond to the number of currently available menu items or list entries or to correspond to an integer multiple of the number of latching points.

A selected menu item is preferably activated upon pressing the haptic operating device and/or the rotating unit.

It is possible that an associated method step is carried out or an associated submenu is displayed and the number of latching points is dynamically adapted to the selectable menu items in the submenu when a menu item is activated.

In all cases, the rotating unit can be in the form of a crown and can visually correspond to the crowns from known wristwatches. A smartwatch equipped with this is much easier to operate, on account of the controllable haptic properties, than those from the prior art.

Not only data relevant to the situation can be displayed and adjusted on the display unit, but other data, for example the time, SMS, the telephone book, can also be displayed.

In the case of the display unit, it is possible to use two fingers to zoom using "pinch to zoom" by virtue of the fingers being pulled apart or together. This is not always possible on a conventional smartwatch since the display is too small to comfortably or conveniently zoom using two fingers.

Operation with a glove, for example in the winter, is also easier. Smartwatches usually have a capacitive display which can scarcely be operated or, depending on the manufacturer, cannot be operated at all with gloves. A haptic operating device has clear advantages here. When using a mobile telephone, removal of the glove is still accepted since the mobile telephone often has to be pulled from a pocket. In the case of a smartwatch, however, quick access is very advantageous. In addition, scrolling can be incorrectly detected as pressing in small displays, which can be avoided in the present invention.

Other features which are considered as characteristic for the invention are set forth in the appended claims.

Although the invention is illustrated and described herein as embodied in a minicomputer with a rotating unit and method of operating the minicomputer, it is nevertheless not intended to be limited to the details shown, since various modifica- tions and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a cross section through a crown as haptic operating device of a minicomputer according to the invention;

FIG. 2 shows an enlarged detail from Fig. 1;

FIG. 3 shows a highly schematic view of the operating principle of a magnetorheological transmission apparatus of the haptic operating device in cross section;

FIG. 4 shows a minicomputer according to the invention with a haptic operating device;

FIG. 5 shows a slightly perspective illustration of the minicomputer according to Fig. 4;

FIG. 6 shows another embodiment of a minicomputer;

FIG. 7 shows another embodiment of a minicomputer according to the invention;

FIGS. 8A-8C show a control sequence of a minicomputer according to the invention; and FIGS. 9A-9C show possible torque profiles against the rotational angle of a haptic operating device of a minicomputer according to the invention.

DETAILED DESCRIPTION OF THE INVENTION

Exemplary embodiments of minicomputers 300 with haptic operating devices 200 are explained below with reference to the accompanying figures. In this case, a haptic operating device 200 has in each case a magnetorheological transmission apparatus 1. Identical or similar parts are provided with the same reference symbols.

Referring now to the figures of the drawing in detail and first, particularly, to FIG. 1 thereof, there is shown a schematic cross section of a first crown 301 of a minicomputer 300 with a haptic operating device 200. The haptic operating device 200 contains a magnetorheological transmission apparatus 1, the precise function of which is explained further below with reference to Fig. 3.

FIG. 1 shows a cross section, the stationary basic body 201 or the housing of the minicomputer 300 being used as the component 2 here, on which the rotating unit 202 is rotatably held as the component 3. The basic body 201 has a holding housing 211 which is fastened to a separate base plate 210. For example, the holding housing 211 can be adhesively bonded to the base plate 210 after the parts arranged in the holding housing have been mounted. In comparison with the basic body 201, the rotating unit 202 is rotatably held here. The rotating unit 202 comprises a shaft 212 here, to which a holder 232 is screwed via a screw 231. The holder 232 is surrounded by the actual rotating unit 202. The rotating unit 202 can be externally gripped and rotated.

The shaft 212 is rotatably mounted on the holding housing 211 via a bearing 30. The bearing 30 may be in the form of a sliding bearing, for example, but may also comprise any other rolling bearing.

An annular holding space 213, which is filled with an electrical coil 26 as a field generation device 7 here, is provided in the internal space 213 in the basic body 201, which is rotationally symmetrical here, and more precisely in the holding housing 211. Possible clearances can be filled, for example, with a potting compound or a filler which is simultaneously used to hold the electrical coil 26 in the annular holding space.

As depicted on the left side of FIG. 1, it is possible for an additional permanent magnet 25 or a plurality of additional permanent magnets 25 to be provided on the holding housing 211 in order to generate a permanent magnetic field independently of a current source. If necessary, the magnetization of the permanent magnet 25 can be changed using corresponding magnetic pulses from the electrical coil 26.

A channel 5 which is partially filled with rotating bodies 11, which are cylindrical here and, in particular, are arranged symmetrically over the circumference of the channel 5, is provided in the internal space 213 between the holding housing 211 and the shaft 212. The rotating bodies co-rotate during rotation of the two components 2, 3 with respect to one another since the rotating bodies 11 are usually in contact with the holding housing 211 and/or the shaft 212 and therefore roll thereon.

At least one contact ring 209 (friction ring) can be provided for the purpose of assisting with the rolling and ensuring rolling contact. Such a contact ring may be in the form of an O-ring or rectangular ring, in particular, and may consist of a rubber-like material, for example.

Such a contact ring 209 may be arranged, for example, in a circumferential groove 217 on the running surface 215 of the holding housing 211. It is also possible for a further contact ring 209b to be arranged in a groove 216 on the running surface 214 on an enlarged circumferential ring 218 of the shaft 212. The circumferential ring 218 may be integrally formed with the shaft 212. The circumferential ring 218 is preferably a separate part which is connected to the shaft 212 in a rotationally fixed manner. The circumferential ring 218 preferably consists of a material with good magnetic conductivity. The circumferential ring 218 preferably consists of a soft magnetic material.

It is possible and preferred for a contact ring 209 to be arranged in the groove 217 and for a contact ring 209b to be arranged in the inner circumferential groove 216 on the running surface 214 of the circumferential ring 218.

Alternatively, it is also possible for the individual rotatable transfer bodies, i.e., rotating bodies 11 are magnetic field concentrators each to be provided with a contact ring 2090, a contact ring 2090 then extending around a rotating body 11. In the case of such a configuration as well, it is ensured that the rotating bodies 11 and their contact ring 209 each have contact with the shaft 212 or the holding housing 211, thus ensuring continuous rotation of the rotating bodies if the rotating unit 202 is rotated.

Implementing the device without the insertion of (flexible) contact elements or contacting rings makes it possible to achieve even less basic friction and it is therefore particularly preferred.

In the exemplary embodiment here, a defined axial distance between the holding housing 211 and an axial surface of the circumferential ring 218 is ensured via a stop ring 233. The internal space 213 is sealed via a seal 46, with the result that the magnetorheological medium cannot escape from the internal space 213.

A circumferential gap, at which an angle sensor is arranged, is provided between the cover or the holder for 232 and the holding housing 211. The angle sensor 206 preferably consists of at least two parts 207 and 208, the sensor part 207 having magnets or other positional marks or the like at particular angle positions, for example, with the result that a rotational movement of the rotating unit 202 can be detected at the holding housing 211 via the sensor part 208 mounted on the electronics, for example. In this case, both an absolute angle position and a relative angle change can be sensed. The angle sensor 206 or a separate actuation sensor 204 can be used to sense an axial movement or an axial force on the rotating unit 202 or the operating device 200 as a whole. For example, a slight distance change between the holder 232 and the holding housing 211, which can be sensed by the actuation sensor 204, can be achieved by exerting an axial force. It is also possible for certain parts or the outer rotating ring of the rotating unit 202 to be axially displaceable counter to a spring force, with the result that axial actuation of the operating device 200 can be sensed. The electronics of the haptic operating element preferably operate with a control clock of 4 kHz or more.

The display unit which is rotatable together with the rotating unit 202 here can be supplied with the necessary data and the required electrical current via a cable feed and a central channel.

The rotating unit 202 forms the outer part of the crown 301 here.

FIG. 2 shows an enlarged detail from FIG. 1, in which case the rotating body 11 (the rotating bodies 11 of all of the embodiments may be referred to as rotatable transfer elements or as magnetic field concentrators) and the electrical coil 26 and also a permanent magnet 25 are visible. The axial distance 223 between the end face 220 at the shaft 212 and the end face 221 at the holding housing 211 is clearly discernible here. This axial distance 223 is considerably shorter than the radial distance 224 between the circumferential ring 218 and the running surface 215 in the holding housing 211.

A short distance 223 is advantageous since the magnetic field 8 (compare figure 1) passes through the gap 222 in the axial direction. Relatively low magnetic losses are possible with a thin gap.

It is also possible for the shaft 212 to be introduced into the interior of the minicomputer 300 and for the rotational resistance to be dynamically generated there. It is also possible to dispense with the use of MRF, and the relatively low rotational resistances required here can be generated directly via magnetic forces or the like.

The functional principle for generating torques in the haptic operating device 200 according to FIG. 1 is described below with reference to FIG. 3.

FIG. 3 shows a highly schematic cross-sectional view of a magnetorheological transmission apparatus 1 according to the invention for influencing the force transmission between two components 2 and 3. In this case, a rotating body 11 is provided as a separate part 4 between the two components 2 and 3 in FIG. 1. The rotating body 11 is in the form of a ball 14 here. However, it is likewise possible for rotating bodies 11 to be in the form of cylinders or ellipsoids, rollers or other rotatable rotating bodies. In the actual sense, rotating bodies which are not rotationally symmetrical, for example a gear wheel, or rotating bodies 11 having a particular surface structure can also be used as rotating bodies. The rotating bodies 11 are not used for mounting relative to one another, but rather for transmitting torque.

A channel 5 which is filled here with a medium 6 is provided between the components 2 and 3 of the magnetorheological transmission apparatus 1. The medium here is a magnetorheological fluid 20 which comprises, for example, as the carrier fluid, an oil containing ferromagnetic particles 19. Glycol, fat, or viscous substances can also be used as the carrier medium without being restricted thereto. The carrier medium may also be gaseous or it is possible to dispense with the carrier medium (vacuum). In this case, only particles which can be influenced by the magnetic field are filled into the channel.

The ferromagnetic particles 19 are preferably carbonyl iron powder, the size distribution of the particles depending on the specific use. A particle size distribution of between one and ten micrometers is specifically preferred, but larger particles of 20, 30, 40 and 50 micrometers are also possible. Depending on the application, the particle size can also become considerably larger and can even advance into the millimeter range (particle spheres). The particles may also have a special coating/casing (titanium coating, ceramic casing, carbon casing etc.) so that they better withstand the high pressure loads which occur depending on the application. For this application, the MR particles can be produced not only from carbonyl iron powder (pure iron) but also from special iron (harder steel), for example.

The rotating body 11 is caused to rotate about its axis of rotation 12 by the relative movement 17 of the two components 2 and 3 and practically runs on the surface of the component 3. At the same time, the rotating body 11 runs on the surface of the other component 2, with the result that there is a relative velocity 18 there.

Strictly speaking, the rotating body 11 does not have any direct contact with the surface of the component 2 and/or 3 and therefore does not roll directly thereon. The free distance 9 between the rotating body 11 and one of the surfaces of the component 2 or 3 is 140 µm, for example. In one specific configuration with particle sizes of between 1 µm and 10 µm, the free distance is between 75 µm and 300 µm, in particular, and particularly preferably between 100 µm and 200 µm.

The free distance 9 is, in particular, at least 10 times the diameter of a typical mean particle diameter. The free distance 9 is preferably at least 10 times the size of a largest typical particle. As a result of the lack of direct contact, a very low base friction/force/torque is produced during relative movement of the components 2 and 3 with respect to one another.

If a magnetic field is applied to the magnetorheological transmission apparatus 1, the field lines are formed on the basis of the distance between the rotating bodies 11 and the components 2, 3. The rotating body consists of a ferromagnetic material and of ST 37 here, for example. The steel type ST 37 has a magnetic permeability µr of approximately 2000. The field lines pass through the rotating body and are concentrated in the rotating body. A high flux density prevails in the channel 5 on the radial entry and exit surface of the field lines on the rotating body. The inhomogeneous and strong field there results in local and strong cross-linking of the magnetically polarizable particles 19. The effect is greatly increased by the rotational movement of the rotating body 11 in the direction of the wedge forming in the magnetorheological fluid, and the possible braking or clutch torque is extremely increased far beyond the magnitude which can normally be produced in the magnetorheological fluid. The rotating body 11 and the component 2, 3 preferably at least partially consist of ferromagnetic material, which is why the magnetic flux density becomes higher, the shorter the distance between the rotating body 11 and the component 2, 3. As a result, a substantially wedge-shaped region 16 forms in the medium, in which the gradient of the magnetic field increases greatly toward the acute angle at the contact point/the region at the shortest distance.

Despite the distance between the rotating body 11 and the component 2, 3, the rotating body 11 can be caused to rotate by the relative velocity of the surfaces with respect to one another. The rotational movement is possible without and also with an acting magnetic field 8.

If the magnetorheological transmission apparatus 1 is exposed to a magnetic field 8 from a magnetic field generation device 7 (not illustrated here in FIG. 1), the individual particles 19 of the magnetorheological fluid 20 are concatenated along the lines of the magnetic field 8. It should be noted that the vectors depicted in figure 1 only roughly schematically illustrate that region of the field lines which is relevant to influencing the MRF 20. The field lines occur substantially in a manner perpendicular to the surfaces of the ferromagnetic components in the channel 5 and need not run in a rectilinear manner, in particular in the acute-angled region 10.

At the same time, on the circumference of the rotating body 11, some material of the magnetorheological fluid 20 is concomitantly caused to rotate, with the result that an acute-angled region 10 forms between the component 3 and the rotating body 11. On the other side, an identical acute-angled region 10 is produced between the rotating body 11 and the component 2. The acute-angled regions 10 may have a wedge shape 16 in the case of cylindrical rotating bodies 11, for example. The wedge shape 16 impedes the further rotation of the rotating body 11, with the result that the effect of the magnetic field on the magnetorheological fluid is intensified since the acting magnetic field inside the acute-angled region 10 results in greater cohesion of the medium 6 there. This intensifies the effect of the magnetorheological fluid in the accumulated cluster (the chain formation in the fluid and therefore the cohesion or viscosity), which makes it difficult to rotate or move the rotating body 11 further.

The wedge shape 16 makes it possible to transmit considerably greater forces or torques than would be possible with a comparable structure which uses only the shear movement without a wedge effect.

The forces which can be directly transmitted by the applied magnetic field represent only a small portion of the forces which can be transmitted by the apparatus. The magnetic field makes it possible to control the wedge formation and therefore the mechanical force intensification. The mechanical intensification of the magnetorheological effect can be such that it is possible to transmit a force, even after an applied magnetic field has been switched off, if the particles have been wedged.

It has been found that the wedge effect of the acute-angled regions 10 results in a considerably greater effect of a magnetic field 8 of a particular strength. In this case, the effect can be intensified by a multiple. In a specific case, the relative velocity of two components 2 and 3 relative to one another was influenced approximately 10 times as much as in the prior art in the case of MRF clutches. The possible intensification depends on different factors. It can possibly also be intensified by a greater surface roughness of the rotating bodies 11. It is also possible for outwardly projecting projections to be provided on the outer surface of the rotating bodies 11, which projections may result in even stronger wedge formation.

The wedge effect is distributed in a two-dimensional manner between the rotating body 11 and the components 2 or 3.

FIG. 4 shows a schematic illustration of a minicomputer 300 which is embodied here as a smartwatch. The housing of the smartwatch can serve as the basic body. At least one haptic operating device 200 is provided. A crown 301 can be seen here. Furthermore, a rotating unit 202 is provided and is fitted to the housing 201. In the minicomputer 300 according to FIGS. 4 and 5, a magnetorheological transmission apparatus 1 is provided here in order to generate the required magnetic forces and the accordingly acting braking forces/braking torques.

A processor 302 is schematically depicted in the interior of the minicomputer. A control device 27 may be part of the processor 302. It is also possible for a separate control device 27 to be assigned to the crown 301 or to the rotating unit 202 in order to relieve the load on the processor, for example. The processor 302 can spend more time periods in standby, thus making it possible to save energy.

It is also possible to see a communication unit 304 which can set up a network connection or another data connection to other computers or devices, in particular in a wireless manner.

FIG. 6 shows a variant of the exemplary embodiment according to FIG. 4, in which case the cover with the display unit 203 is hinged, with the result that, after opening, a fingerprint sensor 236 or touchpad or the like is available in order to authenticate a user, for example. It is possible for a camera to be integrated in the display unit, which camera allows the face or a fingertip of the user to be identified using a photo.

FIG. 7 shows a schematic plan view of a smartwatch according to the invention in the form of a minicomputer 300. This minicomputer 300 can also have two rotating units 202, 301. However, it is also possible for only one rotating unit 202, 301 to be provided. Different symbols 205 can be seen on the display unit 203. The display unit 203 is also touch-sensitive, in particular.

The rotating unit 202 or the crown 301 is respectively part of a haptic operating device.

The respectively current angle position of the rotating unit 202 can be sensed via a rotary encoder. As a result, arbitrary haptic signals can be output on the basis of the control, depending on the position, rotational angle, angular velocity etc. The rotary encoder can also be supplemented with a torque sensor.

Such haptic operating devices can also be produced with an (additional) MRF shear mode.

The haptic operating device 200 requires little space and, on account of the small space requirement and the low power consumption in the range of milliwatts or below, is suitable for the minicomputer 300. The latching pattern of the haptic operating device 200 can be set on the basis of the situation.

Three-dimensional movement elements with variable haptics and robust and precise mounting are fundamentally difficult to produce and are therefore not inexpensive. In contrast, the combination of an arrangement of the rotating bodies which is capable of pendulum movements with a magnetorheological fluid, for example, can be produced in a very cost-effective manner.

A four-dimensional rotary knob which can be displaced and can also be additionally rotated in three directions, for example, can also be provided.

The combination of a 3-D knob with longitudinal adjustment of an MRF wedge therefore results in a 4-D actuating element. A field generation unit can be used to influence or vary all four directions of movement.

Instead of a kinematic and, for example, parallelogram-like pivoting mechanism, it is also possible to use an elastic/deformable element which, as a flexible and semi-rigid arm, for example, can consist of coiled metal tubing in the form of a swan's neck. One advantage is that the user does not always have to grip the screen, which reduces soiling. In addition, the adjustment and the zooming, for example, take place more quickly: gripping the screen with one finger and moving the rotating controller with another finger can initiate a zooming process, for example. The same applies to the volume, writing with uppercase and lowercase letters or selecting special buttons or a second level during typing.

The user can thus also press with one finger on a separate menu bar in order to search for the type of desired actuation. He then performs the desired action using the rotating controller. The latching pattern of the rotating controller then adapts automatically, thus, for example, "on"—"off" or volume control with a latching pattern possibly having a dynamic stop. If the screen is rotated during the actuation (touch display) (for example, as in the case of mobile telephones or handheld computers—90° from portrait format to landscape format), the latching pattern adapts automatically, i.e. it co-rotates. For example, if the setting range were from 6 o'clock to 12 o'clock when it is held upright, this would change from 12 o'clock to 6 o'clock upon rotation by 90° in the clockwise direction without adaptation. This also applies if the display is installed in the knob itself. Such a haptic element can be haptic in all or individual directions (only rotate, rotate and press; joystick etc.). The haptics adjust themselves depending on the selected action.

One advantage can also result upon the selection of a list such as a telephone book list, for example, since such entries are often too small for "targeting" for large fingers.

Advantages also result in the dark or for people with spectacles who are not currently wearing them. Feedback is received via the haptic rotating controller and the user knows what he is doing when it is currently dark, for example.

The functionality and the method of operation of a minicomputer 300 according to the invention are explained below with reference to FIGS. 8A to 8C using the example of a smartwatch.

In this case, FIG. 8a shows a plan view of the smartwatch 300 according to the invention with a haptic operating device 200. The haptic operating device 200 may be used, in particular, to select menu items or list entries or the like. The smartwatch has here a rotating ring on the housing which surrounds the display 203 as the rotating unit 202.

FIG. 8A illustrates the operating state "pulse measurement". The display unit 203 centrally displays a graphical symbol—a heart—with the operating state on the rotating unit 202. A menu ring 235, on which the individual selectable menu items 225 are depicted, is graphically illustrated further on the outside. There are nine menu items in FIG. 8A, in which case the indicator 234 is illustrated beside the selected operating state or beside the currently active operating state.

Rotating the rotating unit 202 in the direction of rotation 227 (here to the right or in the clockwise direction) then makes it possible to select the menu item for setting the audio system or for selecting a piece of music.

This state is illustrated in Fig. 8B where the clef is depicted as the graphical symbol 205 in the center of the display unit 203. The indicator 234 indicates that the corresponding menu item 225 is active.

Rotating the rotating unit 202 further finally makes it possible to reach and activate the other menu items.

FIG. 8C shows a number of list entries or photos or menu items, the focus being changed to one of the list entries or menu items by rotating the rotating unit. The arrow indicates the scrolling direction.

The corresponding menu entry can be selected by pressing the touch-sensitive surface of the display unit 203. It is also possible for a selection which has been made to be confirmed by (axially) pressing the crown 301 or by pressing on the rotating unit. The photo is then displayed in an enlarged manner or the contact information overall is displayed etc.

Actuating the rotating unit 202 and rotating it in the clockwise direction results in the next photo being reached as the next latching point. In this case, a separate latching point is provided for each menu entry.

A rotational movement in the opposite direction, that is to say in the anticlockwise direction, leads back to the other menu items.

In all cases, the number of latching points for the rotating unit 202 is adapted to the number of available menu items (photos, contacts etc.). This means that nine different latching points are provided in FIG. 8A, whereas the number of latching points in FIG. 8C is dependent on the number of present or available list entries. It is possible to dynamically generate right-hand and left-hand end stops, with the result that the rotating unit cannot be rotated further as desired in the switched-on state.

Overall, a smartwatch 300 is provided, in which operation via a rotating unit 202 with a haptic latching pattern is performed. The available latching points are generated dynamically or adaptively.

FIGS. 9A, 9B and 9C illustrate possible embodiment variants for the dynamically generated magnetic field or the dynamically generated braking torque on the basis of the rotational angle.

In this case, FIG. 9A shows a variant in which a left-hand end stop 228 and a right-hand end stop 229 are generated. During further rotation, a high magnetic field or a high rotational resistance or stop torque 238 is generated there, as a result of which the rotating unit 202 opposes a high resistance to a rotational movement.

A first latching point 226 corresponding to a first menu item 225 is provided directly beside the left-hand end stop 228. If the next menu item is intended to be selected, the rotating unit 202 must be rotated in the clockwise direction. For this purpose, the dynamically generated higher magnetic field or latching torque 239 or its frictional torque must be overcome before the next latching point 226 is reached. In Fig. 9A, a constant magnetic field is respectively generated at the latching points 226 and in the regions in between for a certain angular range, which magnetic field is considerably lower at the latching points than in the regions in between and is again considerably lower than at the stops 228, 229.

An angular distance 237 between individual latching points can be dynamically changed and is adapted to the number of available latching points or menu items.

FIG. 9B shows a variant in which the magnetic field does not suddenly increase toward the end stops 228, 229 but rather has a steep profile. Furthermore, ramp-like gradients of the magnetic field are respectively provided at the latching points 226 toward both rotation sides, as a result of which the rotational resistance increases in the corresponding directions of rotation. Only three latching points 226 are provided here with the same operating device 200, the angular distance 237 of which latching points is greater than in the example according to FIG. 9A.

FIG. QC shows a variant in which there is a lower rotational resistance between individual latching points 226 and an increased magnetic field 239 is respectively generated only directly adjacent to the latching points 226 in order to enable engagement at the individual latching points 226 and, at the same time, to provide only a low rotational resistance between individual latching points.

In principle, it is also possible to mix the methods of operation and the magnetic field profiles shown in FIGS. 9A, 9B and QC. For example, the magnetic field profile can accordingly be set differently for different submenus.

If the knob is not rotated, that is to say the angle is constant, the current is preferably continuously reduced over time.

The current can also be dependent on the velocity and/or be dependent on the rotational angle velocity of the haptic knob.

In all configurations, it is possible to detect a movement pattern. If the user moves or rotates the operating knob according to a (predetermined) pattern, this is detected. For example, the user can carry out rotation twice to the left and twice to the right, for example, with a relatively (very small) angle. The sensor (rotary encoder) and the electronics detect this movement pattern and switch a stored function on the basis thereof; for example, the selected (or a predefined)

menu is then executed (confirmed). A further example: brief rotation twice in the clockwise direction may also signify, however, that the menu is intended to move down by two menu items. The movement pattern may be predefined in any desired manner or may be created by the user. The operating knob can also learn this. The functions to be performed can also be predefined or can be assigned by the user. Many movement patterns are possible.

Overall, the invention provides an advantageous minicomputer 300 with a haptic operating device 200 and an accordingly advantageous method for control. The number and type of latching points are dynamically adapted to the number of available menu items. The operating device 200 of the minicomputer in FIG. 1 was tested and has a measured base torque of approximately 0.015 Nm and has a maximum torque of >5 Nm (factor of 300).

In all cases, the effective torque can be set on the basis of the speed using pulse width modulation (PWM), for example. Large axial and radial forces can be generated using an oblique expanding mandrel. The particles may have a round, rod-shaped or any other form.

The rheological fluid may consist of a wide variety of constituents which individually or in combination may be: Fe, carbon steel, NdFeB (neodymium), AlNiCo, samarium, cobalt, silicon, carbon fiber, stainless steel, polymers, soda-lime glass, ceramic and non-magnetic metals and the like. Dimorphic magnetorheological fluids containing nanotubes or/and nano wires are also possible.

The carrier fluid may consist, in particular, of the following constituents or a combination thereof: oils and preferably synthetic or non-synthetic oils, hydraulic oil, glycol, water, fats and the like.

The following is a summary list of reference numerals and the corresponding structure used in the above description of the invention:

| | |
|---|---|
| 1 | Apparatus |
| 2, 3 | Component |
| 4 | Separate part |
| 5 | Channel |
| 6 | Medium |
| 7 | Magnetic field generation device |
| 8 | Field |
| 9 | Free distance |
| 10 | Acute-angled region |
| 11 | Rotating body |
| 12 | Axis of rotation |
| 13 | Rotating body |
| 14 | Ball |
| 15 | Cylinder |
| 16 | Wedge shape |
| 17 | Direction of the relative movement |
| 18 | Direction of the relative movement |
| 19 | Magnetic particle |
| 20 | Fluid |
| 25 | Permanent magnet |
| 26 | Coil |
| 27 | Control device |
| 28 | Energy store |
| 29 | Sensor |
| 30 | Bearing |
| 46 | Sealing ring |
| 47 | Shaft |
| 200 | Operating device |
| 201 | Basic body |
| 202 | Rotating unit |
| 203 | Display unit |
| 204 | Actuation sensor |
| 205 | Graphical symbol |
| 206 | Angle sensor |
| 207 | Sensor part |
| 208 | Sensor part |

-continued

| | |
|---|---|
| 209 | Contact ring, friction ring |
| 210 | Base plate |
| 211 | Holding housing |
| 212 | Shaft |
| 213 | Internal space |
| 214 | Running surface of 212 |
| 215 | Running surface of 211 |
| 216 | Groove |
| 217 | Groove |
| 218 | Circumferential ring with 214 and 216 |
| 219 | Holding space for 26 |
| 220 | End face of 218 |
| 221 | End face of 211 |
| 222 | Gap |
| 223 | Axial distance |
| 224 | Radial distance |
| 225 | Menu item |
| 226 | Latching point |
| 227 | Direction of rotation |
| 228 | End stop |
| 229 | End stop |
| 230 | Cover |
| 231 | Screw |
| 232 | Holder |
| 233 | Stop ring |
| 234 | Indicator |
| 235 | Menu ring |
| 236 | Fingerprint sensor |
| 237 | Angular distance |
| 238 | Stop torque |
| 239 | Latching torque |
| 240 | Base torque |
| 242 | Outer limb |
| 243 | Radially inner region |
| 244 | Inner limb |
| 300 | Minicomputer, smartwatch |
| 301 | Crown |
| 302 | Processor |
| 303 | Display unit, display |
| 304 | Communication unit |

The invention claimed is:

1. A method of operating a minicomputer, the method comprising: providing the minicomputer with a processor, a display unit, and a haptic operating device having a rotating unit, and displaying selectable menu items on the display unit; selecting a menu item by rotating the rotating unit; dynamically changing a rotational resistance of the rotating unit during a rotation of the rotating unit; and defining a plurality of latching points according to the menu items displayed on the display unit; haptically perceptively latching the rotating unit at the latching points during the rotation of the rotating unit, by selectively increasing the rotational resistance of the rotating unit at the latching points and enabling the rotating unit to be endlessly and freely rotatable in a switched-off state.

2. The method according to claim 1, which comprises dynamically changing a number of the haptically perceptible latching points in dependence on an operation of the minicomputer, by deliberately generating a magnetic field at a channel at least partially filled with a magnetorheological medium.

3. The method according to claim 1, which comprises detecting an angular position of the rotating unit and setting the rotational resistance on a basis of the detected angular position.

4. The method according to claim 1, which comprises dynamically generating an end stop in at least one direction of rotation, and setting the rotational resistance at the end stop to be perceptively stronger than at a latching point.

5. The method according to claim 1, which comprises dynamically setting an angular distance between at least two adjacent latching points and enabling the rotating unit to be endlessly and freely rotatable in a switched-off state.

6. The method according to claim 1, which comprises setting the number of latching points to correspond to a number of currently available menu items or list entries.

7. The method according to claim 1, which comprises carrying out an associated method step or displaying an associated submenu and dynamically adapting the number of latching points to the selectable menu items in the submenu when a menu item is activated.

8. A minicomputer, comprising:
a processor, a display unit connected to said processor and a communication unit connected to said processor;
a haptic operating device including a rotatable rotating unit having a rotational resistance opposing a rotation of said rotating unit;
a controllable transmission apparatus operatively associated with said rotating unit and configured for dynamically changing the rotational resistance against the rotation of said rotating unit during the rotation thereof by setting a given increased rotational resistance at defined latching points and enabling the rotating unit to be endlessly and freely rotatable in a switched-off state; and
a control device connected to said controllable transmission apparatus and configured for dynamically adjusting the rotational resistance of said rotating unit and for dynamically setting an angular distance between at least two adjacent latching points in dependence on a menu displayed on said display unit.

9. The minicomputer according to claim 8, wherein said control device is configured to dynamically change a number of haptically perceptible latching points in dependence on an operation of the minicomputer.

10. The minicomputer according to claim 8, wherein said control device is configured to dynamically change a number of haptically perceptible latching points in dependence on an operation of the minicomputer, by deliberately generating a magnetic field at a channel at least partially filled with a magnetorheological medium.

11. The minicomputer according to claim 8, which comprises at least one sensor for detecting an angular position of said rotating unit.

12. The minicomputer according to claim 8, wherein said control device is configured to dynamically generate an end stop in at least one direction of rotation, and to set the rotational resistance at the end stop to be perceptively stronger than at a latching point.

13. The minicomputer according to claim 8, wherein said control device is configured to set the number of latching points to correspond to a number of currently available menu items or list entries.

14. The minicomputer according to claim 8, wherein said processor is configured to carry out an associated method step or displaying an associated submenu and to dynamically adapt a number of latching points to the selectable menu items in the submenu when a menu item is activated.

15. A method of operating a minicomputer, the method comprising: providing the minicomputer with a processor, a display unit with a touch display, and a haptic operating device having a rotating unit; displaying a menu with selectable menu items on the touch display; selecting a menu item by touching a respective menu item on the touch display or by rotating the rotating unit; during a rotation of the rotating unit, dynamically changing a rotational resistance of the rotating unit by defining a plurality of latching points according to the menu items displayed on the display unit; haptically perceptively latching the rotating unit at the latching points during the rotation of the rotating unit, by selectively increasing the rotational resistance of the rotating unit at the latching points; and enabling the rotating unit to be endlessly and freely rotatable in a switched-off state.

16. The method according to claim 15, which comprises detecting an angular position of the rotating unit and setting the rotational resistance on a basis of the detected angular position.

17. The method according to claim 15, which comprises dynamically generating an end stop in at least one direction of rotation, and setting the rotational resistance at the end stop to be perceptively stronger than at a latching point.

18. The method according to claim 15, which comprises dynamically setting an angular distance between at least two adjacent latching points and enabling the rotating unit to be endlessly and freely rotatable in the switched-off state.

19. The method according to claim 15, which comprises setting the number of latching points to correspond to a number of currently available menu items or list entries.

20. The method according to claim 15, which comprises carrying out an associated method step or displaying an associated submenu and dynamically adapting the number of latching points to the selectable menu items in the submenu when a menu item is activated.

* * * * *